US012428886B1

(12) United States Patent
Liang et al.

(10) Patent No.: US 12,428,886 B1
(45) Date of Patent: Sep. 30, 2025

(54) FORCED ENTRY RESISTANT SASH LOCK ALSO CONFIGURED TO SNAP INTO THE MEETING RAIL OF THE SASH WINDOW

(71) Applicant: VISION INDUSTRIES GROUP, INC., Somerset, NJ (US)

(72) Inventors: Luke Liang, Somerset, NJ (US); Glen Paesano, Point Pleasant Beach, NJ (US)

(73) Assignee: VISION INDUSTRIES GROUP, INC., Somerset, NJ (US)

( * ) Notice: Subject to any disclaimer, the term of this patent is extended or adjusted under 35 U.S.C. 154(b) by 100 days.

(21) Appl. No.: 18/508,396

(22) Filed: Nov. 14, 2023

Related U.S. Application Data

(63) Continuation-in-part of application No. 18/330,539, filed on Jun. 7, 2023.
(Continued)

(51) Int. Cl.
*E05C 21/00* (2006.01)
*E05C 3/00* (2006.01)
*E05C 3/04* (2006.01)

(52) U.S. Cl.
CPC .............. *E05C 21/00* (2013.01); *E05C 3/004* (2013.01); *E05C 3/046* (2013.01)

(58) Field of Classification Search
CPC .......... E05C 21/00; E05C 3/004; E05C 19/06; E05C 3/046; E05C 2007/007; E05C 1/10;
(Continued)

(56) References Cited

U.S. PATENT DOCUMENTS 16,228 A 12/1856 Copeland
30,408 A 10/1860 Judd
(Continued)

FOREIGN PATENT DOCUMENTS

GB 2 286 627 8/1995
GB 2 461 079 12/2009
(Continued)

OTHER PUBLICATIONS

Press Fit Forces Stress Design Calculator, Jun. 18, 2018, available at: www.engineersedge.com/calculators/machine-design/press-fit/press-fit.htm.
"Three General Types of Fit," available at www.mmto.org/dclark/Reports/Encoder%20Upgrade/fittolerences%20%5BRead-Only%5D.pdf., Jul. 8, 2019.
(Continued)

*Primary Examiner* — Christine M Mills
*Assistant Examiner* — Faria F Ahmad
(74) *Attorney, Agent, or Firm* — Thomas A. O'Rourke; James Bongiorno; O'ROURKE IP LAW PLLC

(57) ABSTRACT

A forced-entry-resistant sash lock includes a housing, shaft/handle member, cam member, and secondary cam. When the cam member is in the unlocked position, rotating the shaft causes secondary cam rotation initially being independent of the cam member, and subsequently the secondary cam's first contact surface contacts the cam member's first contact surface causing co-rotation of the cam member and engagement of its cantilevered arm's first engagement surface with an interior housing wall's first engagement surface to cause deflection of the arm, and continued shaft rotation returns the cantilevered arm to the undeflected position, whereat forced counter-rotation of the cam member towards the unlocked cam member position is prevented by the contact between the first contact surface of the secondary cam and first contact surface of the cam member and contact between the second engagement surface of the cantilevered arm and the second engagement surface of the interior wall.

18 Claims, 43 Drawing Sheets

Related U.S. Application Data

(60) Provisional application No. 63/595,374, filed on Nov. 2, 2023, provisional application No. 63/352,651, filed on Jun. 16, 2022.

(58) Field of Classification Search
CPC ............... E05B 65/0876; E05B 53/003; E05B 65/0841; E05B 65/085
See application file for complete search history.

(56) References Cited

U.S. PATENT DOCUMENTS

| | | | |
|---|---|---|---|
| 36,524 | A | 9/1862 | Minor |
| 51,222 | A | 11/1865 | Ridell |
| 108,778 | A | 11/1870 | Gorman |
| 115,781 | A | 6/1871 | Steele |
| 126,872 | A | 5/1872 | Buckman |
| 148,857 | A | 3/1874 | Smith |
| 163,008 | A | 5/1875 | Gillespie |
| 166,842 | A | 8/1875 | Berryman |
| 178,360 | A | 6/1876 | Cooper |
| 190,074 | A | 4/1877 | Penfield |
| 192,614 | A | 7/1877 | Andrews |
| 192,919 | A | 7/1877 | Hoyt |
| 201,146 | A | 3/1878 | Adler |
| 226,033 | A | 3/1880 | Burns |
| 230,476 | A | 7/1880 | Green |
| 234,387 | A | 11/1880 | Burgess |
| 284,993 | A | 9/1883 | Abele |
| 314,350 | A | 3/1885 | Smith |
| 316,285 | A | 4/1885 | McKeen |
| 331,005 | A | 11/1885 | Sahr |
| 336,302 | A | 2/1886 | Dudgeon |
| 346,788 | A | 8/1886 | Teufel |
| 350,678 | A | 10/1886 | Hussey |
| 353,287 | A | 11/1886 | Chumard |
| 368,595 | A | 8/1887 | King |
| 369,885 | A | 9/1887 | Shaw |
| 375,656 | A | 12/1887 | Shaw |
| 376,252 | A | 1/1888 | McIntyre |
| 379,910 | A | 3/1888 | Rosentreter |
| 410,728 | A | 9/1889 | Brown |
| 417,868 | A | 12/1889 | Janes |
| 423,761 | A | 3/1890 | Hasenpflug |
| 426,303 | A | 4/1890 | McGovern |
| 447,068 | A | 2/1891 | Dixon |
| 452,723 | A | 5/1891 | Schmalhausen |
| 471,363 | A | 3/1892 | Sloan |
| 480,148 | A | 8/1892 | Theby |
| 493,159 | A | 3/1893 | Gibson |
| 509,941 | A | 12/1893 | Perry |
| 512,593 | A | 1/1894 | Webster |
| 520,754 | A | 5/1894 | Burmeister |
| 526,118 | A | 9/1894 | Sharp |
| 528,656 | A | 11/1894 | Burmeister |
| 530,078 | A | 12/1894 | Ammerman |
| 532,935 | A | 1/1895 | Woolery |
| 534,185 | A | 2/1895 | Winchester |
| 537,258 | A | 4/1895 | Wilcox |
| 539,030 | A | 5/1895 | Bitner |
| 551,181 | A | 12/1895 | Dillon |
| 551,242 | A | 12/1895 | Wallace |
| 554,448 | A | 2/1896 | Keil |
| 564,426 | A | 7/1896 | Hubbard |
| 572,591 | A | 12/1896 | Woodard |
| 587,424 | A | 8/1897 | Bonine |
| 590,225 | A | 9/1897 | Hill |
| 653,458 | A | 7/1900 | Paquette |
| 666,596 | A | 1/1901 | Breen |
| 683,928 | A | 10/1901 | Geraghty |
| 688,491 | A | 12/1901 | Sigler |
| 695,736 | A | 3/1902 | Kendrick |
| 698,742 | A | 4/1902 | Scharnweber |
| 699,696 | A | 5/1902 | Melien |
| 708,406 | A | 9/1902 | Robison |
| 714,343 | A | 11/1902 | Wellman |
| 718,007 | A | 1/1903 | Linn |
| 719,981 | A | 2/1903 | Adams |
| 722,162 | A | 3/1903 | St. Louis |
| 724,466 | A | 4/1903 | Hannan |
| 743,716 | A | 11/1903 | Hadka |
| 744,755 | A | 11/1903 | Hasenpflug |
| 745,888 | A | 12/1903 | McElwee |
| 749,469 | A | 1/1904 | Assorati |
| 756,453 | A | 4/1904 | Arens |
| 756,559 | A | 4/1904 | Arens |
| 757,249 | A | 4/1904 | Barnard |
| 759,642 | A | 5/1904 | Sparks |
| 764,493 | A | 7/1904 | Noseworthy |
| 769,386 | A | 9/1904 | Johnson |
| 769,767 | A | 9/1904 | Phelps |
| 774,536 | A | 11/1904 | Saunders |
| 775,602 | A | 11/1904 | Hearnshaw |
| 800,043 | A | 9/1905 | Witte |
| 804,994 | A | 11/1905 | Andrews |
| 815,537 | A | 3/1906 | Kissinger |
| 833,900 | A | 10/1906 | Sigler |
| 837,811 | A | 12/1906 | Ebbeson |
| 840,427 | A | 1/1907 | Brister |
| 865,090 | A | 9/1907 | Eddy |
| 866,073 | A | 9/1907 | Saunders |
| 878,206 | A | 2/1908 | Johnson |
| 881,658 | A | 3/1908 | Bowman |
| 886,108 | A | 4/1908 | Allen |
| 887,690 | A | 5/1908 | Pearce |
| 897,719 | A | 9/1908 | Daubaignan |
| 900,079 | A | 10/1908 | Bittorf |
| 910,850 | A | 1/1909 | Petrie |
| 913,730 | A | 3/1909 | Kapus |
| 922,894 | A | 5/1909 | Heid |
| 926,899 | A | 7/1909 | Roy |
| 928,408 | A | 7/1909 | Taube |
| 948,628 | A | 2/1910 | Jefferis |
| 959,150 | A | 5/1910 | Morris |
| 963,983 | A | 7/1910 | Bernhard |
| 966,063 | A | 8/1910 | Toothaker |
| 976,777 | A | 11/1910 | Brown |
| 980,131 | A | 12/1910 | Shean |
| 998,642 | A | 7/1911 | Shean |
| 1,003,386 | A | 9/1911 | Welker |
| 1,006,211 | A | 10/1911 | Hermon |
| 1,020,454 | A | 3/1912 | Seidenbecker |
| 1,041,803 | A | 10/1912 | Kilburn |
| 1,051,918 | A | 2/1913 | Rowley |
| 1,059,999 | A | 4/1913 | James |
| 1,069,079 | A | 7/1913 | Voight |
| 1,077,487 | A | 11/1913 | Miller |
| 1,080,172 | A | 12/1913 | Rusk |
| 1,100,820 | A | 6/1914 | Edwards |
| 1,121,228 | A | 12/1914 | Burkhart |
| 1,122,026 | A | 12/1914 | O'Rourke |
| 1,127,835 | A | 2/1915 | Westlund |
| 1,133,217 | A | 3/1915 | Barton |
| 1,141,437 | A | 6/1915 | Unterlender |
| 1,148,712 | A | 8/1915 | Overland |
| 1,163,086 | A | 12/1915 | Harper |
| 1,173,129 | A | 2/1916 | Taliaferro |
| 1,177,637 | A | 4/1916 | Lane |
| 1,177,838 | A | 4/1916 | Wilkinson |
| 1,207,989 | A | 12/1916 | O'Rourke |
| 1,232,683 | A | 7/1917 | Holllis |
| 1,243,115 | A | 10/1917 | Shur |
| 1,244,725 | A | 10/1917 | Gadke |
| 1,253,810 | A | 1/1918 | Gianninoto |
| 1,261,274 | A | 4/1918 | Newsam |
| 1,269,467 | A | 6/1918 | Winters |
| 1,270,740 | A | 6/1918 | Keyes |
| 1,272,900 | A | 7/1918 | Berman |
| 1,279,353 | A | 9/1918 | Kelley |
| 1,311,052 | A | 7/1919 | Danforth |
| 1,322,677 | A | 11/1919 | Ditlefsen |
| 1,338,250 | A | 4/1920 | Parkes |
| 1,338,416 | A | 4/1920 | Bellinger |
| 1,339,362 | A | 5/1920 | L'Heureux |

(56) References Cited

U.S. PATENT DOCUMENTS

| | | | |
|---|---|---|---|
| 1,341,234 | A | 5/1920 | Horton |
| 1,350,698 | A | 8/1920 | Boedtcher |
| 1,387,302 | A | 8/1921 | Page |
| 1,388,272 | A | 8/1921 | Lawrence |
| 1,393,628 | A | 10/1921 | Leichter |
| 1,398,174 | A | 11/1921 | Carlson |
| 1,399,897 | A | 12/1921 | Singer |
| 1,412,154 | A | 4/1922 | Wollesen |
| 1,439,585 | A | 12/1922 | Trost |
| 1,461,467 | A | 7/1923 | Stuart |
| 1,463,866 | A | 8/1923 | Bourbeau |
| 1,470,858 | A | 10/1923 | Maxwell |
| 1,485,382 | A | 3/1924 | Foley |
| 1,490,874 | A | 4/1924 | Webb |
| 1,516,995 | A | 11/1924 | Trigueiro |
| 1,550,532 | A | 8/1925 | French |
| 1,552,690 | A | 9/1925 | Frantz |
| 1,587,037 | A | 6/1926 | Rudolph |
| 1,601,051 | A | 9/1926 | Wilbert |
| 1,605,717 | A | 11/1926 | Gregg |
| 1,619,031 | A | 3/1927 | Ostrosky |
| 1,622,742 | A | 3/1927 | Shipman |
| 1,656,818 | A | 1/1928 | Dillon |
| 1,692,579 | A | 11/1928 | Schrader |
| 1,704,946 | A | 3/1929 | Lindgren |
| 1,712,792 | A | 5/1929 | Hansen |
| 1,715,957 | A | 6/1929 | Stein |
| 1,724,637 | A | 8/1929 | Bergstrom |
| 1,750,715 | A | 3/1930 | Jeffers |
| 1,794,171 | A | 2/1931 | Grutel |
| 1,812,288 | A | 6/1931 | Drapeau |
| 1,819,824 | A | 8/1931 | McAllister |
| 1,864,253 | A | 6/1932 | McIntyre |
| 1,869,274 | A | 7/1932 | Philips |
| 1,877,177 | A | 9/1932 | Hinderer |
| 1,891,940 | A | 12/1932 | McAllister |
| 1,900,936 | A | 3/1933 | Huttger |
| 1,901,974 | A | 3/1933 | Macy |
| 1,918,114 | A | 7/1933 | Lorenzen |
| 1,922,062 | A | 8/1933 | Sullivan |
| 1,940,084 | A | 12/1933 | Grasso |
| 1,960,034 | A | 5/1934 | Stewart |
| 1,964,114 | A | 6/1934 | Gerlach |
| 2,095,057 | A | 10/1937 | Corrado |
| 2,122,661 | A | 7/1938 | Rightmyer |
| 2,126,995 | A | 8/1938 | Kingdon |
| 2,136,408 | A | 11/1938 | Bedell |
| 2,158,260 | A | 5/1939 | Stillman |
| 2,202,561 | A | 5/1940 | Lahiere |
| 2,232,965 | A | 2/1941 | Perl |
| 2,272,145 | A | 2/1942 | Anderson |
| 2,326,084 | A | 8/1943 | Westrope |
| 2,369,584 | A | 2/1945 | Lundholm |
| 2,452,521 | A | 10/1948 | Johnson |
| 2,480,016 | A | 8/1949 | Granberg |
| 2,480,988 | A | 9/1949 | Walton |
| 2,500,349 | A | 3/1950 | Menns |
| 2,503,370 | A | 4/1950 | Zanona |
| 2,523,559 | A | 9/1950 | Couture |
| 2,527,278 | A | 10/1950 | Schemansky |
| 2,537,736 | A | 1/1951 | Carlson |
| 2,560,274 | A | 7/1951 | Cantelo |
| 2,581,816 | A | 1/1952 | Schlueter |
| 2,590,624 | A | 3/1952 | James |
| 2,599,196 | A | 6/1952 | Peremi |
| 2,605,125 | A | 7/1952 | Emerson |
| 2,612,398 | A | 9/1952 | Miller |
| 2,613,526 | A | 10/1952 | Holmsten |
| 2,621,951 | A | 12/1952 | Ostadal |
| 2,645,515 | A | 7/1953 | Thomas |
| 2,648,967 | A | 8/1953 | Holmsten |
| 2,670,982 | A | 3/1954 | Banham |
| 2,692,789 | A | 10/1954 | Rivard |
| 2,735,707 | A | 2/1956 | Sylvan |
| 2,758,862 | A | 8/1956 | Endter |
| 2,766,492 | A | 10/1956 | Day |
| 2,789,851 | A | 4/1957 | Lickteig |
| 2,818,919 | A | 1/1958 | Sylvan |
| 2,846,258 | A | 8/1958 | Granberg |
| 2,855,772 | A | 10/1958 | Hillgren |
| 2,884,276 | A | 4/1959 | Baptist |
| 2,920,914 | A | 1/1960 | Jenkins |
| 2,941,832 | A | 6/1960 | Grossman |
| 2,967,595 | A | 1/1961 | Zitomer |
| 2,997,323 | A | 8/1961 | Riser |
| 3,027,188 | A | 3/1962 | Eichstadt |
| 3,122,387 | A | 2/1964 | Wakelin |
| 3,135,542 | A | 6/1964 | Wilkenson |
| 3,187,526 | A | 6/1965 | Moler |
| 3,267,613 | A | 8/1966 | McQuiston |
| 3,288,510 | A | 11/1966 | Gough |
| 3,352,586 | A | 11/1967 | Hakanson |
| 3,362,740 | A | 1/1968 | Burns |
| 3,422,575 | A | 1/1969 | Armstrong |
| 3,425,729 | A | 2/1969 | Bisbing |
| 3,438,153 | A | 4/1969 | Lemme |
| 3,469,877 | A | 9/1969 | Hutchison |
| 3,599,452 | A | 8/1971 | Maruyama |
| 3,600,019 | A | 8/1971 | Toyota |
| 3,642,315 | A | 2/1972 | Alpern |
| 3,645,573 | A | 2/1972 | Strang |
| 3,683,652 | A | 8/1972 | Halopoff |
| 3,706,467 | A | 12/1972 | Martin |
| 3,762,750 | A | 10/1973 | Orr |
| 3,811,718 | A | 5/1974 | Bates |
| 3,907,348 | A | 9/1975 | Bates |
| 3,919,808 | A | 11/1975 | Simmons |
| 3,927,906 | A | 12/1975 | Mieras |
| 3,930,678 | A | 1/1976 | Alexander |
| 4,054,308 | A | 10/1977 | Prohaska |
| 4,059,298 | A | 11/1977 | Van Klompenburg |
| 4,063,766 | A | 12/1977 | Granberg |
| 4,068,871 | A | 1/1978 | Mercer |
| 4,095,827 | A | 6/1978 | Stavenau |
| 4,095,829 | A | 6/1978 | Van Klompenburg |
| 4,102,546 | A | 7/1978 | Costello |
| 4,151,682 | A | 5/1979 | Schmidt |
| 4,165,894 | A | 8/1979 | Wojciechowski |
| 4,223,930 | A | 9/1980 | Costello |
| 4,227,345 | A | 10/1980 | Durham |
| 4,235,465 | A | 11/1980 | Costello |
| 4,253,688 | A | 3/1981 | Hosooka |
| 4,261,602 | A | 4/1981 | Anderson |
| 4,274,666 | A | 6/1981 | Peck |
| 4,293,154 | A | 10/1981 | Cassells |
| 4,303,264 | A | 12/1981 | Uehara |
| 4,305,612 | A | 12/1981 | Hunt |
| 4,392,329 | A | 7/1983 | Suzuki |
| 4,429,910 | A | 2/1984 | Anderson |
| 4,470,277 | A | 9/1984 | Uyeda |
| 4,475,311 | A | 10/1984 | Gibson |
| 4,525,952 | A | 7/1985 | Cunningham |
| 4,580,366 | A | 4/1986 | Hardy |
| 4,587,759 | A | 5/1986 | Gray |
| 4,621,847 | A | 11/1986 | Paulson |
| 4,624,073 | A | 11/1986 | Randall |
| 4,639,021 | A | 1/1987 | Hope |
| 4,643,005 | A | 2/1987 | Logas |
| 4,655,489 | A | 4/1987 | Bisbing |
| 4,736,972 | A | 4/1988 | Mosch |
| 4,801,164 | A | 1/1989 | Mosch |
| 4,813,725 | A | 3/1989 | Mosch |
| 4,824,154 | A | 4/1989 | Simpson |
| 4,826,222 | A | 5/1989 | Davis |
| 4,827,685 | A | 5/1989 | Schmidt |
| 4,893,849 | A | 1/1990 | Schlack |
| 4,922,658 | A | 5/1990 | Coddens |
| 4,923,230 | A | 5/1990 | Simpson |
| 4,949,506 | A | 8/1990 | Durham |
| 4,961,286 | A | 10/1990 | Bezubic |
| 4,991,886 | A | 2/1991 | Nolte |
| 5,042,855 | A | 8/1991 | Bennett |
| 5,072,464 | A | 12/1991 | Draheim |
| 5,076,015 | A | 12/1991 | Manzalini |

(56) References Cited

U.S. PATENT DOCUMENTS 5,087,087 A 2/1992 Vetter
5,087,088 A 2/1992 Milam
5,090,750 A 2/1992 Lindqvist
5,090,754 A 2/1992 Thompson
5,092,640 A 3/1992 Plummer
5,110,165 A 5/1992 Piltingsrud
5,127,685 A 7/1992 Dallaire
5,139,291 A 8/1992 Schultz
5,143,412 A 9/1992 Lindqvist
5,161,839 A 11/1992 Piltingsrud
5,165,737 A 11/1992 Riegelman
5,183,310 A 2/1993 Shaughnessy
5,217,264 A 6/1993 Fier
5,219,193 A 6/1993 Piltingsrud
5,244,238 A 9/1993 Lindqvist
5,248,174 A 9/1993 Matz
5,274,955 A 1/1994 Dallaire
5,341,752 A 8/1994 Hambleton
5,398,447 A 3/1995 Morse
5,437,484 A 8/1995 Yamada
5,448,857 A 9/1995 Stormo
5,452,925 A 9/1995 Huang
5,454,609 A 10/1995 Slocomb
5,536,052 A * 7/1996 Maier ................ E05B 65/0852 292/DIG. 47
5,553,903 A 9/1996 Prete
5,560,149 A 10/1996 Lafevre
5,575,116 A 11/1996 Carlson
5,582,445 A 12/1996 Olsen
RE35,463 E 2/1997 Vetter
5,618,067 A * 4/1997 Carlson ..................... E05B 9/08 292/337
5,636,475 A 6/1997 Nidelkoff
5,671,958 A * 9/1997 Szapucki .................. E05C 1/10 292/DIG. 47
5,688,000 A 11/1997 Dolman
5,715,631 A 2/1998 Kailian
5,741,032 A 4/1998 Chaput
5,778,602 A 7/1998 Johnson
5,791,700 A 8/1998 Biro
5,806,900 A 9/1998 Bratcher
5,829,196 A 11/1998 Maier
5,839,767 A 11/1998 Piltingsrud
5,878,608 A * 3/1999 Alyanakian ............... E05C 1/10 292/DIG. 31
5,901,499 A 5/1999 Delaske
5,901,501 A 5/1999 Fountaine
5,911,763 A 6/1999 Quesada
5,927,768 A 7/1999 Dallmann
5,934,716 A * 8/1999 Koveal ..................... E05C 1/10 292/DIG. 61
5,970,656 A 10/1999 Maier
5,992,907 A 11/1999 Sheldon
6,000,735 A 12/1999 Jourdenais
6,082,786 A * 7/2000 Stephens ................. E05C 19/06 292/228
6,086,121 A 7/2000 Buckland
6,116,665 A 9/2000 Subliskey
6,135,510 A 10/2000 Diginosa
6,139,071 A 10/2000 Hopper
6,142,541 A 11/2000 Rotondi
6,155,615 A 12/2000 Schulz
6,176,041 B1 1/2001 Roberts
6,178,696 B1 1/2001 Liang
6,183,024 B1 2/2001 Schultz
6,209,931 B1 4/2001 Von Stoutenborough
6,217,087 B1 4/2001 Fuller
6,230,443 B1 5/2001 Schultz
6,250,694 B1 6/2001 Weiland
6,279,266 B1 8/2001 Searcy
6,349,576 B2 2/2002 Subliskey
6,364,375 B1 4/2002 Szapucki
6,450,544 B2 9/2002 Rotondi
6,546,671 B2 4/2003 Mitchell
6,565,133 B1 5/2003 Timothy
6,568,723 B2 5/2003 Murphy
6,588,150 B1 7/2003 Wong
6,592,155 B1 7/2003 Lemley
6,607,221 B1 8/2003 Elliot
6,631,931 B2 10/2003 Magnusson
6,634,683 B1 10/2003 Brannan
6,688,659 B2 2/2004 Kobrehel
6,817,142 B2 * 11/2004 Marshik .............. E05B 65/0835 292/DIG. 20
6,848,728 B2 2/2005 Rotondi
6,871,885 B2 3/2005 Goldenberg
6,871,886 B2 * 3/2005 Coleman ............. E05B 17/2003 292/DIG. 47
6,877,784 B2 4/2005 Kelley
6,925,758 B2 8/2005 Petit
6,957,513 B2 10/2005 Pettit
6,983,963 B2 1/2006 Eslick
7,000,957 B2 2/2006 Lawrence
7,013,603 B2 3/2006 Eenigenburg
7,017,957 B2 3/2006 Murphy
7,036,851 B2 5/2006 Romig
7,063,361 B1 6/2006 Lawrence
7,070,211 B2 7/2006 Polowinczak
7,070,215 B2 7/2006 Kelley
7,100,951 B2 9/2006 Jien
7,147,255 B2 12/2006 Goldenberg
7,159,908 B2 1/2007 Liang
7,171,784 B2 2/2007 Eenigenburg
7,296,831 B2 11/2007 Generowicz
7,322,619 B2 1/2008 Nolte
7,322,620 B1 1/2008 Lawrence
7,407,199 B2 8/2008 Richardson
7,431,356 B2 10/2008 Liang
7,441,811 B2 10/2008 Lawrence
7,481,470 B2 1/2009 Eenigenburg
7,490,873 B1 * 2/2009 Ricke .................. E05B 65/0876 292/DIG. 47
7,510,221 B2 3/2009 Eenigenburg
7,530,611 B2 5/2009 Liang
7,559,588 B2 7/2009 Liang
7,607,262 B2 10/2009 Pettit
7,637,544 B2 12/2009 Liang
7,665,775 B1 2/2010 Miller
7,699,365 B2 4/2010 Liang
7,922,223 B2 4/2011 Lawrence
7,976,077 B2 7/2011 Flory
8,205,919 B2 6/2012 Flory
8,205,920 B2 6/2012 Flory
8,220,846 B2 7/2012 Liang
8,231,148 B2 7/2012 Van Der Kooij
8,235,430 B2 * 8/2012 Liang ......................... E05B 9/08 292/228
8,272,164 B2 9/2012 Albrecht
8,336,930 B2 12/2012 Liang
8,360,484 B2 1/2013 Liang
8,414,039 B2 4/2013 Liang
8,511,724 B2 8/2013 Liang
8,550,507 B2 10/2013 Barton
8,567,830 B2 10/2013 Liang
8,657,347 B2 2/2014 Liang
8,726,572 B2 5/2014 Derham
8,789,857 B2 7/2014 Liang
8,789,862 B2 7/2014 Liang
8,833,809 B2 9/2014 Liang
8,844,985 B2 9/2014 Liang
8,870,244 B2 10/2014 Liang
8,881,461 B2 11/2014 Derham
9,103,144 B2 8/2015 Liang
9,140,033 B2 9/2015 Wolf
9,376,834 B2 6/2016 Liang
9,493,970 B2 11/2016 Campbell
9,816,300 B2 11/2017 Derham
10,107,021 B1 10/2018 Liang
10,704,297 B2 * 7/2020 Liang ......................... E05C 1/12
11,168,492 B1 * 11/2021 Liang .................. E05B 17/2053
11,339,585 B1 * 5/2022 Wilson ...................... E05C 1/10
11,365,561 B2 * 6/2022 Hollermann .............. E05C 1/12

(56) References Cited

U.S. PATENT DOCUMENTS

| | | | | |
|---|---|---|---|---|
| 2002/0185871 | A1* | 12/2002 | Straka, Jr. | E05C 1/10 292/163 |
| 2004/0026932 | A1* | 2/2004 | Coleman | E05B 17/2003 292/241 |
| 2004/0207212 | A1* | 10/2004 | Wallis | E05C 1/12 292/241 |
| 2006/0192391 | A1 | 8/2006 | Pettit | |
| 2006/0244270 | A1 | 11/2006 | Rotondi | |
| 2007/0085350 | A1* | 4/2007 | Liang | E05C 3/046 292/240 |
| 2007/0205615 | A1 | 9/2007 | Eenigenburg | |
| 2007/0284893 | A1* | 12/2007 | Davies | E05C 9/045 292/336.3 |
| 2008/0012358 | A1 | 1/2008 | Liang | |
| 2008/0022728 | A1 | 1/2008 | Flory | |
| 2008/0169658 | A1 | 7/2008 | Wolf | |
| 2010/0199726 | A1 | 8/2010 | Varney | |
| 2010/0218425 | A1 | 9/2010 | Nolte | |
| 2010/0263415 | A1 | 10/2010 | Rupsil | |
| 2011/0304163 | A1* | 12/2011 | Liang | E05C 3/046 292/242 |
| 2012/0313387 | A1* | 12/2012 | Liang | E05B 17/2019 292/224 |
| 2013/0125471 | A1* | 5/2013 | Benevenga | E05B 65/0841 49/506 |
| 2013/0214545 | A1 | 8/2013 | Wolf | |
| 2013/0283695 | A1 | 10/2013 | Hollerman | |
| 2013/0285391 | A1* | 10/2013 | Wolf | E05C 3/046 292/241 |
| 2015/0252596 | A1* | 9/2015 | Liang | E05C 1/12 292/163 |
| 2015/0252600 | A1* | 9/2015 | Liang | E05B 65/0841 292/169 |
| 2016/0076282 | A1 | 3/2016 | Wolf | |
| 2018/0128018 | A1* | 5/2018 | Rampen | E05B 63/128 |
| 2019/0211582 | A1* | 7/2019 | Nau | E06B 1/702 |
| 2019/0330891 | A1* | 10/2019 | Paré | E05C 19/06 |

FOREIGN PATENT DOCUMENTS

| | | |
|---|---|---|
| GB | 2 461 107 | 12/2009 |
| GB | 2 461 108 | 12/2009 |
| JP | 2003041812 A | 2/2003 |

OTHER PUBLICATIONS

"Engineering Fit," available at: https://en.wikipedia.org/wiki/Engineering_fit, Jul. 8, 2019.

* cited by examiner

FIG. 65
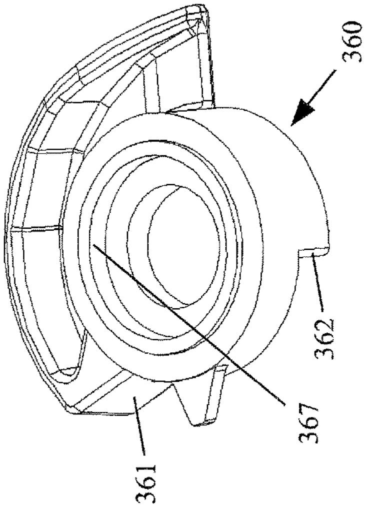
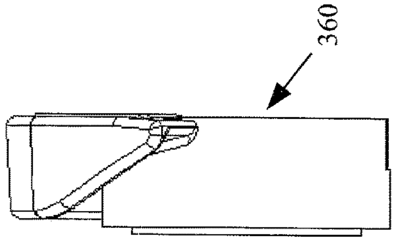
FIG. 71
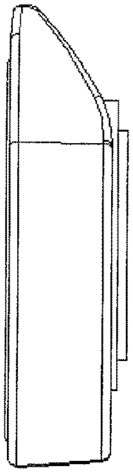
FIG. 68
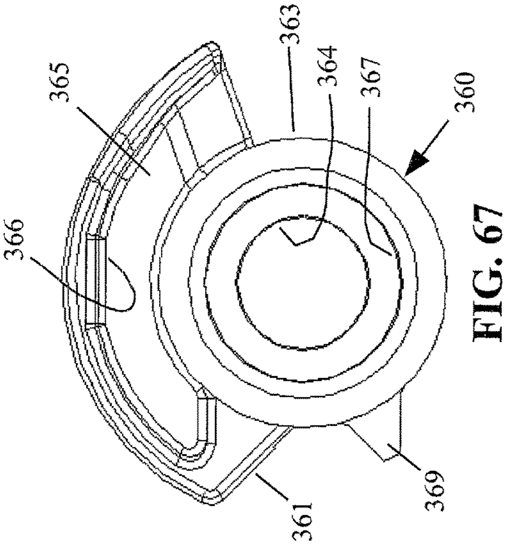
FIG. 67
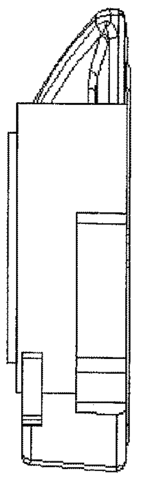
FIG. 69
FIG. 66
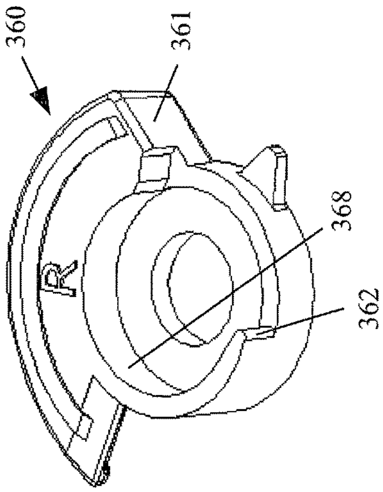
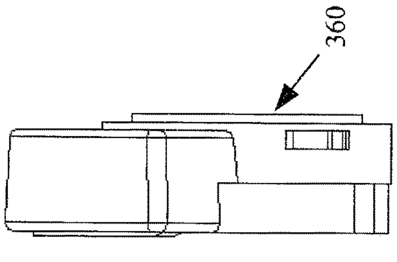
FIG. 70

FORCED ENTRY RESISTANT SASH LOCK ALSO CONFIGURED TO SNAP INTO THE MEETING RAIL OF THE SASH WINDOW

CROSS-REFERENCES

This application claims priority on U.S. Provisional Patent Application Ser. No. 63/585,374, filed on Nov. 2, 2023, the disclosures of which are incorporated herein by reference. This application is also a continuation-in-part of U.S. patent application Ser. No. 18/330,539, filed on Jun. 7, 2023, which claims priority on U.S. Provisional Patent Application Ser. No. 63/352,651, filed on Jun. 16, 2022, all disclosures of which are incorporated herein by reference. This application also incorporates by reference the disclosures of U.S. patent application Ser. No. 16/244,212, filed on Jan. 10, 2019, now issued as U.S. Pat. No. 11,168,492; and also U.S. patent application Ser. No. 16/689,118, filed on Nov. 20, 2019, now issued as U.S. Pat. No. 11,187,010.

FIELD OF THE INVENTION

The present invention is directed to the field of window locks, and is more particularly directed to a sash window lock that is configured to resist a forced entry from the exterior.

BACKGROUND OF THE INVENTION

Single hung and double hung sliding sash windows are known in the art, and are often utilized in the construction of homes and other dwellings, and even offices. Sash locks are typically used to secure the lower sash window in a closed position, if the upper sash is not moveable, or may be used to secure both the upper and lower sash windows in a closed position where both are slidable with respect to a master window frame. A sash lock is typically mounted to the meeting rail of the lower sash window, and includes a rotatable cam that is pivotally mounted to a housing, where the cam may engage a keeper in a locked (extended) position, which keeper may be attached to the upper sash window or to the master window frame.

The present invention provides improvements to such window hardware in the form of a sash lock for single hung or double hung windows, which sash lock is configured to snap into the meeting rail of the window, so that it may be installed without the use of screws, and which is also configured to resist a forced entry by a person attempting to manipulate the cam from the exterior to move it into an unlocked position to open the window.

OBJECTS OF THE INVENTION

It is an object of the invention to provide a sash lock to prevent relative sliding movement of one or both sliding sash windows that are slidable within a master window frame.

It is another object of the invention to provide a sash window lock capable of locking one or more sashes of a sliding sash window.

It is a further object of the invention to provide a latch for preventing the locking cam of a sash lock from being surreptitiously operated by an unauthorized party on the outside of the window.

It is another object of the invention to provide a sash window lock capable of resisting a forced entry from outside of the window.

It is a further object of the invention to provide a forced entry resistant sash window lock that can snap into and be secured to the meeting rail of the window sash without the use of fasteners, and which is also capable of resisting a forced entry from outside of the window.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A forced-entry-resistant lock for a sash window includes: a housing, a shaft/handle member, a cam member, and a secondary cam. The forced-entry-resistant lock may also include a detent arrangement to releasably secure the shaft/handle member in each of an unlocked position and a forced-entry-resistant locked position.

The housing may have at least one wall shaped to form an exterior surface, and an interior surface that defines a cavity. The housing may also have: an opening in the at least one wall; a hole in the at least one wall; and an interior wall formed within the cavity that includes a first engagement surface and a second engagement surface. At least a portion of the shaft is rotatably mounted with respect to the housing.

The cam member includes a hub configured to pivotally mount the cam member to the housing, to pivot between a forced-entry-resistant locked cam member position where a portion of the cam member extends out from the housing cavity and is thereat configured to engage a keeper to lock the sash window in a closed window position, a non-forced entry-resistant locked cam member position where the portion of the cam member is still configured to engage with the keeper, and an unlocked cam member position where the cam member retracts further into the housing and the portion of the cam member is disengaged from the keeper. The cam member is also formed to include a first contact surface and a second contact surface.

The secondary cam is fixedly secured to the shaft, and is formed to include: a first contact surface; a second contact surface; and a cantilevered arm. A distal end of the cantilevered arm is formed to include: a first engagement surface and a second engagement surface.

Being so formed, when the cam member is in the unlocked cam member position, upon rotation of the shaft in a first rotational direction, the secondary cam rotates with the shaft independent of the cam member, and upon continued rotation of the shaft in the first rotational direction the first contact surface of the secondary cam contacts the first contact surface of the cam member and causes co-rotation of the cam member into the non-forced entry-resistant locked cam position. Upon continued rotation of the shaft in the first rotational direction the contact causes further co-rotation of the cam member and engagement of the first engagement surface of the cantilevered arm with the first engagement surface of the interior wall to thereby cause deformation of the cantilevered arm from an undeflected position to an inwardly deflected position. Upon even further rotation of the shaft in the first rotational direction the contact causes further co-rotation of the cam member into the locked cam member position whereat the cantilevered arm is returned to the undeflected position, so that an attempt to force counter-rotation of the cam member towards the unlocked cam member position is prevented by the contact between the first contact surface of the secondary cam and the first contact surface of the cam member resulting in counter-rotation-inhibiting contact between the second engagement surface of the cantilevered arm and the second engagement surface of the interior wall.

When the cam member is in the locked cam member position, upon counter-rotation of the shaft in a second rotational direction, the secondary cam counter-rotates independent of the cam member and the engagement between the second engagement surface of the cantilevered arm and the second engagement surface of the housing causes deformation of the cantilevered member from the undeflected position to the inwardly deflected position. Upon continued counter-rotation of the shaft in the second rotational direction the second engagement surface of the cantilevered arm disengages from the second engagement surface of the housing and causes return of the cantilevered member to the undeflected position and positioning of the cam member at the non-forced entry-resistant locked cam position, and upon continued counter-rotation of the shaft in the second rotational direction the second contact surface of the secondary cam contacts the second contact surface of the cam member and causes co-counter-rotation of the cam member into the unlocked cam member position.

The interior wall of the housing may be formed to include a first interior wall portion and a second interior wall portion, where the first interior wall portion is at an angle to the second interior wall portion to form a V-shaped interior wall, and being such that the first engagement surface of the housing is formed on the first interior wall portion and the second engagement surface of the housing is formed on the second interior wall portion.

The forced-entry-resistant lock may also include a detent mechanism configured to releasably inhibit the rotatable movement of the shaft when the cam member is at either or both of the unlocked cam member position and the locked cam member position. The first detent arrangement may be created by a first flat surface formed on the shaft and a first leaf spring secured in the cavity of the housing, being such that the leaf spring contact the flat surface to inhibit the rotational movement of the shaft when the cam member is at the unlocked cam member position. A second detent arrangement may be created by a second flat surface being formed on the shaft and a second leaf spring secured in the cavity of the housing, being such that the second leaf spring contacts the second flat surface to inhibit the rotational movement of the shaft when the cam member is at the locked cam member position. The first leaf spring and the second leaf spring may be connected together to create one single u-shaped leaf spring.

BRIEF DESCRIPTION OF DRAWINGS

The description of the various example embodiments is explained in conjunction with the following appended drawings.

FIG. 65 and FIG. 66 are first and second perspective views of the locking cam shown in FIG. 47.

FIG. 67 is a front view of the locking cam of FIG. 47.

FIG. 68 is a top view of the locking cam of FIG. 47.

FIG. 69 is a bottom view of the locking cam of FIG. 47.

FIG. 70 is a first end view of the locking cam of FIG. 47.

FIG. 71 is a second end view of the locking cam of FIG. 47.

FIG. 105 is a perspective view of the sash lock assembly installed on the corresponding meeting rail, shown with a screwdriver blade being used to engage a tool removal surface of one of the cantilevered portions of said rear wall of the lock housing to cause it to deflect to permit disengagement and removal of the sash lock housing from the meeting rail.

FIG. 106 is the perspective view of FIG. 105, but showing the sash lock being rotated away from its installed position on the meeting rail after one cantilevered member of the sash lock was disengaged from the meeting rail.

DETAILED DESCRIPTION OF THE INVENTION

Figure 1:
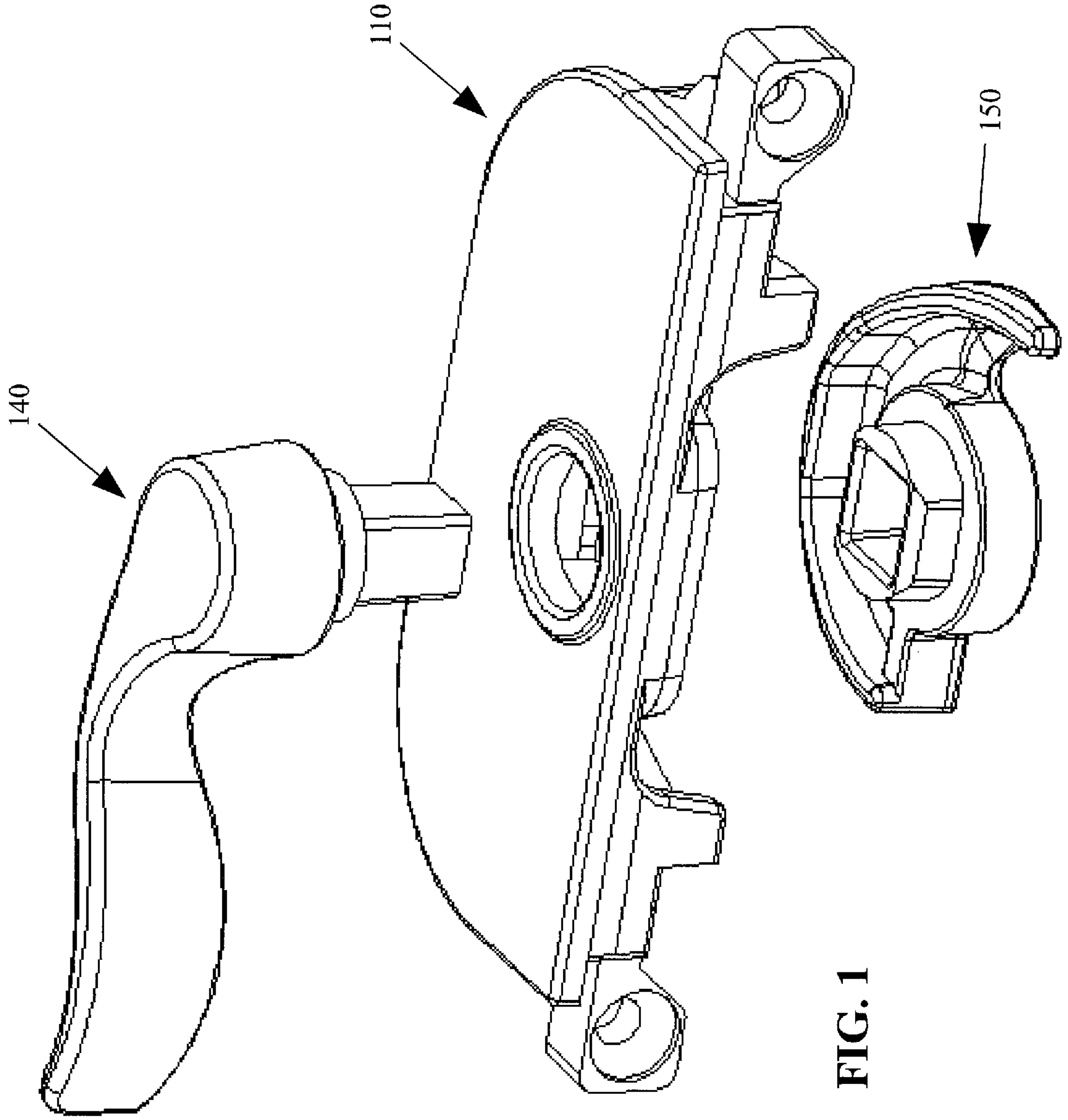
FIG. 1 is an exploded view of the component parts of a sash lock configured to snap into an opening of a meeting rail of a sash window, being installed without the use of screws.
Figure 2:
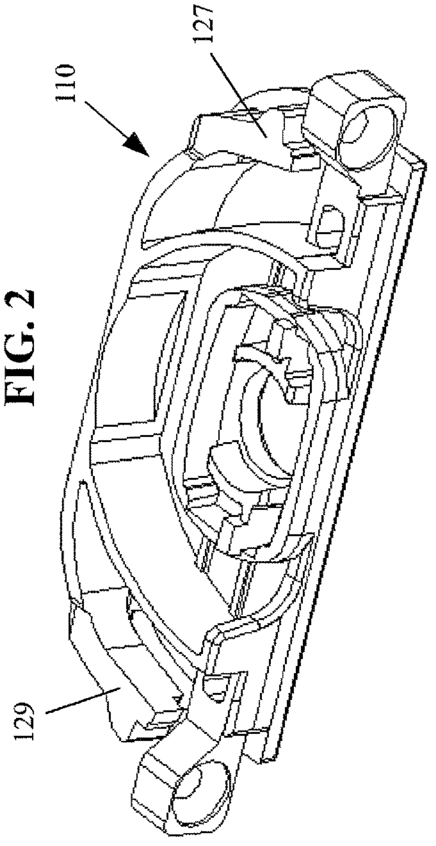
FIG. 2 is a bottom perspective view of the housing shown in FIG. 1.
Figure 3:
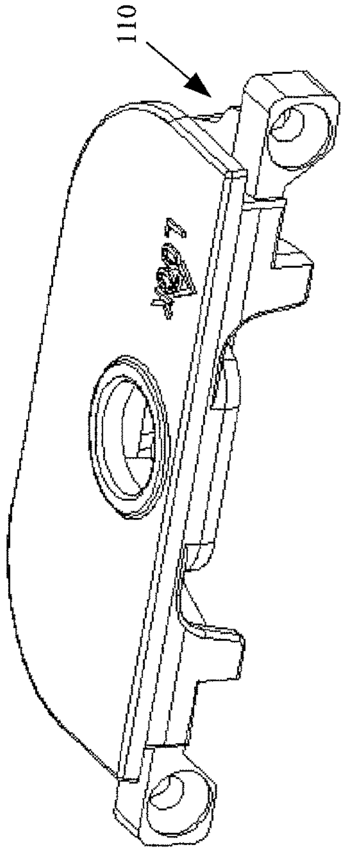
FIG. 3 is a top perspective view of the housing shown in FIG. 1.

As used throughout this specification, the word "may" is used in a permissive sense (i.e., meaning having the potential to, or being optional), rather than a mandatory sense (i.e., meaning must), as more than one embodiment of the invention may be disclosed herein. Similarly, the words "include", "including", and "includes" mean including but not limited to.

The phrases "at least one", "one or more", and "and/or" may be open-ended expressions that are both conjunctive and disjunctive in operation. For example, each of the expressions "at least one of A, B and C", "one or more of A, B, and C", and "A, B, and/or C" herein means all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference. However, It is noted that the citing of any reference within this disclosure, i.e., any patents, published patent applications, and non-patent literature, is not an admission regarding a determination as to its availability as prior art with respect to the herein disclosed and claimed apparatus/method.

Furthermore, any reference made throughout this specification to "one embodiment" or "an embodiment" means that a particular feature, structure or characteristic described in connection therewith is included in at least that one particular embodiment. Thus, the appearances of the phrases "in one embodiment" or "in an embodiment" in various places throughout this specification are not necessarily all referring to the same embodiment. Therefore, the described features, advantages, and characteristics of any particular aspect of an embodiment disclosed herein may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with design variations described in the specification, as well as applicable case law. Also, in at least some instances, a numerical difference provided by the approximating language may correspond to the precision of an instrument that may be used for measuring the value. A numerical difference provided by the approximating language may also correspond to a manufacturing tolerance associated with production of the aspect/feature being quantified (see e.g., *Ex Parte Ollmar*, Appeal No. 2014-006128 (PTAB 2016)). Furthermore, a numerical difference provided by the approximating language may also correspond to an overall tolerance for the aspect/feature that may be derived from variations resulting from a stack up (i.e., the sum) of a multiplicity of such individual tolerances.

Any use of a friction fit (i.e., an interface fit) between two mating parts described herein indicates that the opening (e.g., a hole) is smaller than the part received therein (e.g., a shaft), which may be a slight interference in one embodiment in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other values for the interference may also be used in different configurations (see e.g., "Press Fit Engineering and Design Calculator," available at: www.engineersedge.com/calculators/machine-design/press-fit/press-fit-calculator.htm).

Any described use of a clearance fit indicates that the opening (e.g., a hole) is larger than the part received therein (e.g., a shaft), enabling the two parts to move (e.g. to slide and/or rotate) when assembled, where the gap between the opening and the part may depend upon the size of the part and the type of clearance fit—i.e., loose running, free running, easy running, close running, and sliding (e.g., for a 0.1250 inch shaft diameter the opening may be 0.1285 inches for a close running fit, and may be 0.1360 inches for a free running fit; for a 0.5000 inch diameter shaft the opening may be 0.5156 inches for a close running fit and may be 0.5312 inches for a free running fit). Other clearance amounts are used for other clearance types. See "Engineering Fit" at: https://en.wikipedia.org/wiki/Engineering_fit; and "Three General Types of Fit," available at www.mm-to.org/dclark/Reports/Encoder % 20Upgrade/fittolerences %20%5BRead-Only % 5D.pdf.

The terms "rigid," and "flexible," and "resilient" may be used herein to distinguish characteristics of portions of certain features of the sash lock. Use of the term "rigid" indicates that the described element is devoid of flexibility such that it does not readily lose its overall shape when force is applied by hand, and in fact it may break if an attempt to bend it is made with sufficient force. Use of the term "flexible" indicates that the described element is capable of repeated bending such that it may be bent into different shapes and does not retain a general shape, but instead readily deforms when force is applied. Use of the term "resilient" indicates that the described element has such flexible features and also has a tendency to return to its initial general shape without permanent deformation once a force that causes such flexure is removed. Use of the term "semi-rigid" indicates that the described element may have some degree of flexibility or resiliency.

Also, the drawings of the apparatus that are presented herein are not necessarily to scale (i.e., a part feature that measures one inch on the printed patent application document may not necessarily be one inch long); however the relative sizes of features shown in the figures are accurately depicted, apart from any distortion due to reproduction processes, as the patent drawings are derived from one or more three-dimensional computer graphics model(s) of the assembled apparatus and its component parts.

It is further noted that any use herein of relative terms such as "top," "bottom," "upper," "lower," "vertical," and "horizontal" are merely intended to be descriptive for the reader, and may be based on the depiction of those features within the figures for one particular position of the sash lock, and/or the ordinary orientation of a sash window in a dwelling; therefore such terms are not intended to limit the orientation with which the disclosed sash lock may be utilized.

A sash lock assembly 100 is configured for screwless installation of a portion thereof with respect to an opening in a meeting rail of a sash window.

In accordance with at least one embodiment, the sash lock 100, as seen in FIG. 1, may broadly include a housing 110, a shaft/handle member 140, and a cam 150.

The housing 110 is shown in detail in FIG. 2 through FIG. 9. The housing 110 generally includes: a top wall 115, a front wall 120, and a rear wall 125.

Figure 7:
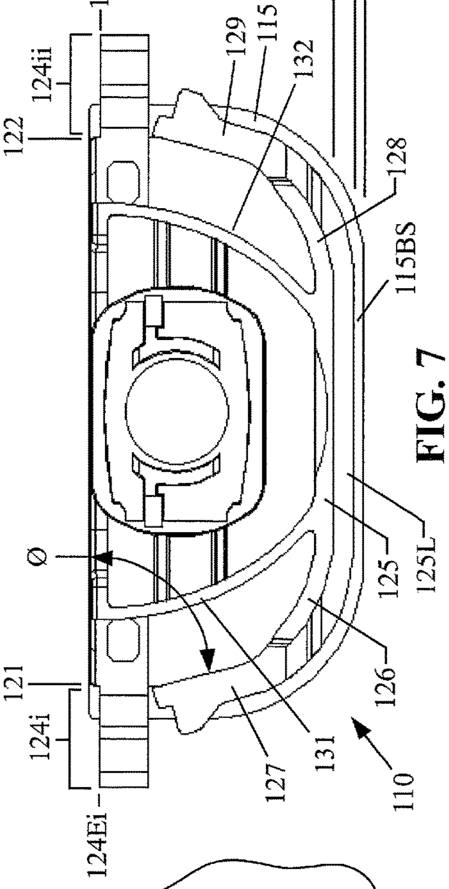
FIG. 7 is a bottom view of the housing shown in FIG. 1.

The top wall 115 may extend from a first end 111 to a second end 112, and from a first side 113 to a second side 114. A portion of the top wall 115 may be formed to include a substantially flat bottom surface 115BS (see FIG. 8) that may be positioned near the rear wall 125, and may extend between at least a portion of the first end 111 and the second end 112, and may extend at least a short distance away from the first side 113 towards the second side 114. The top wall 115 may also be formed with a hole 116 that may receive the shaft/handle member 140, as discussed hereinafter. Also, a central portion of the bottom surface of the top wall 115, as best seen in FIG. 7, may be formed to include a plurality of protruding features that may interact with the cam 150 and/or the shaft/handle member 140 (e.g., one or more protruding stop members to limit pivotal movement of the cam and/or the shaft/handle member in one or two directions of travel).

Figure 5:
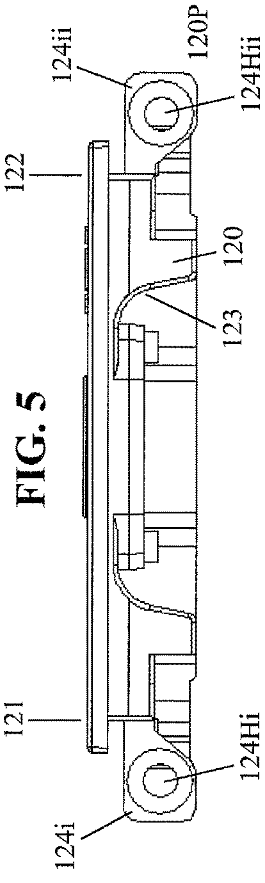
FIG. 5 is a front view of the housing shown in FIG. 1.
Figure 7A:
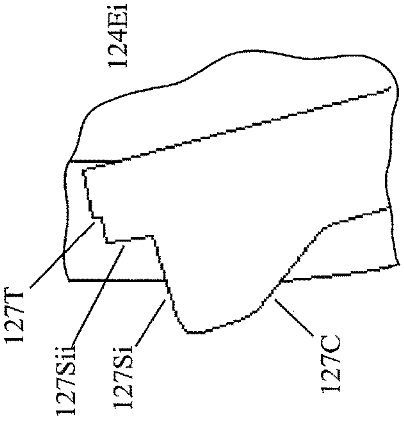
FIG. 7A is a view showing an enlarged portion of the bottom view of FIG. 7.
Figure 7B:
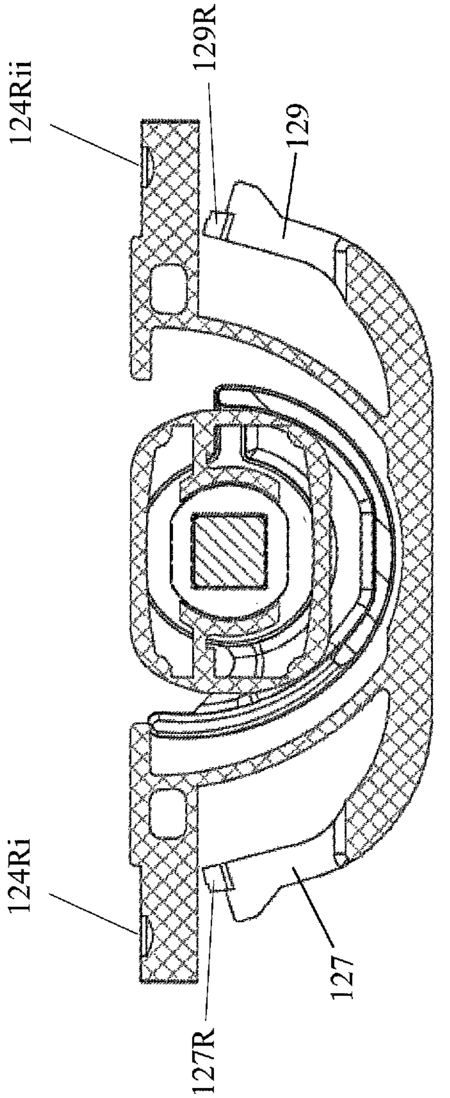
FIG. 7B shows an alternate embodiment of the housing of FIG. 7.
Figure 10:
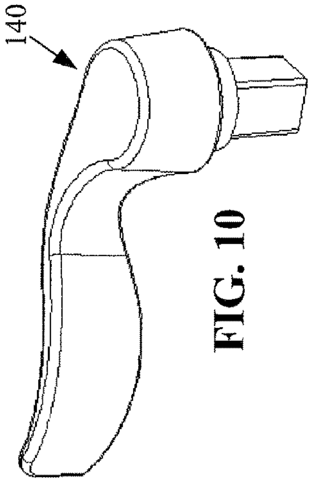
FIG. 10 is a perspective view of the shaft/handle member shown in FIG. 1.
Figure 15:
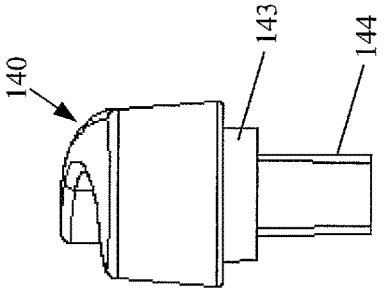
FIG. 15 is a right side view of the shaft/handle member shown in FIG. 10.
Figure 12:
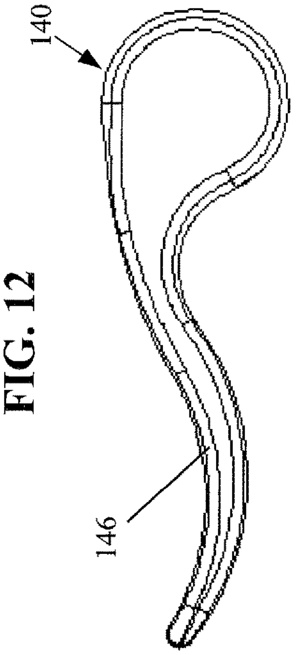
FIG. 12 is a top view of the shaft/handle member shown in FIG. 10.
Figure 11:
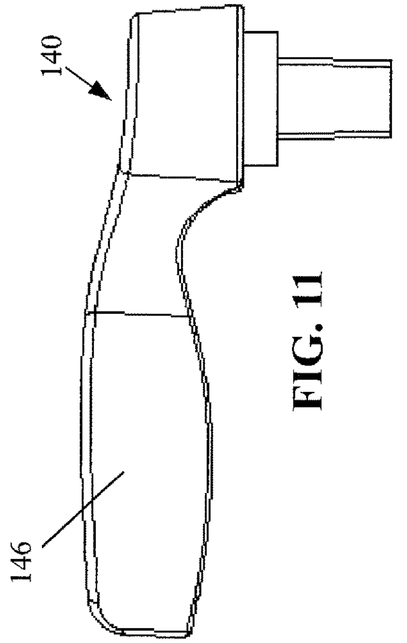
FIG. 11 is a front view of the shaft/handle member shown in FIG. 10.
Figure 13:
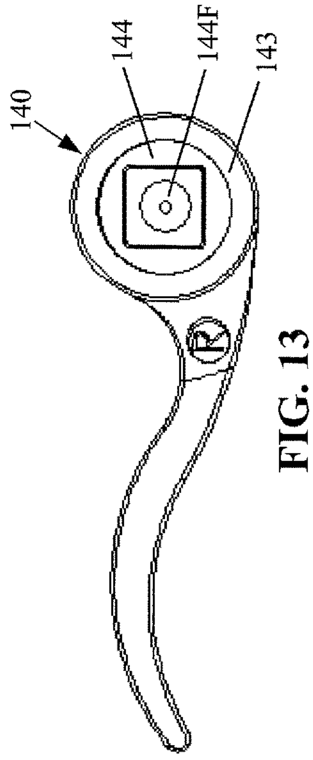
FIG. 13 is a bottom view of the shaft/handle member shown in FIG. 10.
Figure 14:
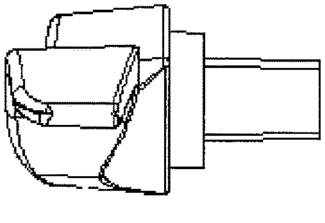
FIG. 14 is a left side view of the shaft/handle member shown in FIG. 10.
Figure 16:
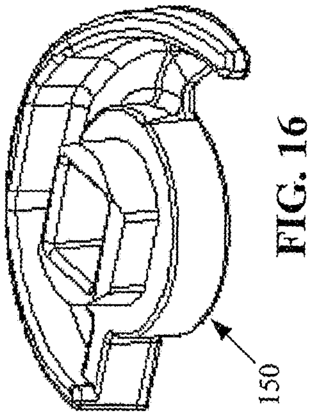
FIG. 16 is a perspective view of the cam shown in FIG. 1.
Figure 21:
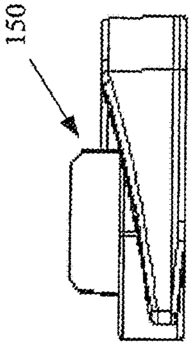
FIG. 21 is a right side view of the cam shown in FIG. 16.
Figure 18:
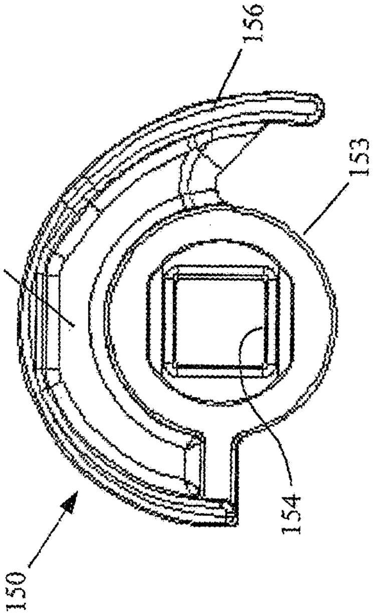
FIG. 18 is a top view of the cam shown in FIG. 16.
Figure 17:
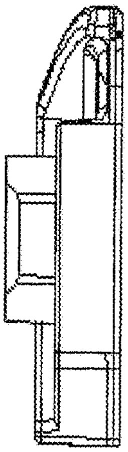
FIG. 17 is a front view of the cam shown in FIG. 16.
Figure 19:
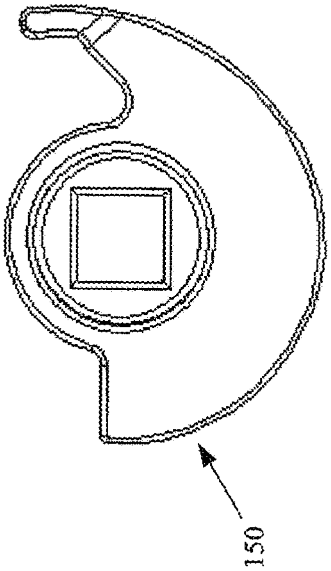
FIG. 19 is a bottom view of the cam shown in FIG. 16.
Figure 20:
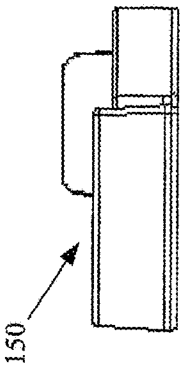
FIG. 20 is a left side view of the cam shown in FIG. 16.
Figure 22A:
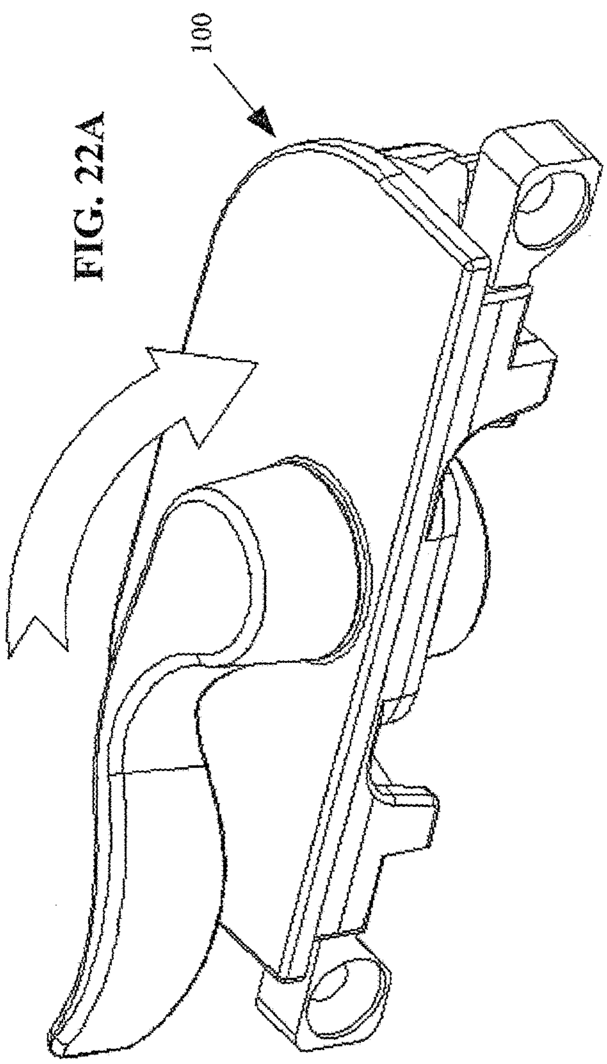
FIG. 22A is a first perspective view of the sash lock assembly formed from the component parts of FIG. 1, being shown with the shaft/handle member in a first position at which the cam is retracted into the housing and is unlocked when installed on the meeting rail of the sash window.
Figure 22B:
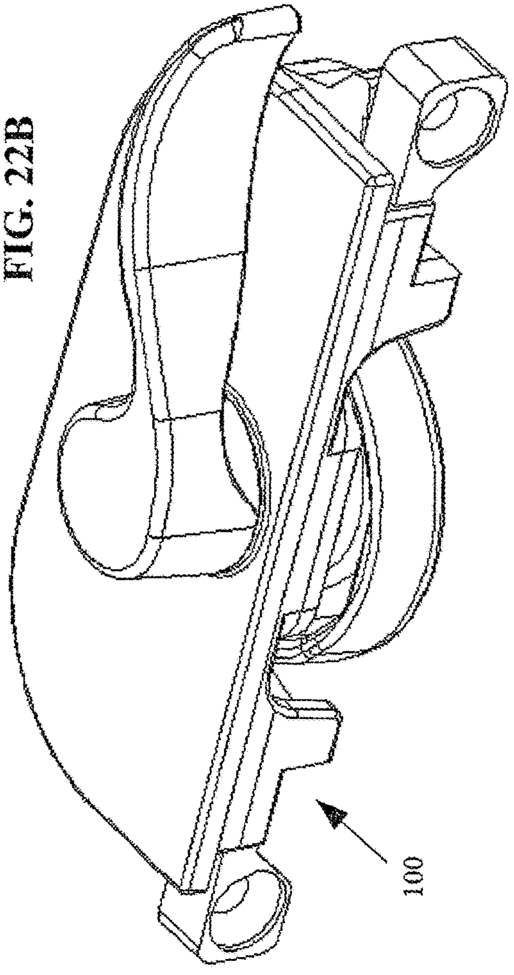
FIG. 22B is a second perspective view of the sash lock assembly of FIG. 22A, being shown with the shaft/handle member in a second position, at which the cam is extended out from the housing and would be locked with respect to a corresponding keeper, when the sash lock is installed on the meeting rail of the sash window.
Figure 23B:
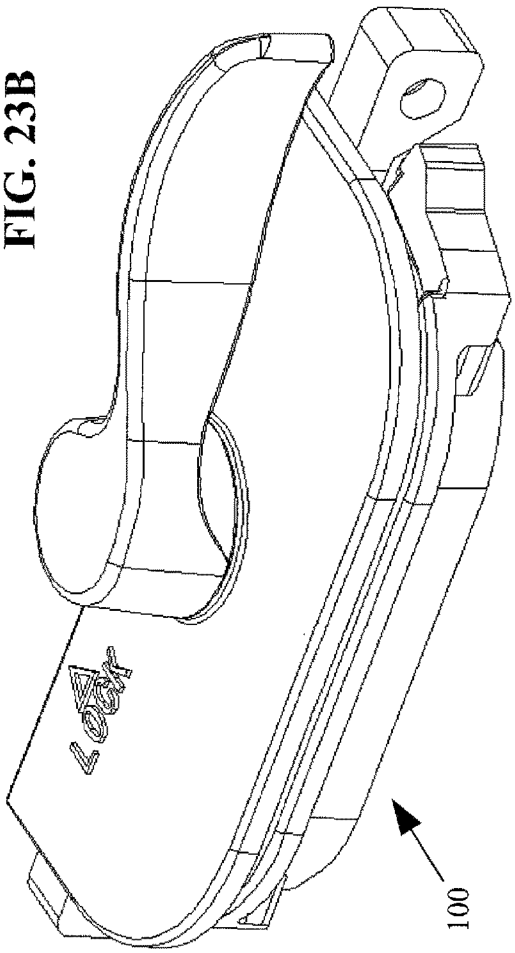
FIG. 23B is a fourth perspective view of the sash lock assembly of FIG. 22A.
Figure 23A:
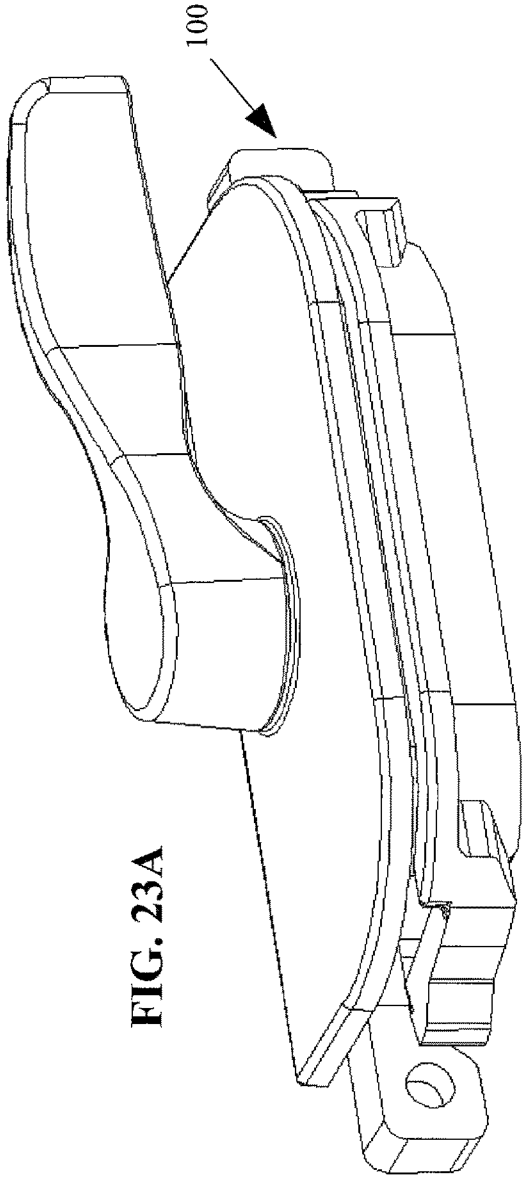
FIG. 23A is a third perspective view of the sash lock assembly of FIG. 22A.
Figure 24A:
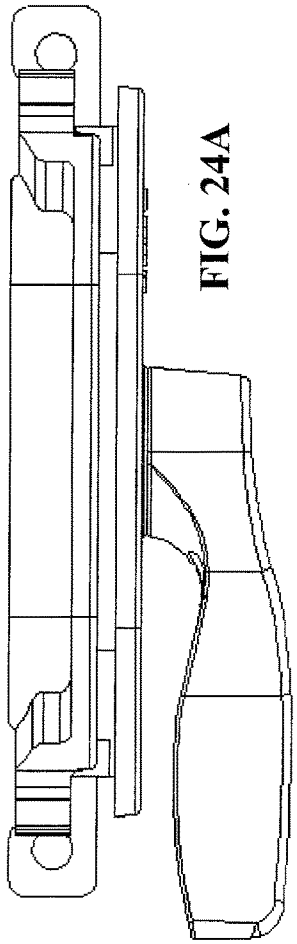
FIG. 24A is a rear view of the sash lock assembly of FIG. 22A.
Figure 25:
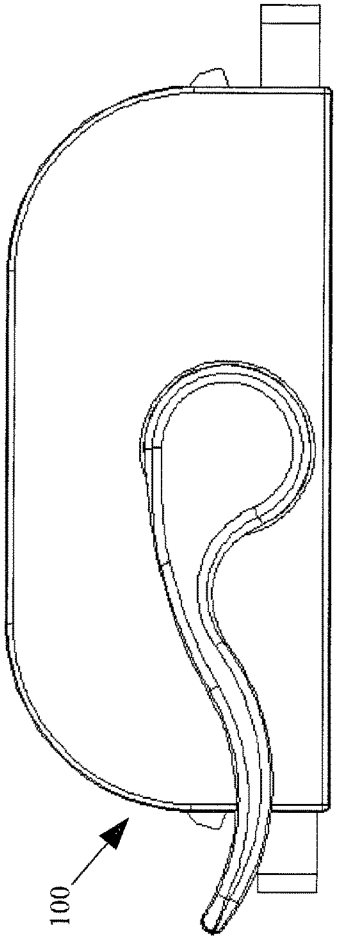
FIG. 25 is a top view of the sash lock assembly of FIG. 22A.
Figure 24:
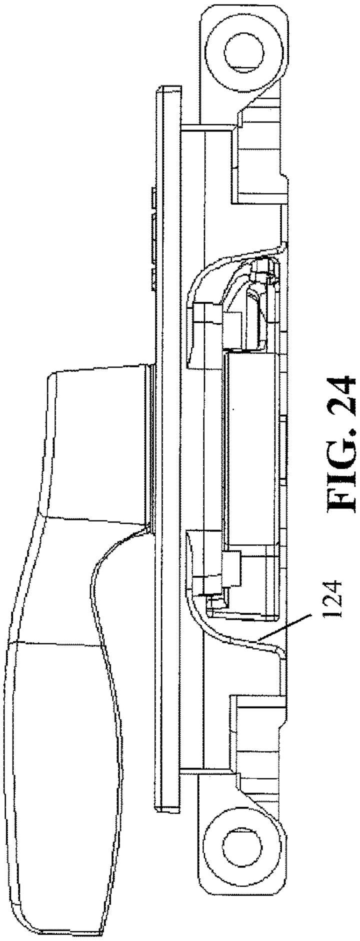
FIG. 24 is a front view of the sash lock assembly of FIG. 22A.
Figure 26:
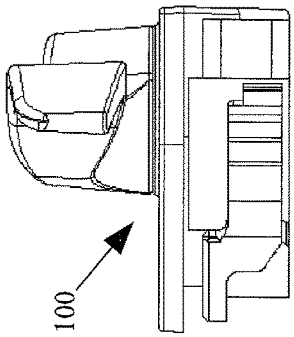
FIG. 26 is a left side view of the sash lock assembly of FIG. 22A.

The front wall 120 of the housing 110 may be formed to protrude away from the top wall 115, and may be generally perpendicular thereto. The front wall 120 may extend down a distance from the top wall 115 to a surface 120P that may be planar, and the front wall may have a generally central portion extend between a first end 121 and a second end 122. The ends 121 and 122 of the front wall 120 may fall just short of the ends 111 and 112 of the top wall, as may be seen in FIG. 5 and FIG. 7, so that the first end 111 and the second end 112 of the top wall may each overhang beyond those end points 111/112 of the front wall. The front wall 120 may be formed to have an opening 123, to accommodate movement of a portion of the cam out from the housing cavity when the shaft/handle member is actuated to pivot (see FIG. 22A and FIG. 22B). Therefore, the opening 123 may be generally centered with respect to the hole 116 in the top wall 115 (see FIG. 22B and FIG. 24). The front wall 120 may optionally include a first protruding extension 124*i* and a second protruding extension 124*ii* as shown in FIG. 5, each having an engagement surface 124Ei/124Eii positioned to respectively contact first and second portions of the front wall of the meeting rail when the sash lock is installed thereon (see e.g., FIG. 31), as discussed hereinafter. Each of the first protruding extension 124*i* and the second protruding extension 124*ii* may have a respective through hole 124Hi/124Hii to accommodate a screw that may be used to redundantly secure the sash lock to the front wall of the meeting rail. As seen in FIG. 7B, instead of the through holes 124Hi/124Hii to accommodate a screw, a respective pair of recesses 124Ri and 124Rii may be used, which may be used to drilled a through hole, after the sash lock has been installed, if screws are to by utilized.

The rear wall 125 of the housing 110 may have a straight center portion formed to be offset from the front wall (see FIG. 7 and FIG. 2), with a first end of the straight center portion being curved at 126 and transitioning into a first cantilevered portion 127, and with a second end of the rear wall being curved at 128 and transitioning into a second cantilevered portion 129. The curved portions 126/128 may serve to orient the first and second cantilevered portions 127 and 129 at a small acute angle θ with respect to the front wall 120, as seen in FIG. 7. Each of the cantilevered portions 127 and 129, which may be formed as mirrored copies of each other, may terminate in a "barb." Each barb, as seen in the enlarged view of FIG. 7A, may be formed to include a cam surface (e.g., 127C) and a first stop surface (e.g., 127Si), and may also include a second stop surface (e.g., 127Sii), and a tool removal surface (e.g., 127T) that may be formed as a notch. Note that as seen in FIG. 7B, the end of the cantilevered portions 127 and 129 may have respective recesses 127R and 129R.

Figure 9:
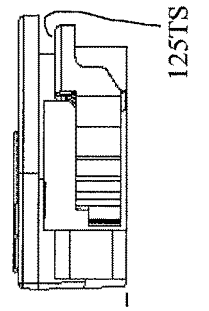
FIG. 9 is a right side view of the housing shown in FIG. 1.
Figure 9A:
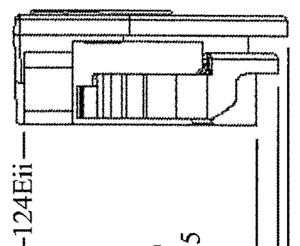
FIG. 9A is the right side view of FIG. 9, but shown rotated ninety degrees.

Protruding from the rear wall 125 may be a lip 125L that may have a substantially flat top surface 125TS (see FIG. 9).

Figure 4:
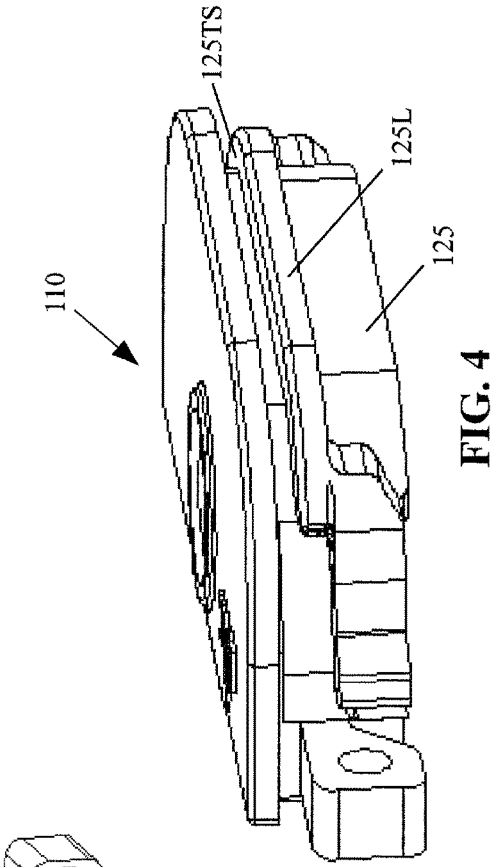
FIG. 4 is a side perspective view of the housing shown in FIG. 1.
Figure 6:
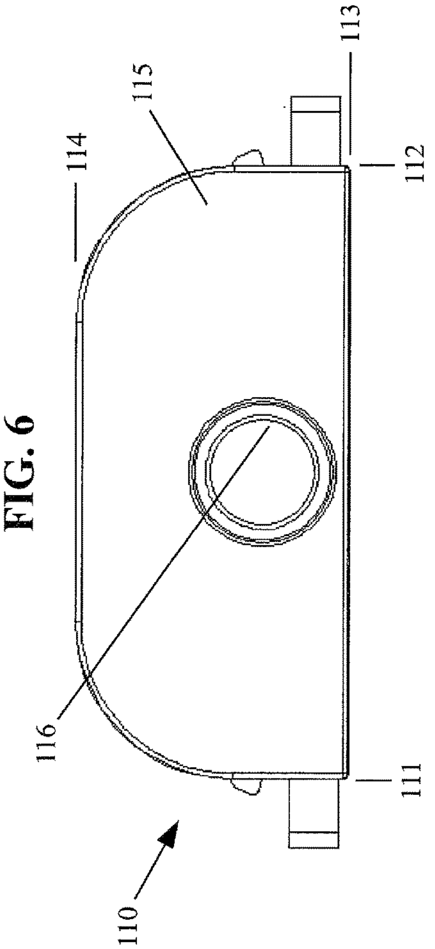
FIG. 6 is a top view of the housing shown in FIG. 1.
Figure 8:
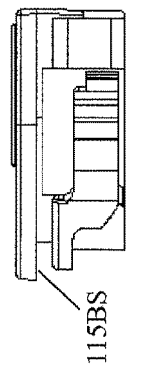
FIG. 8 is a left side view of the housing shown in FIG. 1.

The substantially flat top surface 125TS of the lip 125L may be parallel to, and offset a small distance from, the substantially flat bottom surface 115BS of the top wall 115, as seen in FIG. 8, FIG. 9, and FIG. 4. The housing may also have a pair of walls 131 and 132 that may extend from the straight center portion of rear wall 125 to the front wall 120 to form a smaller cavity region that may surround the cam 150 when it is installed therein, whereas the top wall 115, the front wall 120, and the rear wall 125 together may generally form a larger housing cavity that is not completely enclosed (see FIG. 2).

As seen in FIGS. 10-15, a shaft/handle member 140 may have a cylindrical shaft portion 143, one end of which may have a keyed protrusion 144 extending therefrom, with an orifice 144F formed in the shaft portion. In one embodiment, the other end of the shaft 143 may have a knob or other enlarged circular cross-sectional shape formed thereon to permit that end of the shaft to be easily grasped by the user, and in another embodiment, the other end of the shaft 143 may have an elongated graspable handle portion 146 that may extend generally orthogonally with respect to the axis of cylindrical shaft portion 143. The cylindrical shaft portion 143 may be configured to be pivotally mounted within the hole 116 of the housing 110. The keyed protrusion 144 may be any suitable cross-sectional shape, and in this example, the keyed protrusion is formed using the rectangular shape shown in FIG. 13.

The cam 150 is shown in FIGS. 16-21, and may have a cylindrical hub 153, with a keyed opening 154 that may be shaped to match the keyed protrusion 144 of the shaft/handle member 140. Extending laterally away from the hub 153 may be a wall 155, and extending laterally away from the wall 155 may be a curved cam wall 156, both of which may be used to engage and lock with respect to the key of a corresponding keeper, and to draw the sliding sash window in closer proximity to the master window frame (or to the other sash window for a double-hung arrangement). The opening 154 may be a through opening, so that the keyed protrusion 144 of the shaft/handle member 140 may be received therein, and the end of the protrusion may be sized and shaped to be bucked (i.e., upset) like a rivet, for securing of the cam 150 to the end of the shaft. Alternatively, opening 154 in the cam 150 may not be a through opening, and a screw may be received in the orifice 144F of the shaft/handle member 140 to secure the cam to the shaft/handle member. The cam 150 being so secured to the shaft/handle member 140 within the housing cavity is thereby pivotable in accordance with movement of the handle, being configured to pivot between a retracted position, and an extended position where a portion of the cam protrudes out from the opening in the front wall (FIG. 22B), as described above.

Figure 27:
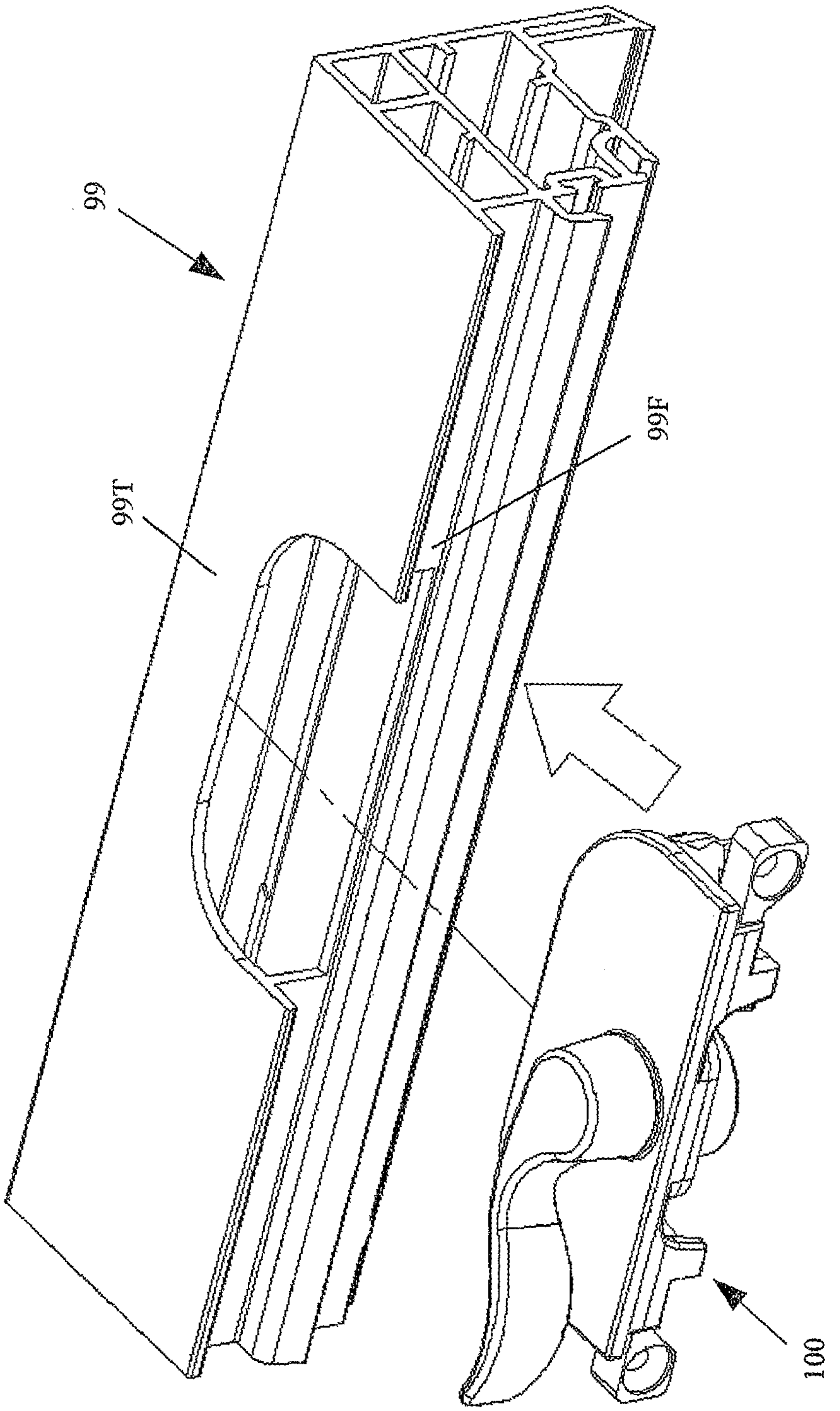
FIG. 27 is a perspective view showing the sash lock assembly of FIG. 22A, just prior to being installed on a meeting rail configured to receive the sash lock.
Figure 28A:
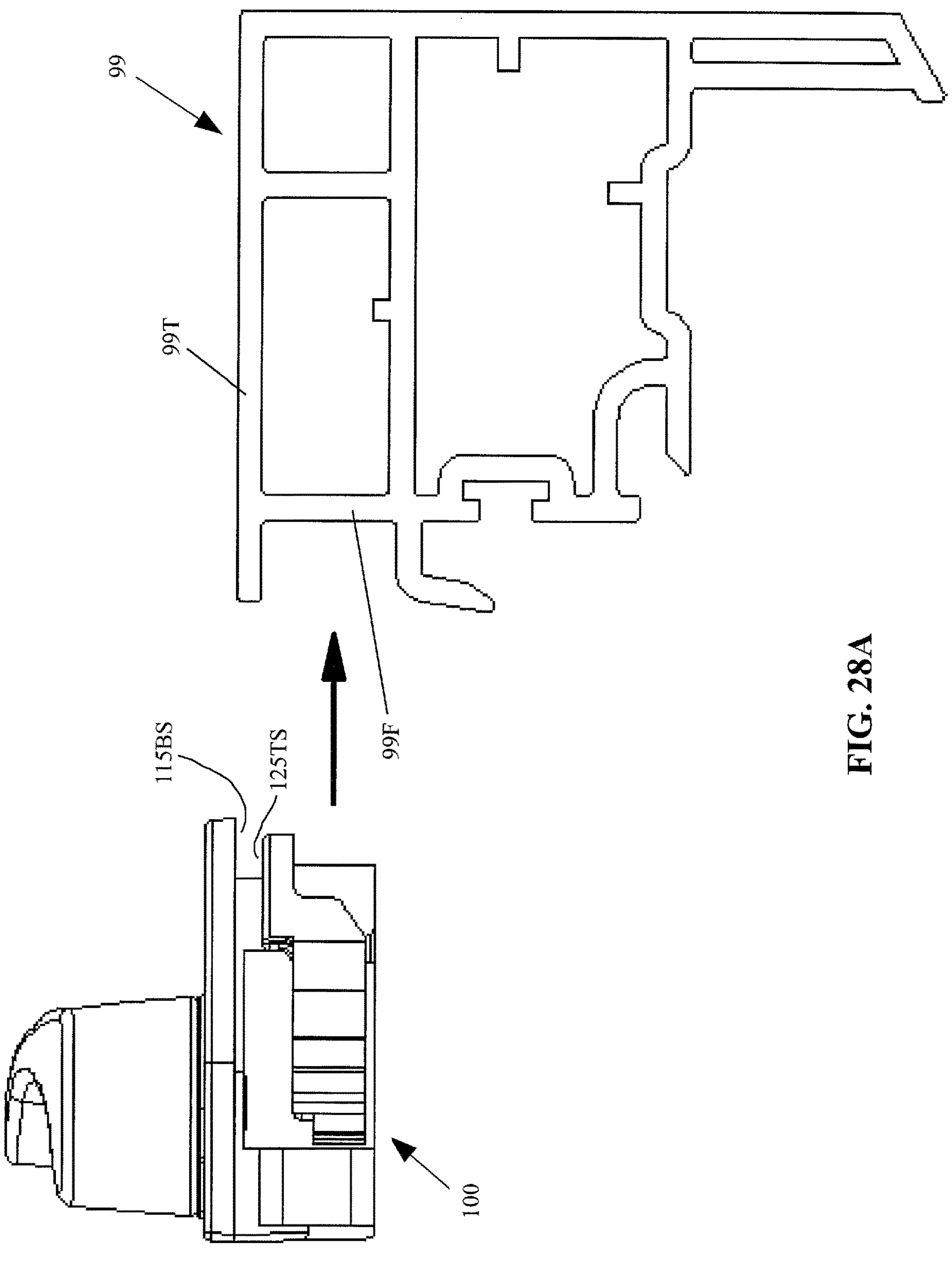
FIG. 28A is an end view showing the sash lock assembly of FIG. 22A, just prior to being installed on a meeting rail configured to receive the sash lock.
Figure 28B:
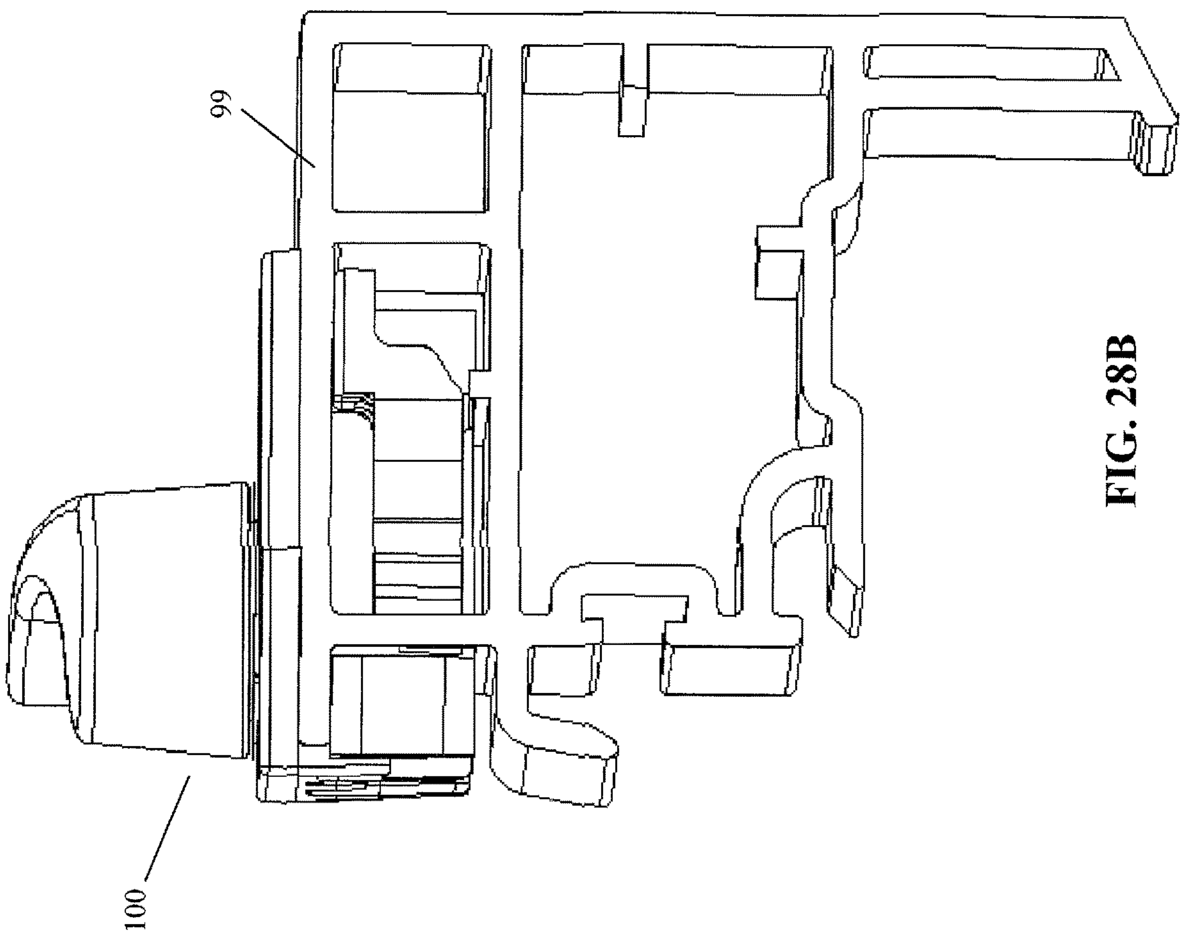
FIG. 28B is a perspective view showing the sash lock assembly of FIG. 22A, just after being installed on a meeting rail configured to receive the sash lock.

Installation of the sash lock assembly 100 onto the meeting rail 99 is shown in FIG. 27, FIGS. 28A-28B, and FIGS. 29A-29B. As seen in FIG. 27, the meeting rail 99 will have a particularly formed opening in a portion of the front wall 99F (e.g., a rectangular-shaped opening), and a particularly formed opening in a portion of the top wall 99T (e.g., a rectangular shape that may have rounded corners at it distal end), into which meeting rail portions the sash lock assembly 100 will be inserted.

Figure 29A:
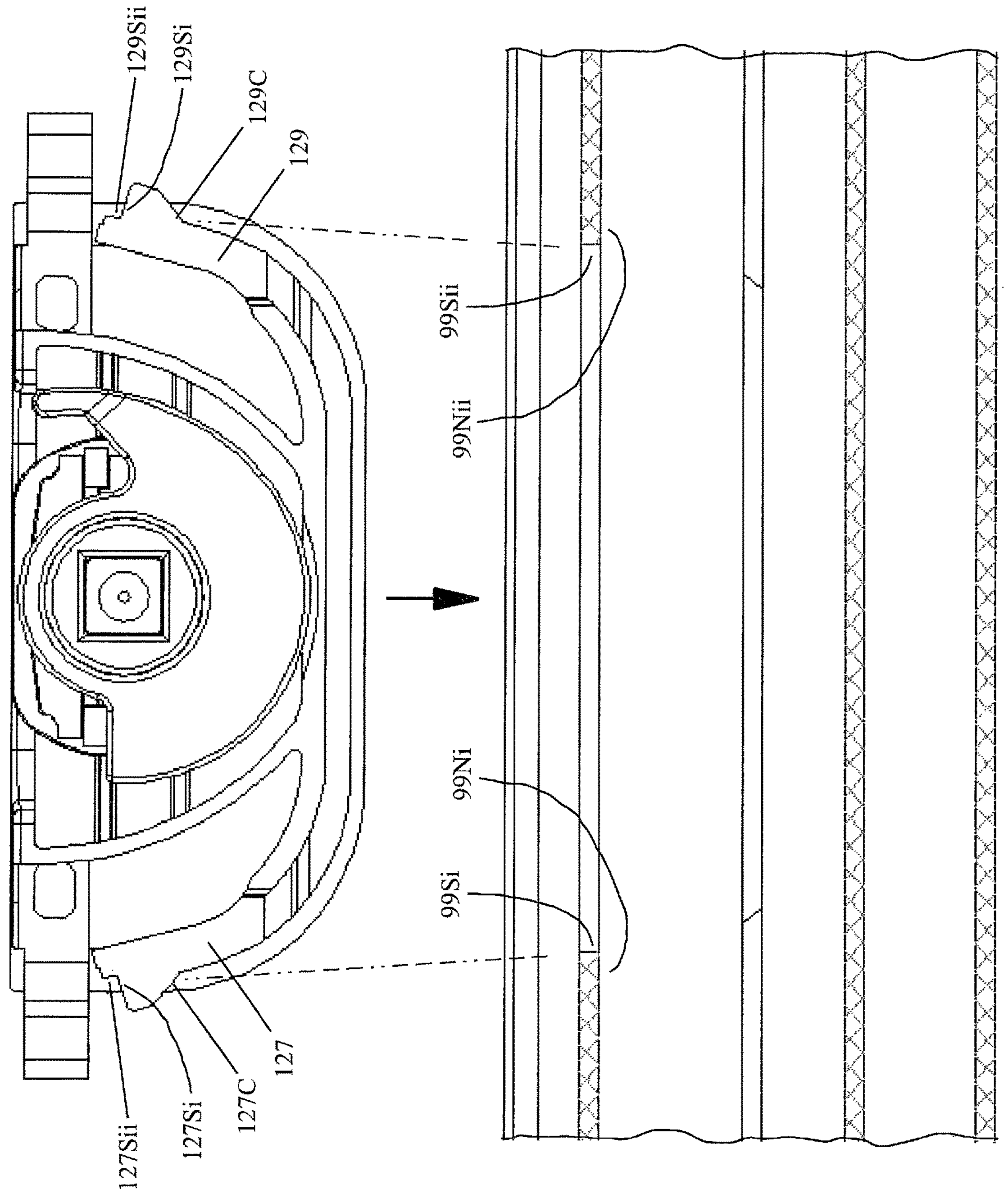
FIG. 29A is a bottom view of the sash lock assembly of FIG. 22A and a cross-sectional view through the corresponding meeting rail, with each being shown just prior to the sash lock being installed onto the meeting rail.
Figure 29B:
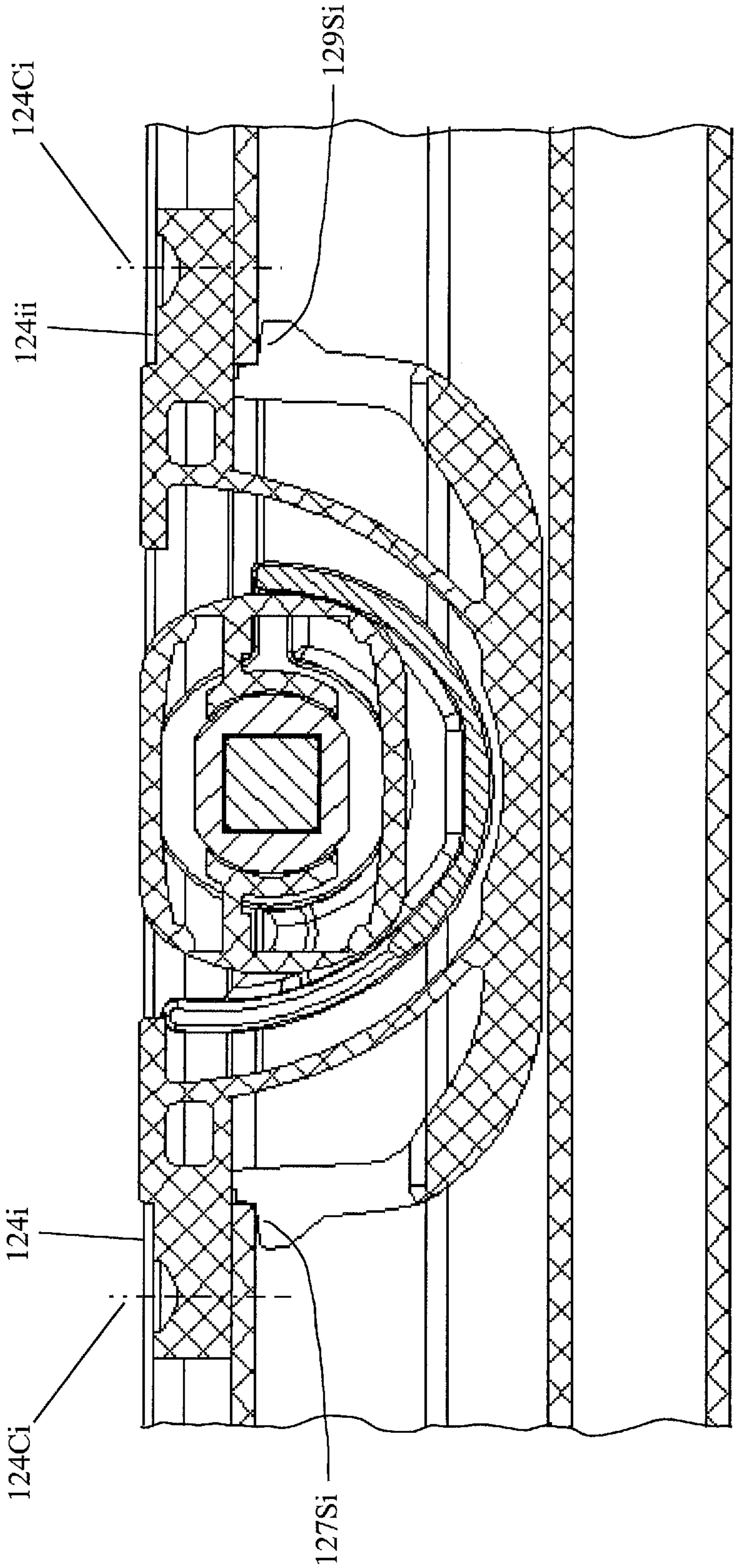
FIG. 29B is a cross-sectional view through the installed sash lock assembly and the corresponding meeting rail of FIG. 29A.
Figure 30A:
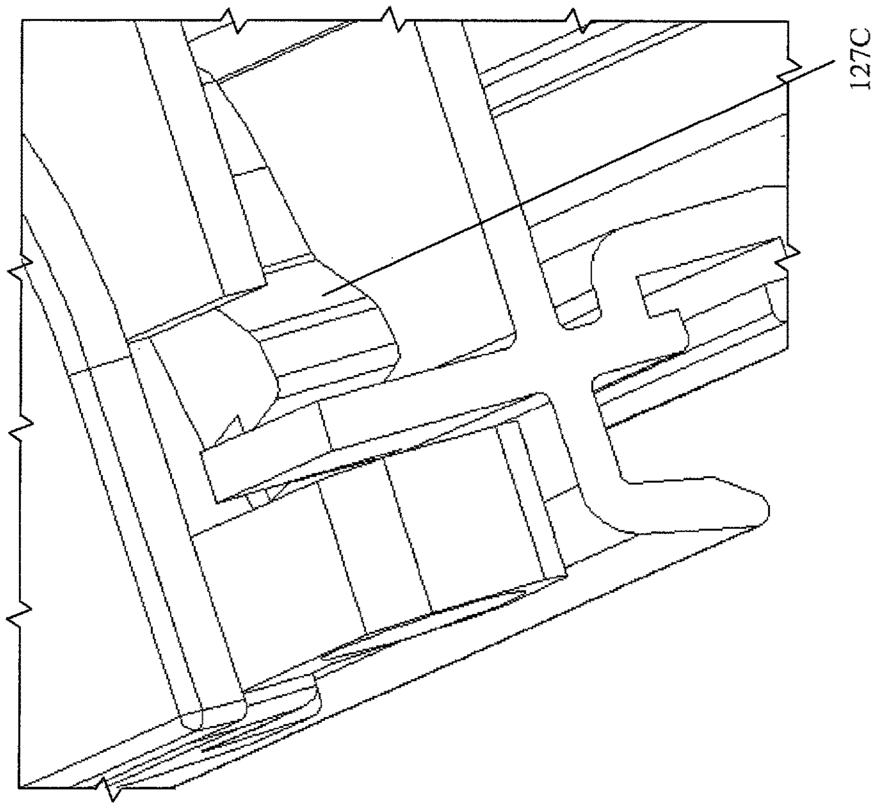
FIG. 30A shows an enlarged portion of the perspective view of FIG. 30.
Figure 30:
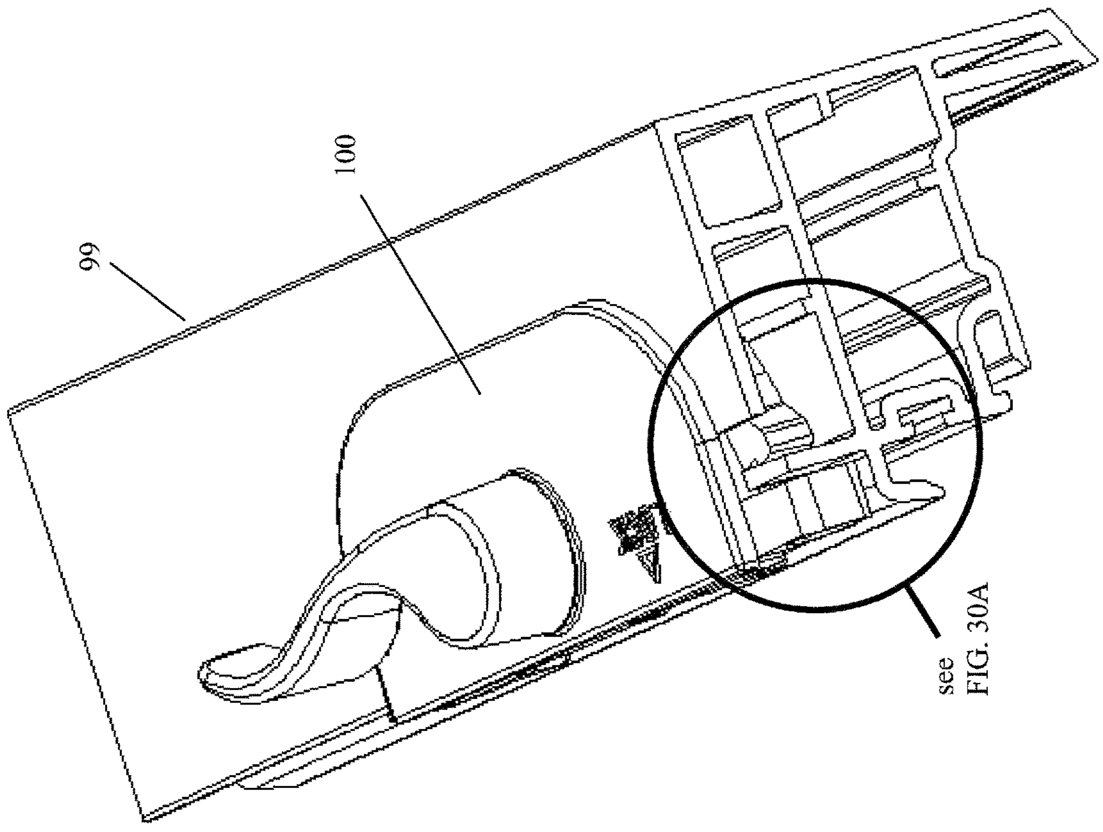
FIG. 30 is a perspective view showing the sash lock assembly of FIG. 22A, just after being installed on a meeting rail configured to receive the sash lock.

As may be understood from FIG. 29A, as the housing 110 of the sash lock assembly 100 is being inserted through those openings in the meeting rail 99, the cam surfaces 127C and 129C of the barbs on the housing 110 will contact the ends of the opening in the meeting rail 99 and be progressively deflected further inwardly, until the sash lock assembly is fully inserted into the opening. Once the sash lock assembly is fully inserted into the opening, each of the cantilevered portions 127 and 129 will be biased outwardly such that the contact surfaces 127Sii and 129Sii may each contact first and second side-facing surfaces 99Si and 99Sii of the front wall of the meeting rail 99, as seen in FIG. 29B. (Note that for the sash lock to be "fully inserted," in order for such outward biasing to occur, the force being applied to the housing of the lock may need to be sufficient to cause some deflection/deformation of the first protruding extension 124*i* and a second protruding extension 124*ii*). Also, after the sash lock 100 is fully inserted and the force is removed, the contact surfaces 127Si and 129Si of the cantilevered portions 127 and 129 may also thereby contact the interior surface portions 99Ni and 99Nii of the front wall of the meeting rail 99, and may thereby releasably prevent removal of the sash lock assembly 100 from it engagement with the meeting rail. Also, as the sash lock assembly 100 is being inserted into that installation position with respect to the meeting rail 99, the substantially flat bottom surface 115BS of the top wall 115 and the substantially flat top surface 125TS of the lip 125L may engage a top surface and a bottom surface of the top wall 99T of the meeting rail (see FIG. 28A and FIG. 28B). This "engagement" may be in the form of the top wall 99T of the meeting rail nesting between the substantially flat bottom surface 115BS of the top housing wall 115 and the substantially flat top surface 125TS of the lip 125L in either a friction (interference) fit, or a slight clearance fit.

Similarly, left and right side portions of the front wall 99F of the meeting rail 99 (i.e., portions on opposite sides of the opening in the front wall) may be respectively nested between (be engaged by) the first protruding extension 124*i* of the housing and the contact surface 127Si of the cantilevered portion 127 on one side, and between the second protruding extension 124*ii* and the contact surface 129Si of the cantilevered portion 129 on the other side (see FIG. 29B), which engagement may be a slight clearance fit or a friction (interference) fit. Although they are not required to completer installation of the sash lock 100, screws may be driven through the centers 124Ci/124Cii of the holes 124Hi/124Hii in the first and second protruding extensions 124*i* and 124*ii* of the front wall 120, to redundantly secure the sash lock assembly 100 to the meeting rail 99.

Figure 31:
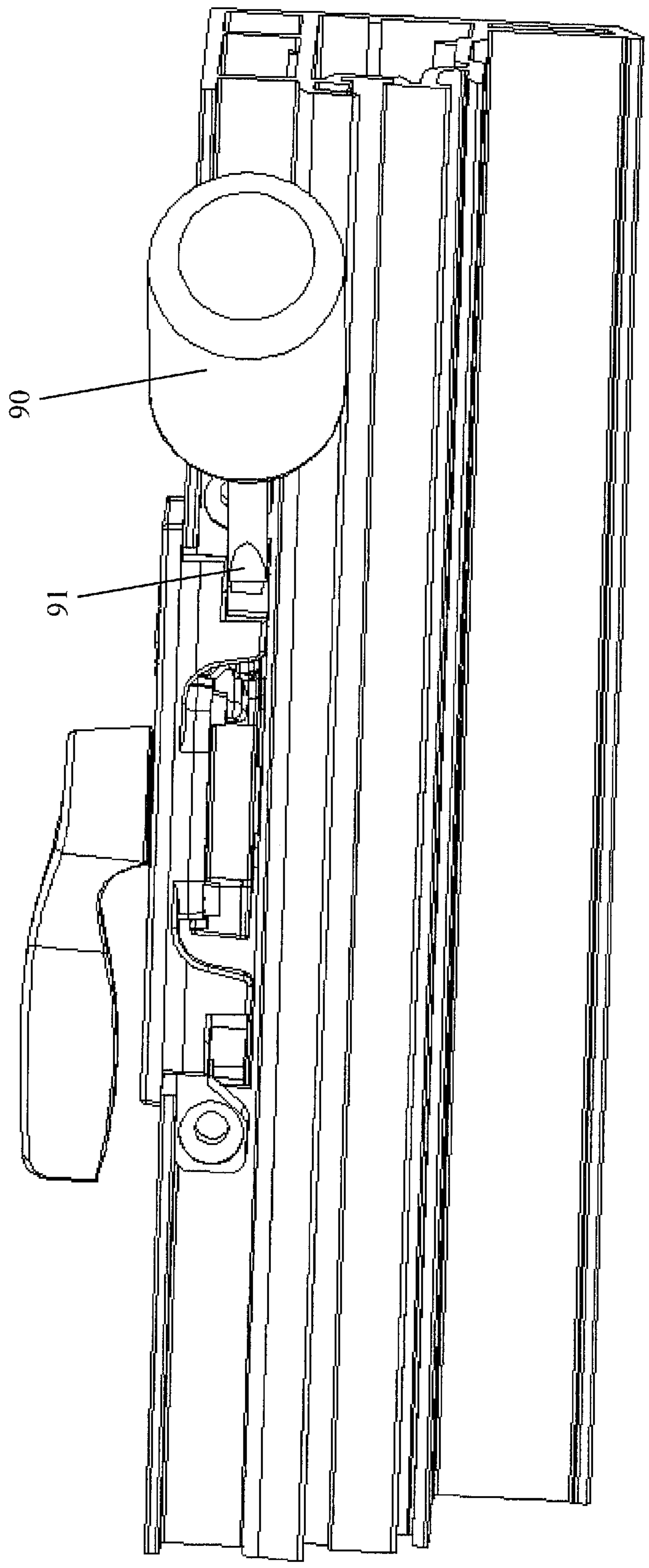
FIG. 31 is a perspective view of the sash lock assembly of FIG. 22A installed on the corresponding meeting rail, shown with a screwdriver blade being used to engage a tool removal surface of one of the cantilevered portions of said rear wall of the lock housing to cause it to deflect to permit disengagement and removal of the sash lock housing from the meeting rail.
Figure 32:
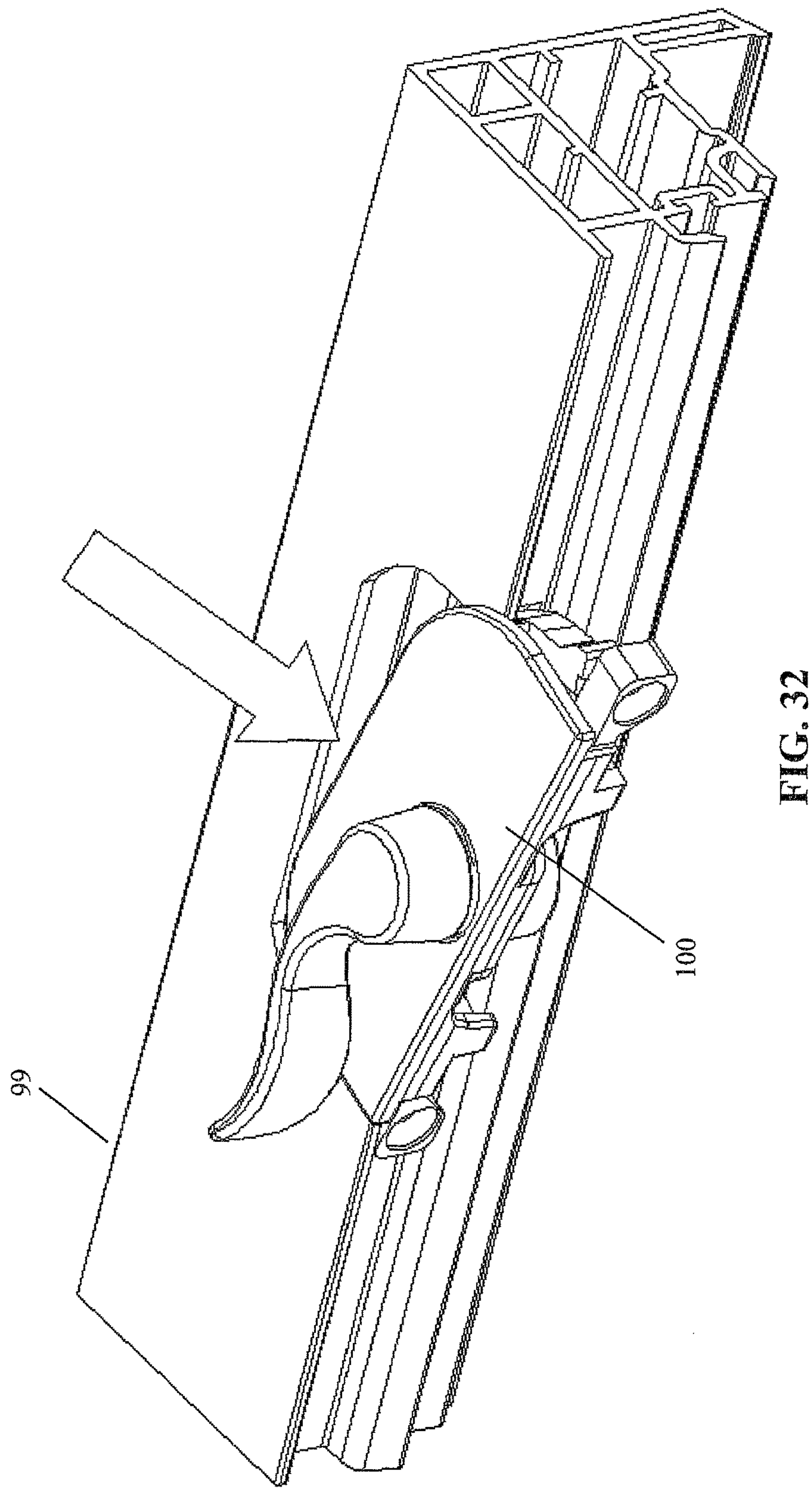
FIG. 32 is a perspective view of the sash lock assembly and the corresponding meeting rail of FIG. 31, shown with the sash lock initially being snapped out from its installed position on the meeting rail.
Figure 33:
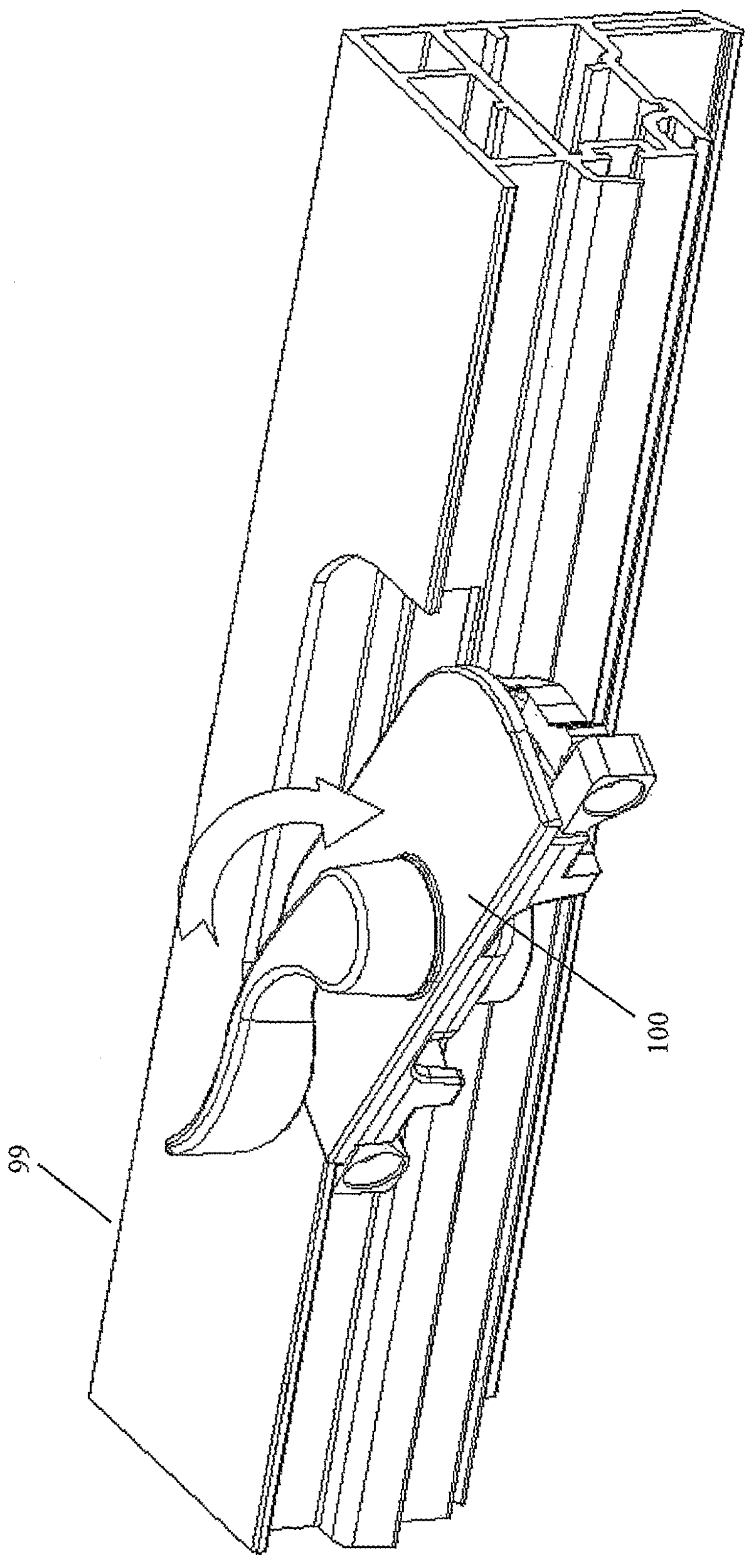
FIG. 33 is a perspective view of the sash lock assembly and the corresponding meeting rail of FIG. 32, shown with the sash lock after being further rotated away from its installed position on the meeting rail.
Figure 34A:
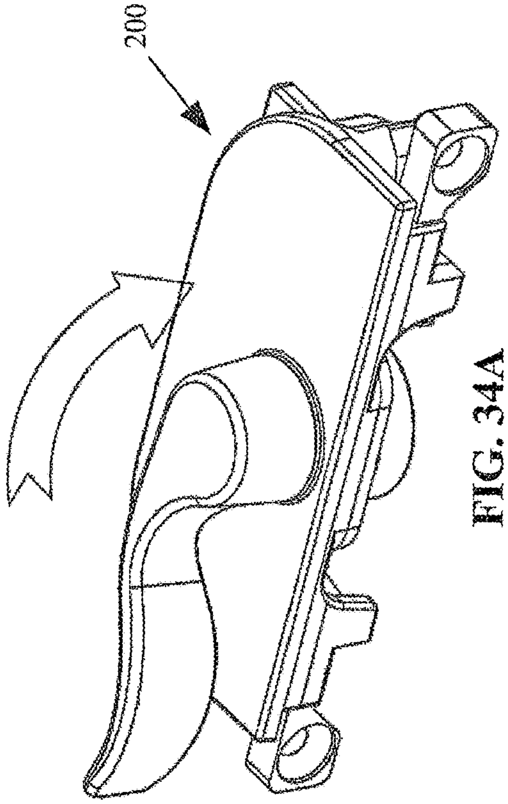
FIG. 34A and FIG. 34B are first and second perspective views of another sash lock embodiment.
Figure 34B:
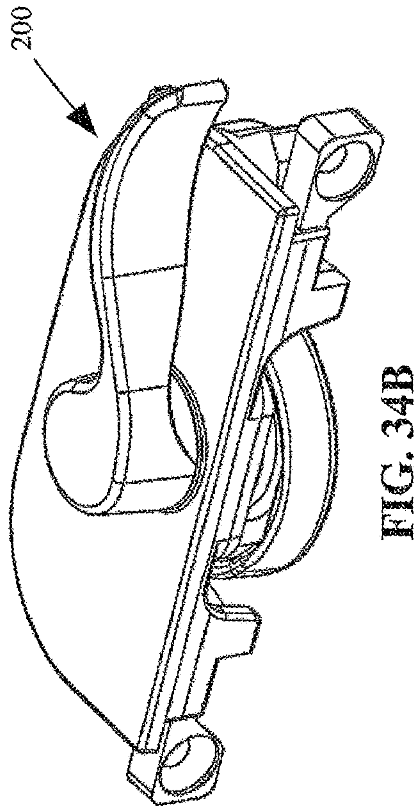
Figure 35:
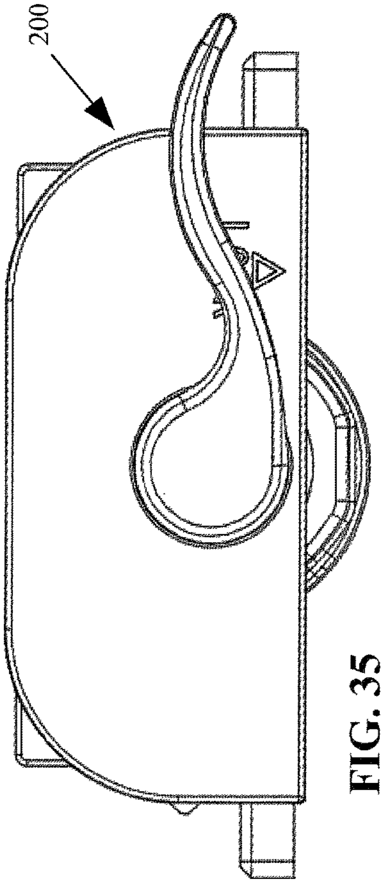
FIG. 35 is a top view of the sash lock assembly of FIG. 34A.
Figure 36:
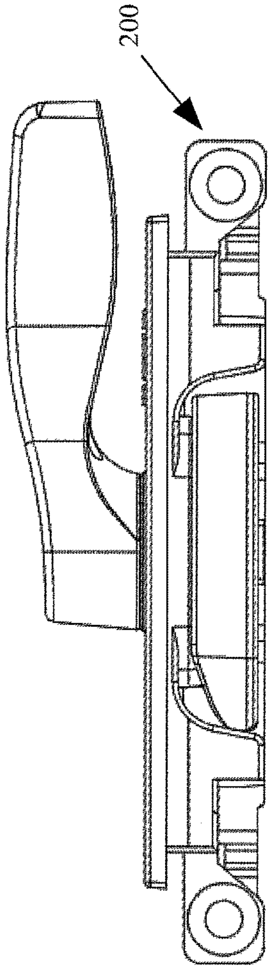
FIG. 36 is a front view of the sash lock assembly of FIG. 34A.
Figure 37:
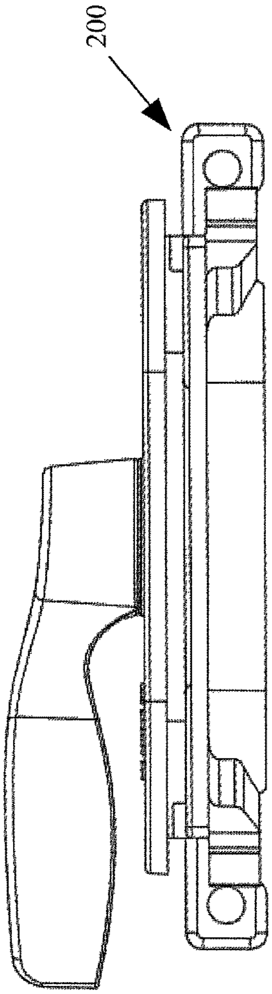
FIG. 37 is a rear view of the sash lock assembly of FIG. 34A.
Figure 40:
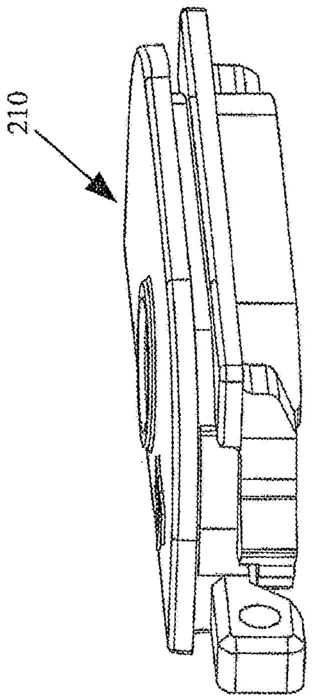
FIG. 38, FIG. 39, and FIG. 40 are first, second and third perspective views of the housing used to form the sash lock assembly of FIG. 34A.
Figure 38:
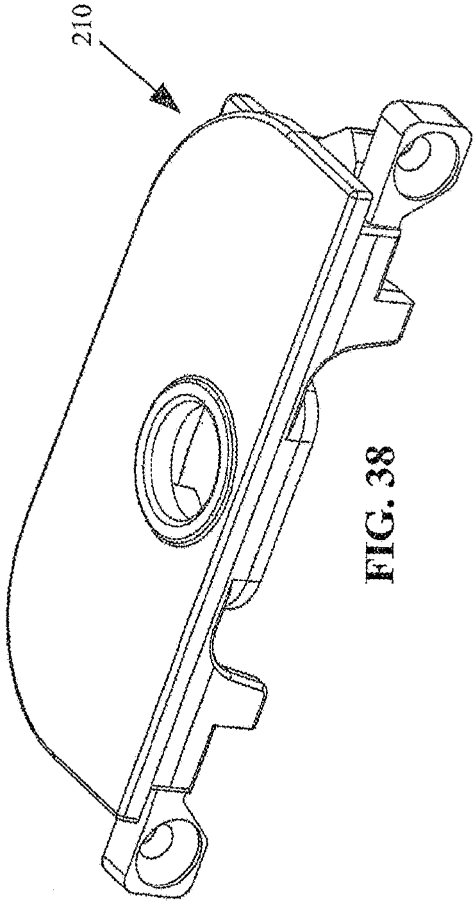
Figure 39:
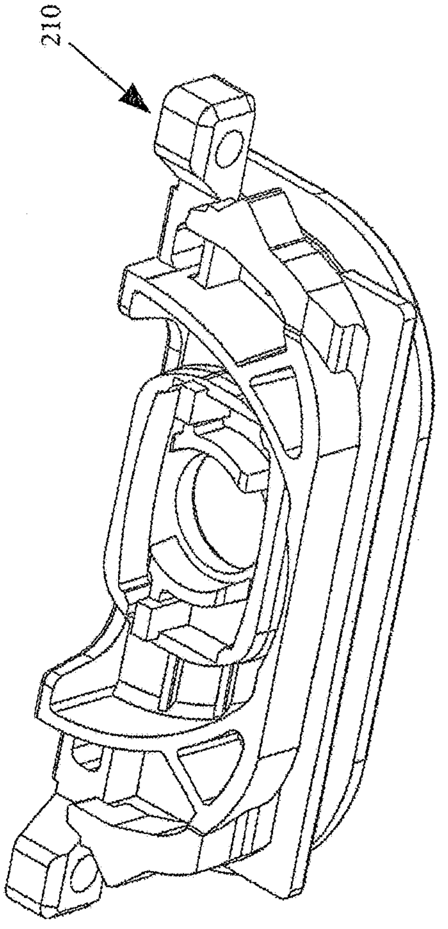

As seen in FIG. 31, a tool such as the end of the blade 91 of a screwdriver 90 may be used to contact and apply a force to the tool removal surface 127T on the barb of one of the cantilevered portions (127 or 129), to overcome the biasing provided by that cantilevered portions and deflect/deform it, to effect removal of the sash lock assembly from the meeting rail 99, as shown in FIGS. 32-33.

Note that the housing 110 may be used with many other different sash locks that utilize different cam configurations and/or different shaft/handle member configurations.

Figure 41:
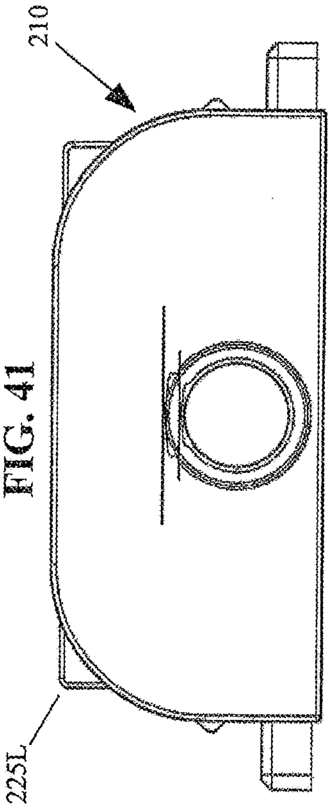
FIG. 41 is a top view of the housing used to form the sash lock assembly of FIG. 34A.
Figure 42:
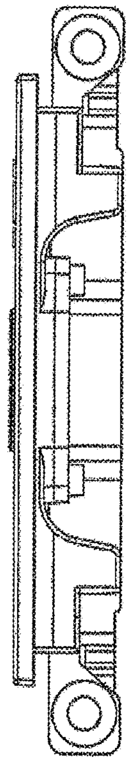
FIG. 42 is a front view of the housing used to form the sash lock assembly of FIG. 34A.
Figure 43:
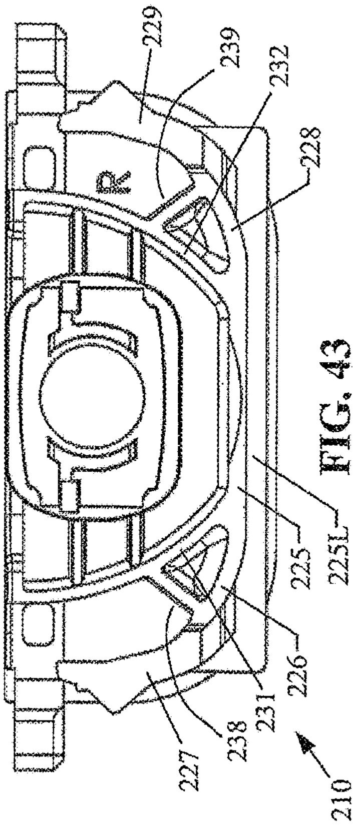
FIG. 43 is a bottom view of the housing used to form the sash lock assembly of FIG. 34A.

FIG. 34A, FIG. 34B, and FIGS. 35-37 show views of another sash lock embodiment, sash lock assembly 200. The sash lock assembly 200 may be formed substantially similar to the sash lock assembly 100, but may instead use the housing 210 shown in FIGS. 38-43. The housing 210 may be formed substantially the same as the housing 110, with several notable differences that are reflected in those figures. The housing 210 may have a lip 225L protruding from the wall 225 that may be generally rectangular, with rounded corners, as seen in FIG. 41 and FIG. 43. Stiffeners 238 and 239 may respectively extend from the walls 231 and 232 and may interconnect with curved wall portions 226 and 228, respectively, to provide additional support for the cantilevered members 227 and 229, thereby reducing the cantilever distance.

Figure 43A:
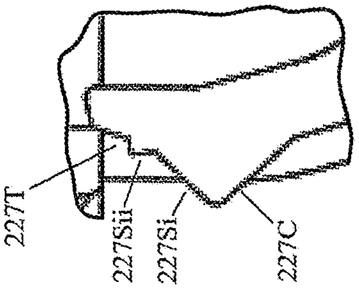
FIG. 43A is a view showing an enlarged portion of the bottom view of FIG. 43.
Figure 44:
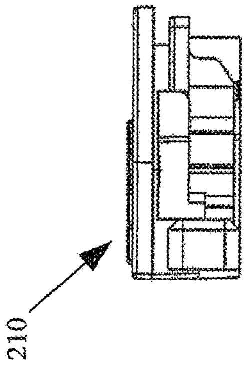
FIG. 44 is a left-side view of the housing used to form the sash lock assembly of FIG. 34A.
Figure 45:
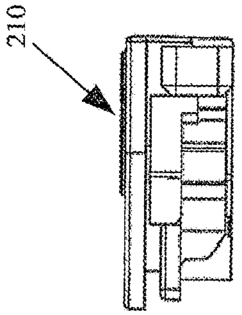
FIG. 45 is a right-side view of the housing used to form the sash lock assembly of FIG. 34A.
Figure 46:
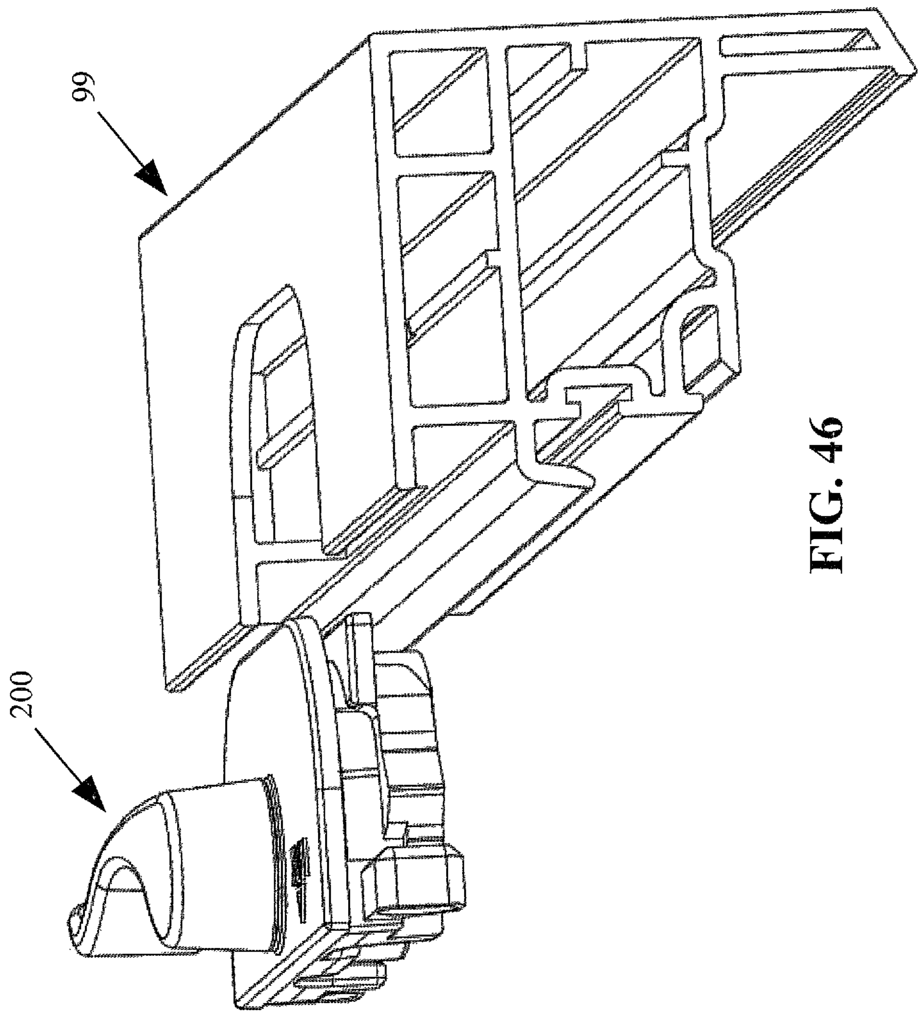
FIG. 46 is a perspective view showing the sash lock assembly of FIG. 34A, just prior to being installed on a meeting rail configured to receive the sash lock.

Each of the cantilevered portions 227 and 229 may similarly terminate in a "barb." Each barb, as seen in the enlarged view of FIG. 43A, may be formed to include a cam surface (e.g., 227C) and a first stop surface (e.g., 227Si), and may also include a second stop surface (e.g., 227Sii), and a tool removal surface (e.g., 227T) that may be formed as a notch or the angled surface as shown in FIG. 43A. These surfaces may engage the meeting rail to retain the sash lock in the installed position thereon.

Figure 47:
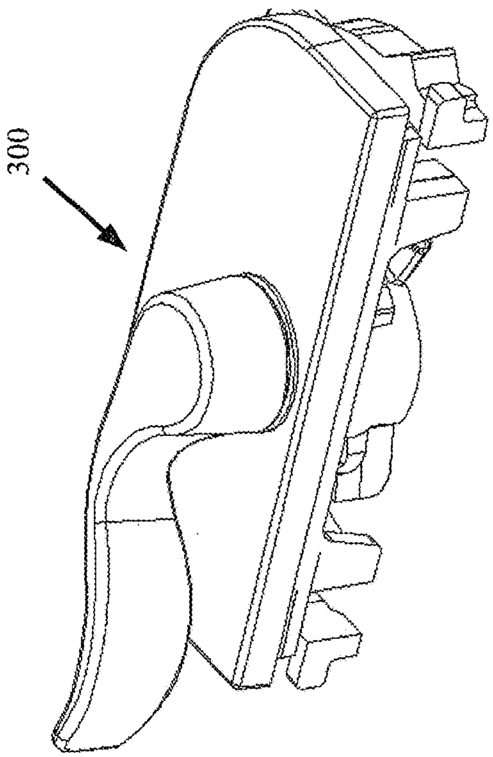
FIG. 47 is a perspective view of another embodiment of a sash lock that is configured to snap into an opening of a meeting rail of a sash window, being installed without the use of screws, and which is also resistant to a forced entry.
Figure 106:
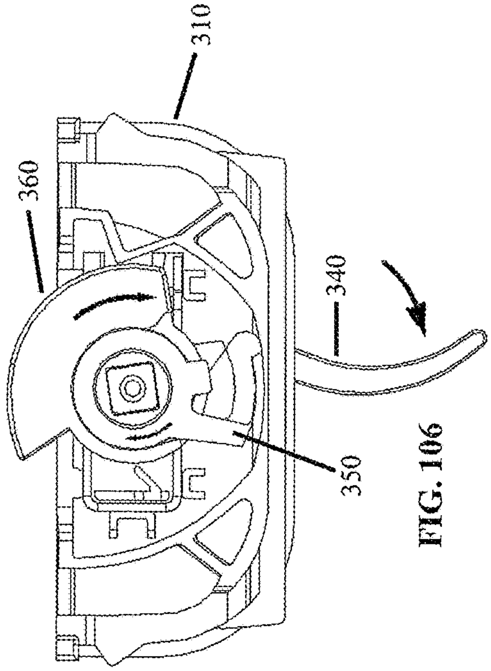
Figure 108:
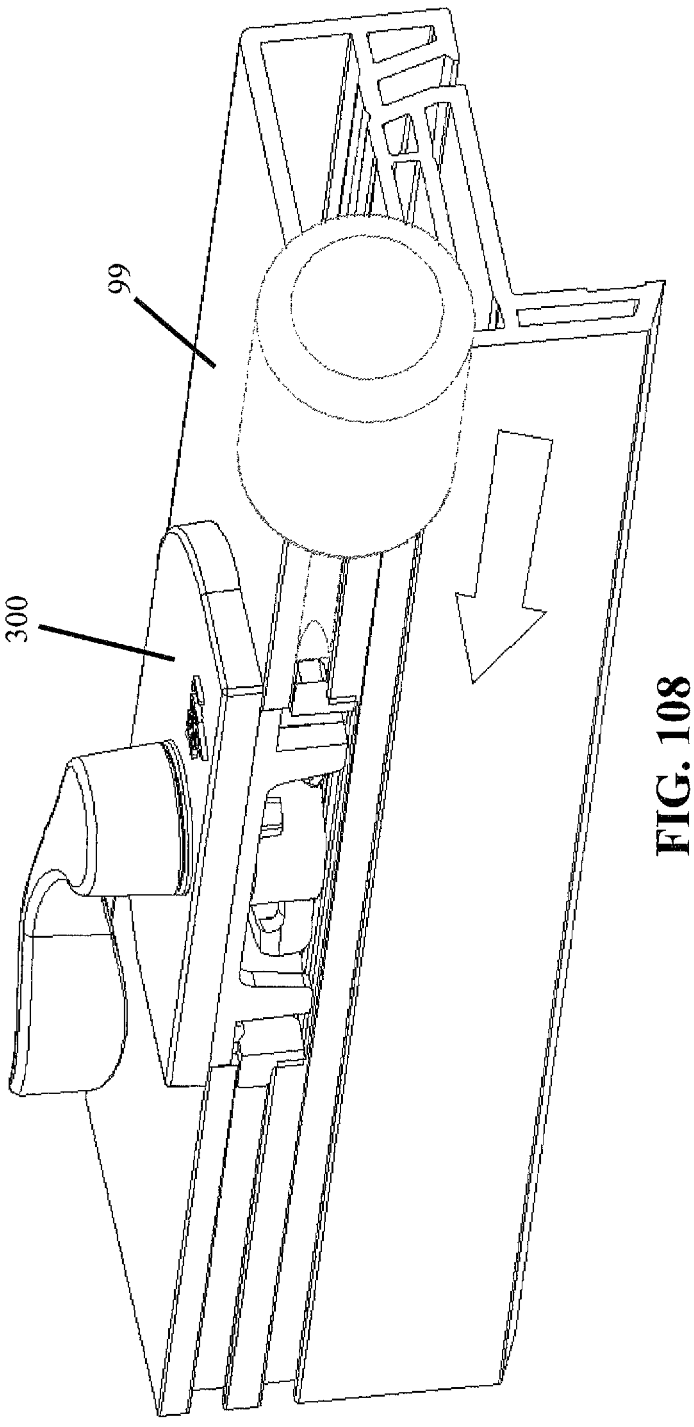
Figure 109:
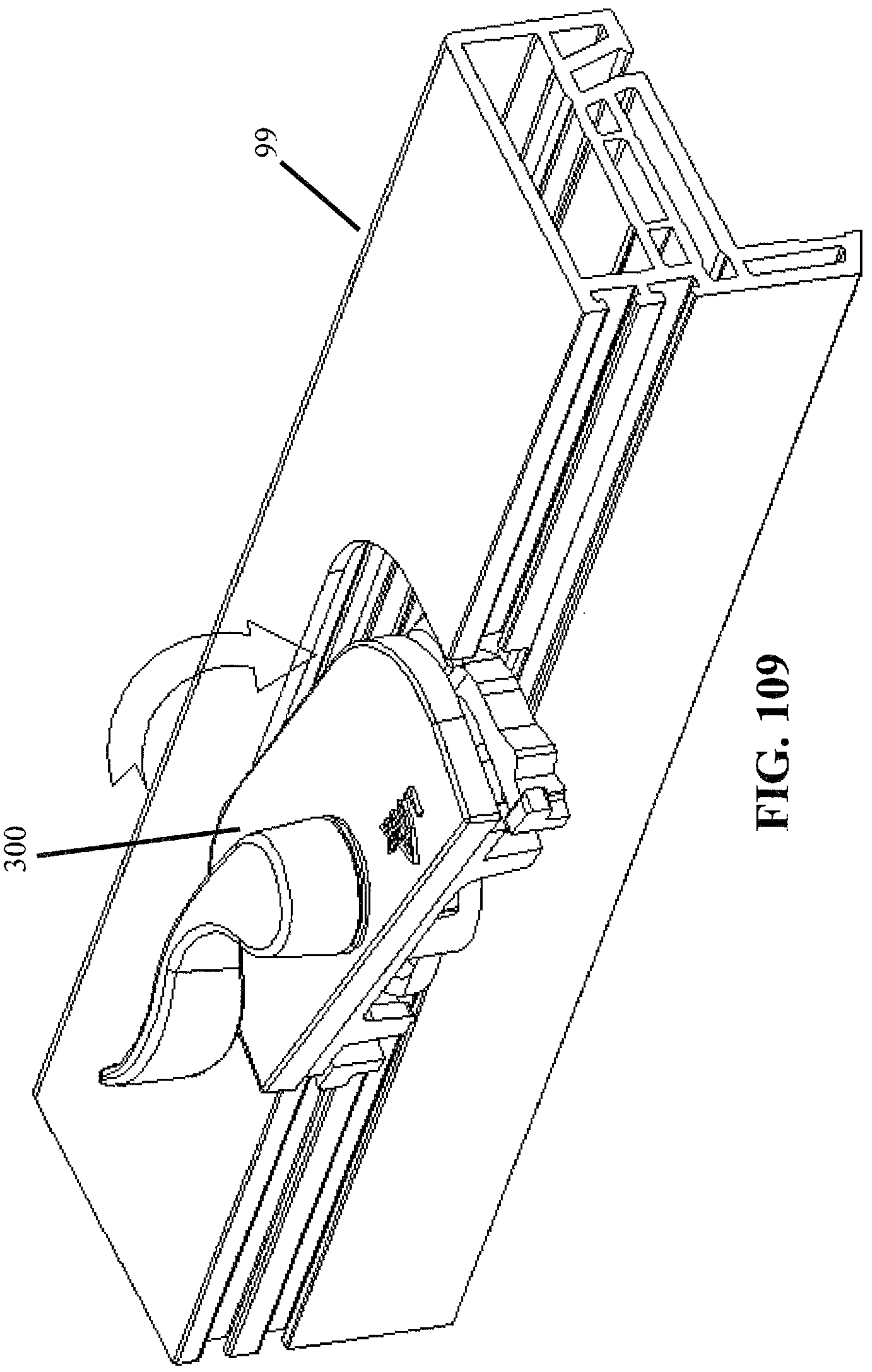

FIGS. 47-106 illustrate a sash lock assembly 300, which may have portions that are formed similar to the other sash lock embodiments disclosed herein (sash lock 200 and sash lock 300), i.e., being configured for screwless installation of a portion thereof with respect to an opening in a meeting rail of a sash window. However, sash lock assembly 300 is also configured such that it may resist an attempted forced entry from outside of the sash window.

Figure 48:
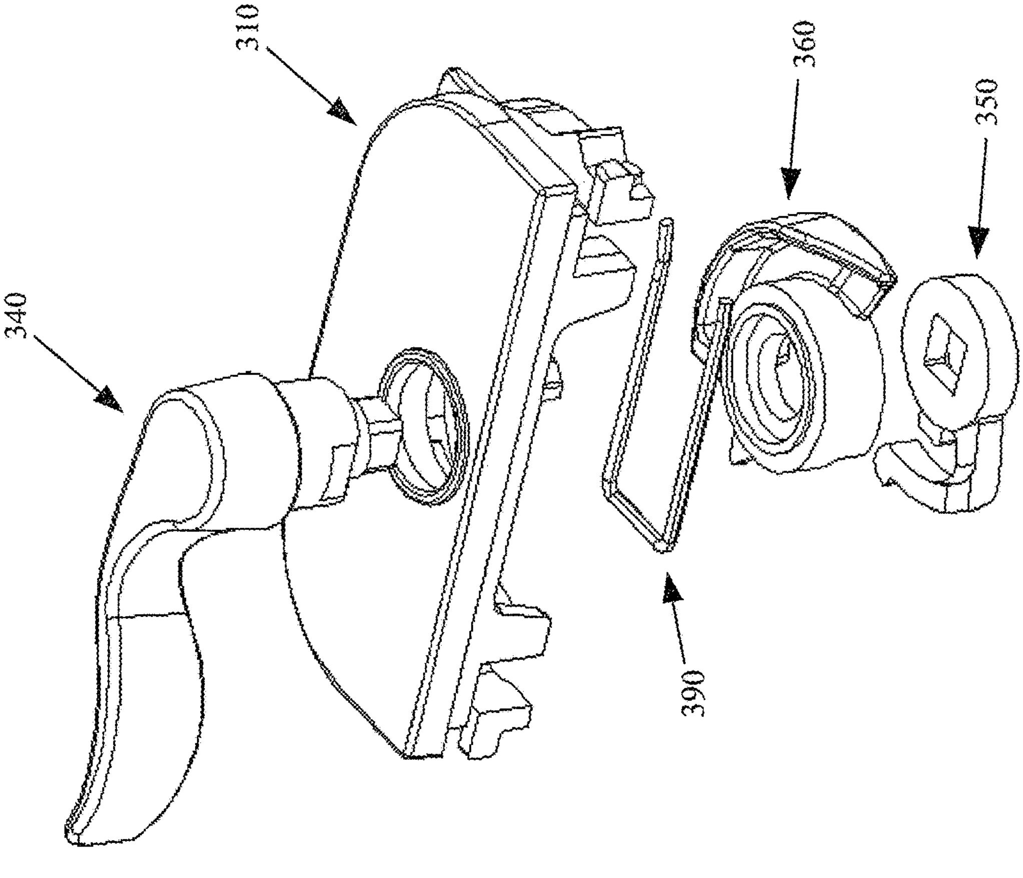
FIG. 48 is an exploded view of the component parts that may be assembled to form the sash lock embodiment of FIG. 47.

The sash lock 300 is shown assembled in FIG. 47, and as seen in the exploded view of FIG. 48, it may broadly include a housing 310, a shaft/handle member 340, a biasing member 390, a locking cam member 360, and a secondary cam member 350. The sash lock 300 may also include a detent mechanism.

Figure 49:
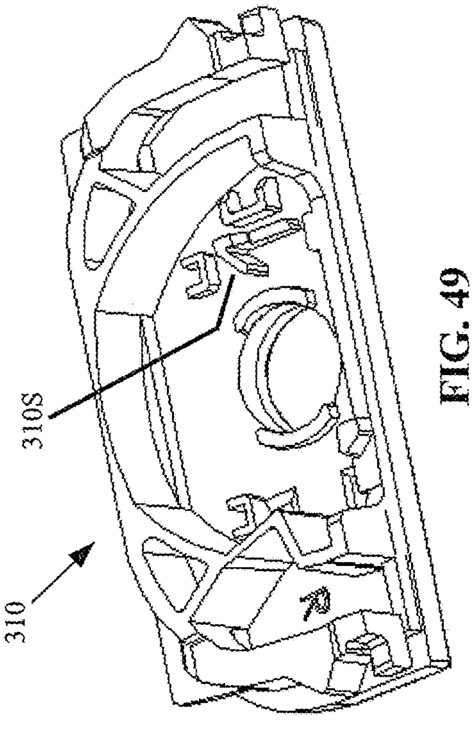
FIG. 49, FIG. 50, FIG. 51, and FIG. 52 are first, second, third, and fourth perspective views of the housing that is usable to form the sash lock of FIG. 47.
Figure 50:
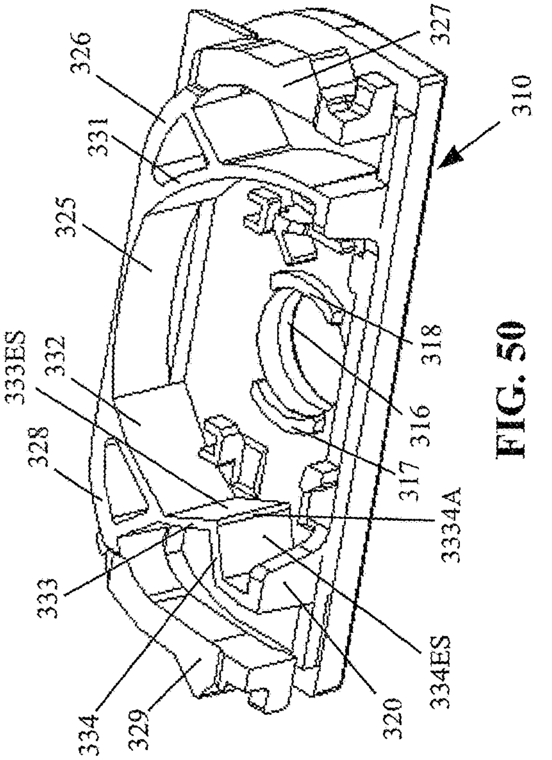
Figure 51:
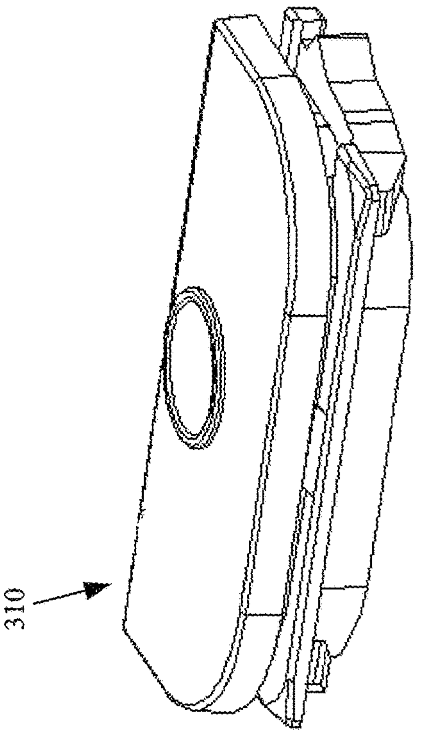
Figure 52:
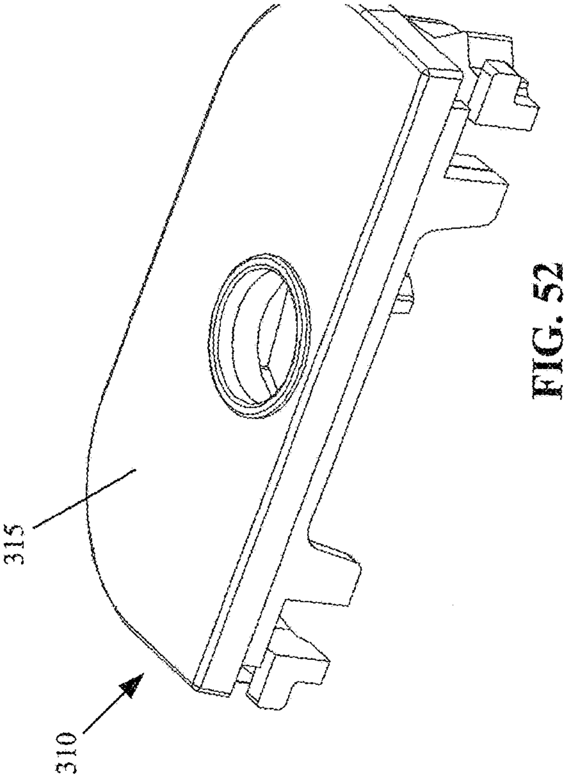
Figure 57:
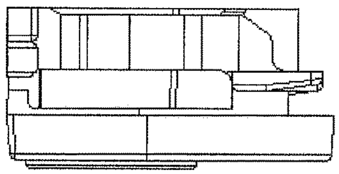
FIG. 57 is a right-side view of the housing shown in FIG. 47.
Figure 54:
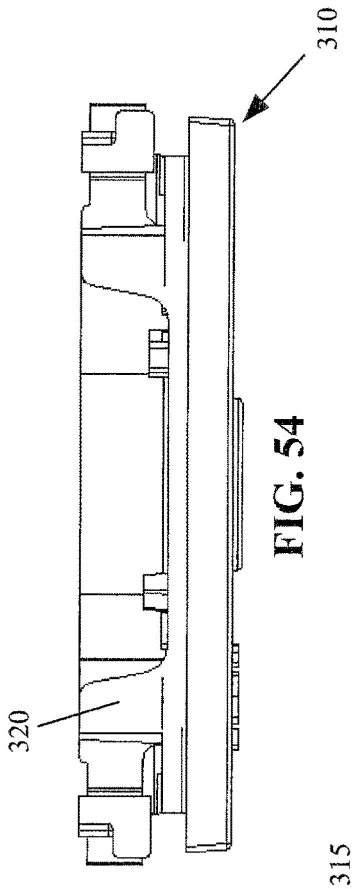
FIG. 54 is a front view of the housing shown in FIG. 47.
Figure 53:
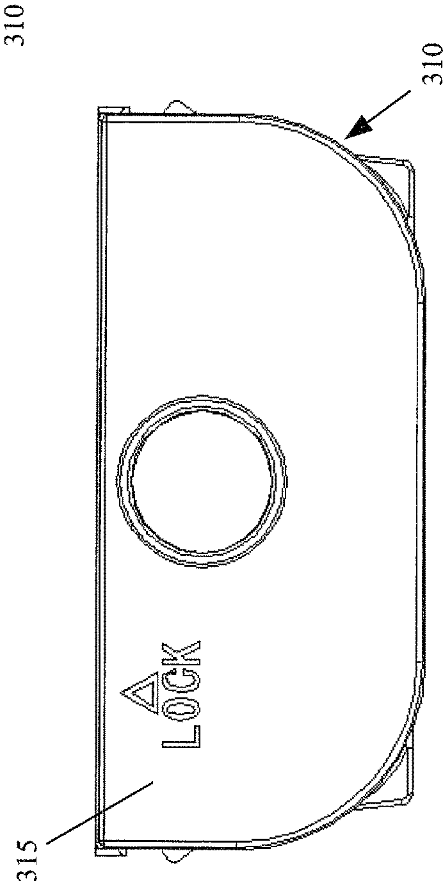
FIG. 53 is a top view of the housing shown in FIG. 47.
Figure 55:
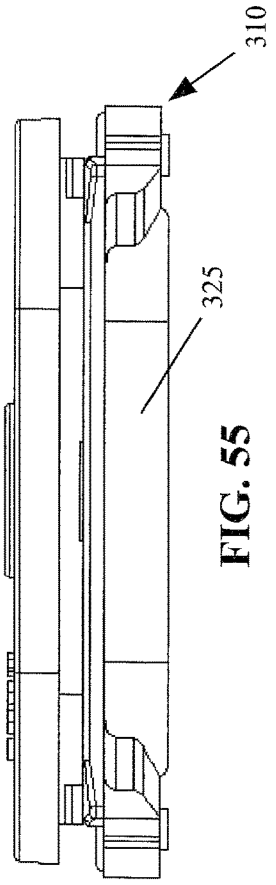
FIG. 55 is a rear view of the housing shown in FIG. 47.
Figure 56:
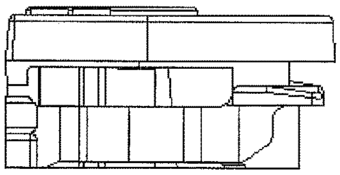
FIG. 56 is a left side view of the housing shown in FIG. 47.
Figure 59:
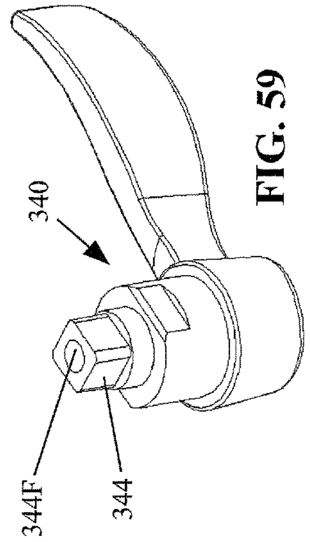
FIG. 58 and FIG. 59 are first and second perspective views of the shaft/handle member shown in FIG. 47.
Figure 64:
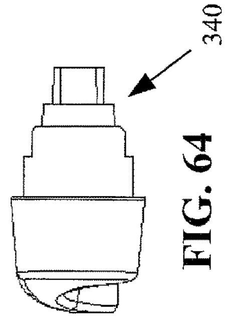
FIG. 64 is a right side view of the shaft/handle member shown in FIG. 47.
Figure 61:
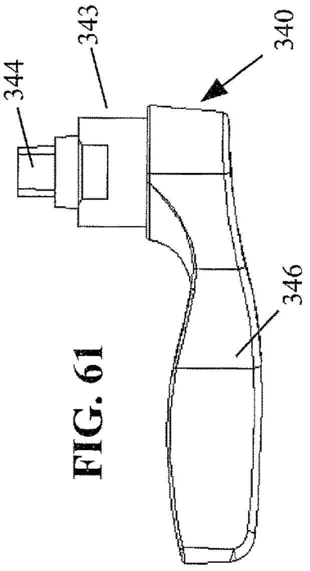
FIG. 61 is a front view of the shaft/handle member shown in FIG. 47.
Figure 60:
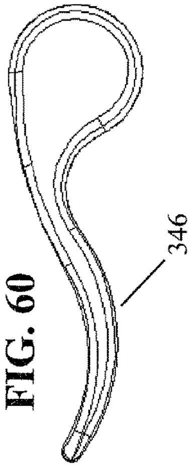
FIG. 60 is a top view of the shaft/handle member shown in FIG. 47.
Figure 62:
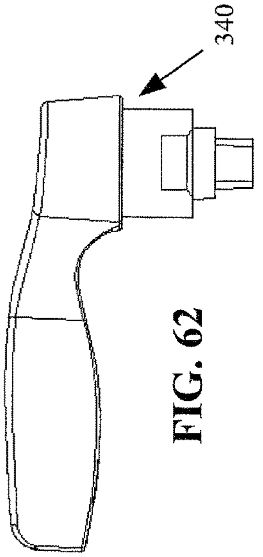
FIG. 62 is a rear view of the shaft/handle member shown in FIG. 47.
Figure 58:
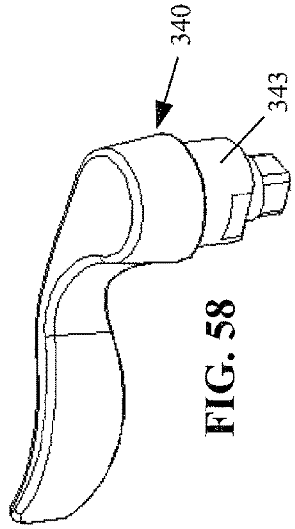
Figure 63:
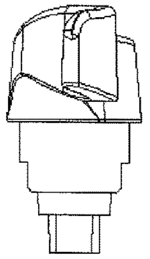
FIG. 63 is a left side view of the shaft/handle member shown in FIG. 47.

To be configured for screwless, snap-in installation onto the meeting rail, the housing 310, which is shown in detail in FIGS. 49-57, may include many of the same features as the housing 110 of sash lock 100; the housing 310 may generally include: a top wall 315, a front wall 320, and a rear wall 325, all of which may be formed as a single unitary wall that may create an exterior surface and an interior surface. The top wall 315 may be formed with a hole 316 that may rotatably receive the shaft/handle member 340, the same as discussed hereinabove with respect to the sash lock 100. The interior surface of the top wall 315 may also be formed with an annular protrusion that may be formed concentric with respect to the hole 316, and which may be a full anulus, or may instead be formed into a first annular protrusion 317 and a second annular protrusion 318, as seen in FIG. 50. The rear wall 325 of the housing 310 may have a straight center portion formed to be offset from the front wall 320, with a first end of the straight center portion being curved at 326 and transitioning into a first cantilevered portion 327, and with a second end of the straight center portion being curved at 328 and transitioning into a second cantilevered portion 329. All of these housing features (and other features) being formed very similar to, or the same as, those of sash lock assembly 100 and/or sash lock assembly 200, enable the sash lock 300 to also be installed without the use of mechanical fasteners by similarly being configured to snap onto the meeting rail, as described hereinabove.

In addition, some of the component parts of the sash lock assembly 300 may also be configured differently so that its locking cam member 360 may resist an attempted forced entry (i.e., to resist forced counter-rotation of the cam member from outside of the sash window). These unique features of each of the component parts of the sash lock 300 are described hereinafter, after which assembly of those component parts, and the unique forced-entry-resistance operation of the sash lock 300 are described.

With respect to the housing 310, opposite end of the straight center portion of its rear wall 325 may similarly transition into interior curved wall portions 331 and 332, which may connect to the front wall 325. However, the housing 310 may also include a V-shaped interior wall having a first wall portion 333 and a second wall portion 334, which may create a corresponding first engagement surface 333ES and a second engagement surface 334ES, and may also form an apex 3334A. The first wall portion 333 and second wall portion 334, as seen in FIG. 50, may interrupt the curved wall portion 332, and the curved wall portion 332 may thus be formed into two curved wall portions, only one portion of which may directly connect to the front wall 325, as seen in FIG. 50. Alternatively, rather than interrupting the curved wall portion 332, the curved wall portion 332 may instead be continuous being the same as shown for the curved wall portion 331, and the first wall portion 333 and second wall portion 334 may be added to, and may connect with, the continuous curved wall portion 332 (not shown).

With respect to the shaft/handle member 340, it may include, as seen in FIGS. 58-64, a cylindrical shaft 343, which cylindrical shaft may be configured to be pivotally received within the hole 316 of the housing 310, for pivotal mounting of the shaft/handle member with respect to the housing. A first end of the shaft 343 may have a knob or other enlarged circular cross-sectional shape formed thereon to permit that end of the shaft to be easily grasped by the user. Alternatively, or additionally, the first end of the shaft 343 may have a graspable handle portion 346 that may extend generally orthogonally with respect to the axis of the cylindrical shaft and may provide leverage when actuated by a user. The second (free end) of the shaft 343 may have a keyed protrusion 344 extending therefrom, and an orifice 344F formed in the keyed protrusion. The keyed protrusion 344 may be any suitable cross-sectional shape, and merely to be exemplary, the keyed protrusion is illustrated herein with the rectangular cross-sectional shape seen in FIG. 59.

Figure 88:
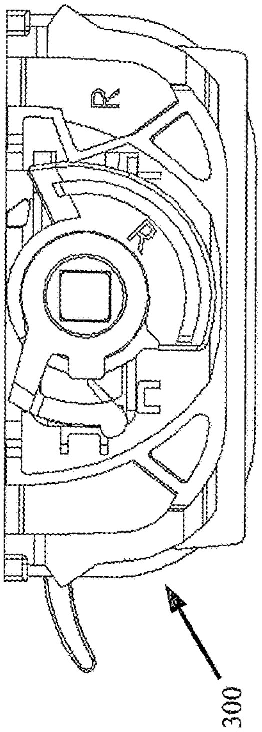
FIG. 88 is a bottom view of the assembled sash lock of FIG. 47.
Figure 89:
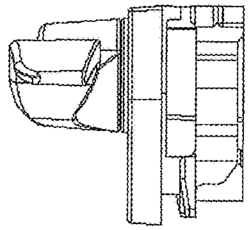
FIG. 89 is a first end view of the assembled sash lock of FIG. 47.
Figure 91:
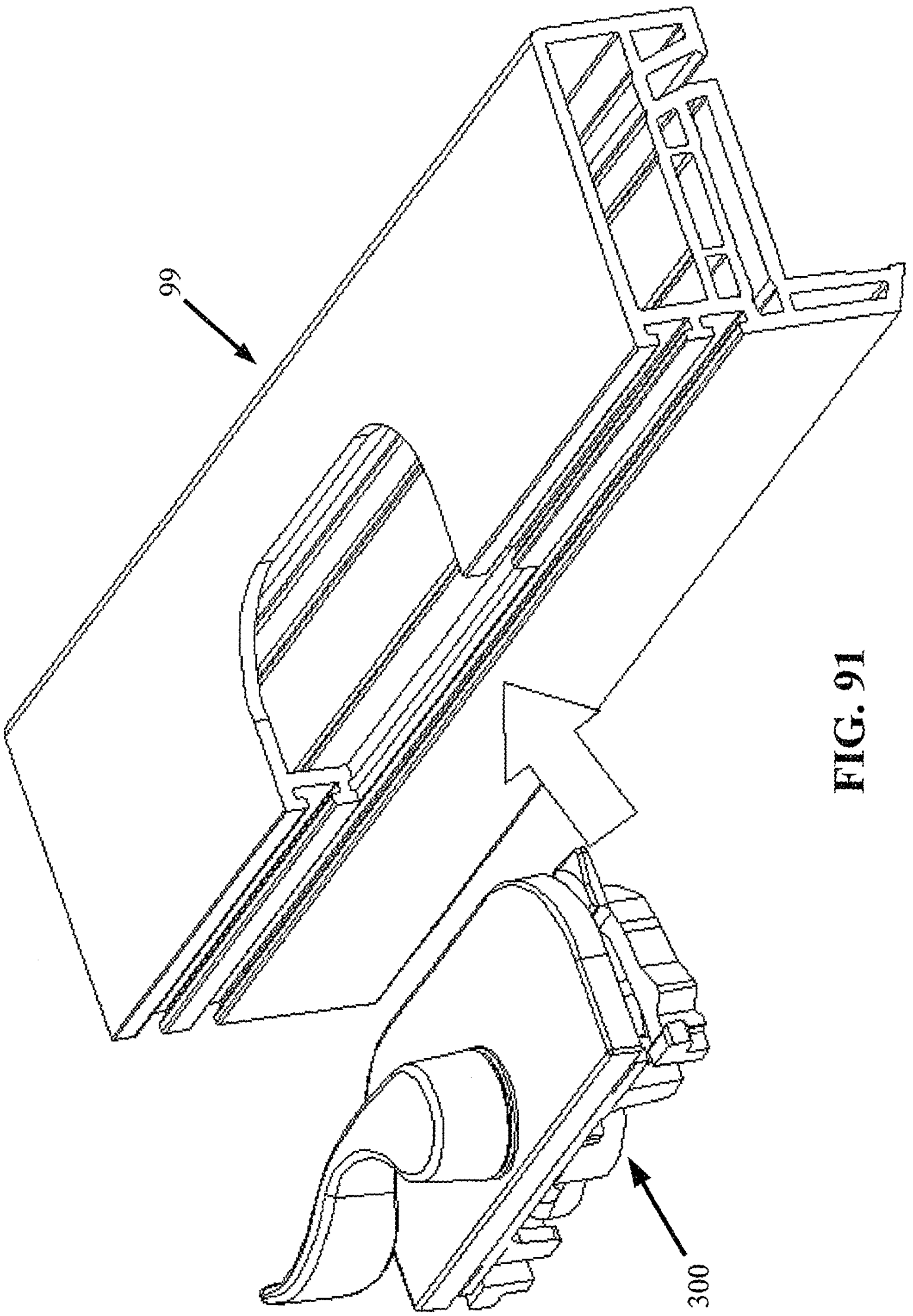
FIG. 91 is a perspective view showing the sash lock assembly of FIG. 47, just prior to being installed on a meeting rail configured to receive the sash lock.

With respect to the locking cam member 360, it may include, as seen in FIGS. 65-71, a hub 363 that may be cylindrical, and which hub 363 may have a first concentric cylindrical recess 367 on a first side of the locking cam member 360, which may be rotatably mounted upon the annular protrusion or protrusions (e.g., protrusions 317 and 318) of the housing 310 (see e.g., FIG. 88). The locking cam member 360 may also be formed with a cylindrical hole 364 in the hub, being usable for slidably accommodating/receiving of the shaft 343 of the shaft/handle member 340. Extending laterally away from the hub 363 may be a wall 365, and extending laterally away from the wall 365 may be a curved cam wall 366, a portion of which may be used to engage the cam member with respect to a corresponding keeper to lock the sash window, the same as with sash lock 100. However, the locking cam member 360 may also be formed to include a first contact surface 361 and a second contact surface 362, which may be positioned on the cam member features as seen in FIG. 65. The hub 363 may have a second concentric cylindrical recess 368, on a second side of the locking cam member 360, which recess may not form a complete internal cylindrical surface, as the hub may also have a transverse opening into that recess, which may form at least the contact surface 362, as seen in FIG.

Figure 72:
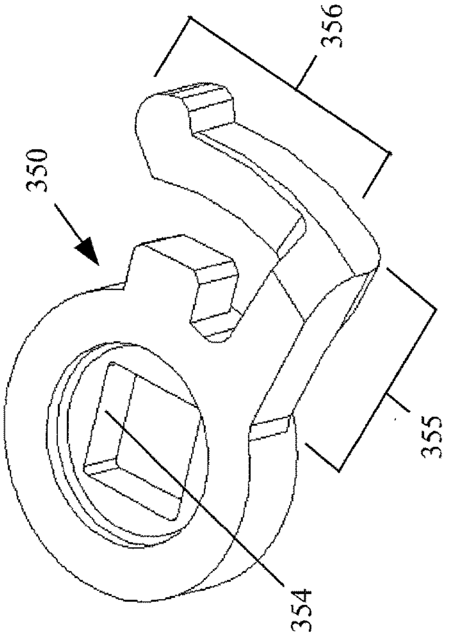
FIG. 72 is a perspective view of the secondary cam member shown in FIG. 47.
Figure 77:
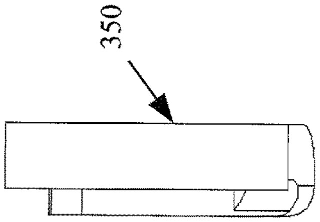
FIG. 77 is a second end view of the secondary cam member of FIG. 47.
Figure 74:
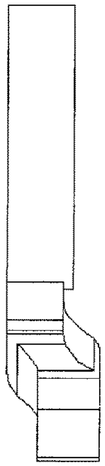
FIG. 74 is a top view of the secondary cam member of FIG. 47.
Figure 73:
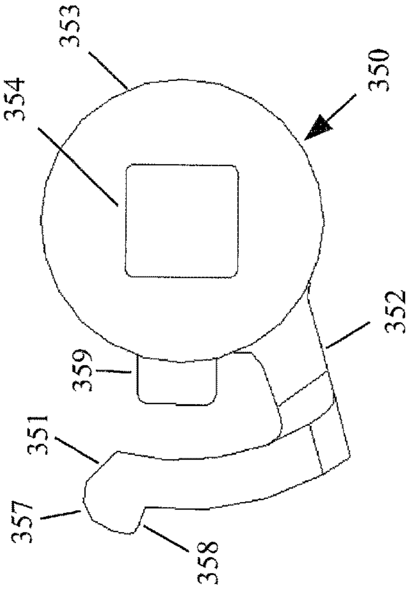
FIG. 73 is a front view of the secondary cam member of FIG. 47.
Figure 102:
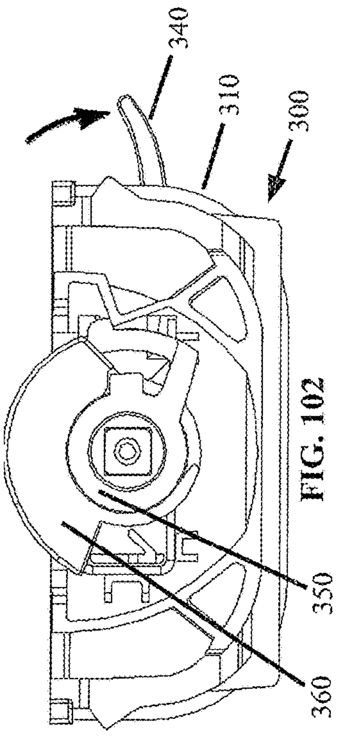
Figure 104:
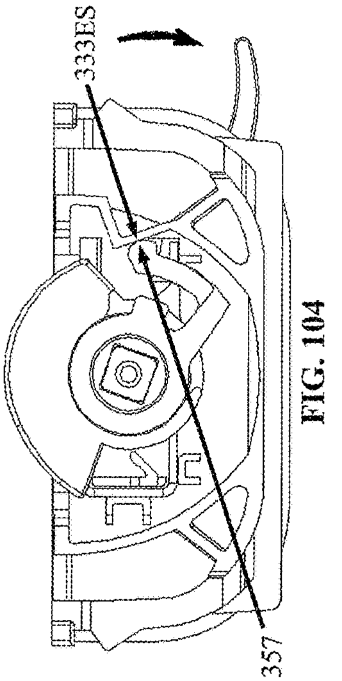

The sash lock 300 may also include a secondary cam 350, as shown in FIGS. 72-77, which may be formed to include a cylindrical hub 353 that may be sized to be received in the cylindrical recess 367 of the locking cam member 360 using, e.g., a clearance fit. The cylindrical hub 353 may be formed with an opening 354 that may be a through opening, so that a portion of the keyed protrusion 344 of the shaft/handle member 340 may extend therethrough, and the end of the protrusion 344 may also be sized and shaped to be bucked (i.e., upset) like a rivet, for securing of the secondary cam 350 to the end of the shaft. Alternatively, opening 354 in the cam 350 may not be a through opening, and a screw may be received in the orifice 344F of the shaft/handle member 340 to secure the secondary cam 350 to the shaft/handle member 340. The secondary cam 350 being so secured to the shaft/handle member 340 within the housing cavity is thereby pivotable in accordance with movement of the shaft/handle member, i.e., the secondary cam 350 co-rotates together with any rotation (pivoting) of the shaft/handle member 340 in each of a first rotation direction (see e.g., FIG. 96) and a second rotation direction (see e.g., FIG. 102). The secondary cam 350 may also be formed to include a cantilevered arm 355 that may cantilever away from the cylindrical hub 353, as seen in FIG. 72 and FIG. 73. The cantilevered arm may include a first arm portion 355 that extends away from the hub 353, and a second arm portion 356 that extends away from the first arm portion 356. The cantilevered arm may also include a first contact surface 351, and a second contact surface 352, which, merely to be exemplary, may be positioned on the first arm portion 355 and second arm portion 356, as seen in FIG. 73. The distal end of the second arm portion 356 may be formed with a selective shape that may create a first engagement surface 357 and a second engagement surface 358.

Figure 93:
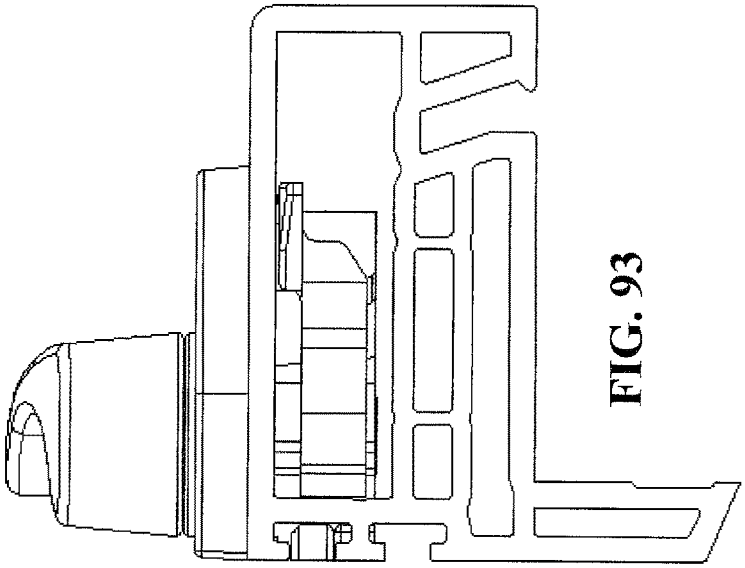
FIG. 93 is the end view of FIG. 92, but is shown just after the sash lock assembly has been installed on the meeting rail.
Figure 92:
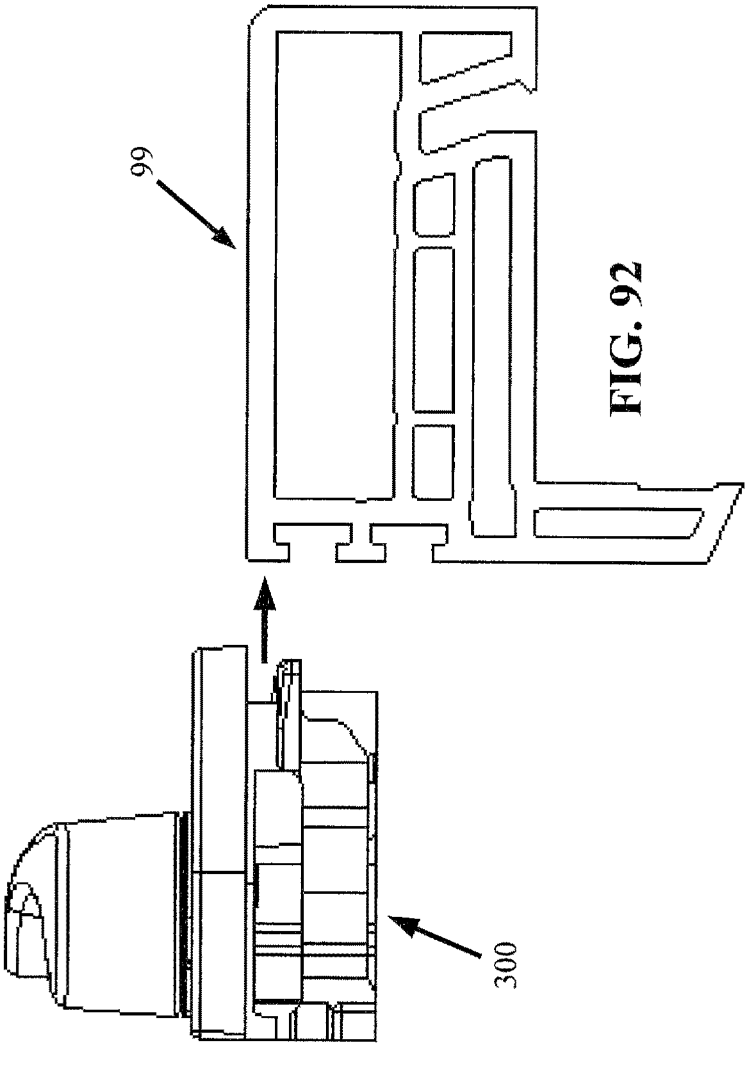
FIG. 92 is an end view showing the sash lock assembly of FIG. 47, just prior to being installed on a meeting rail configured to receive the sash lock.
Figure 94:
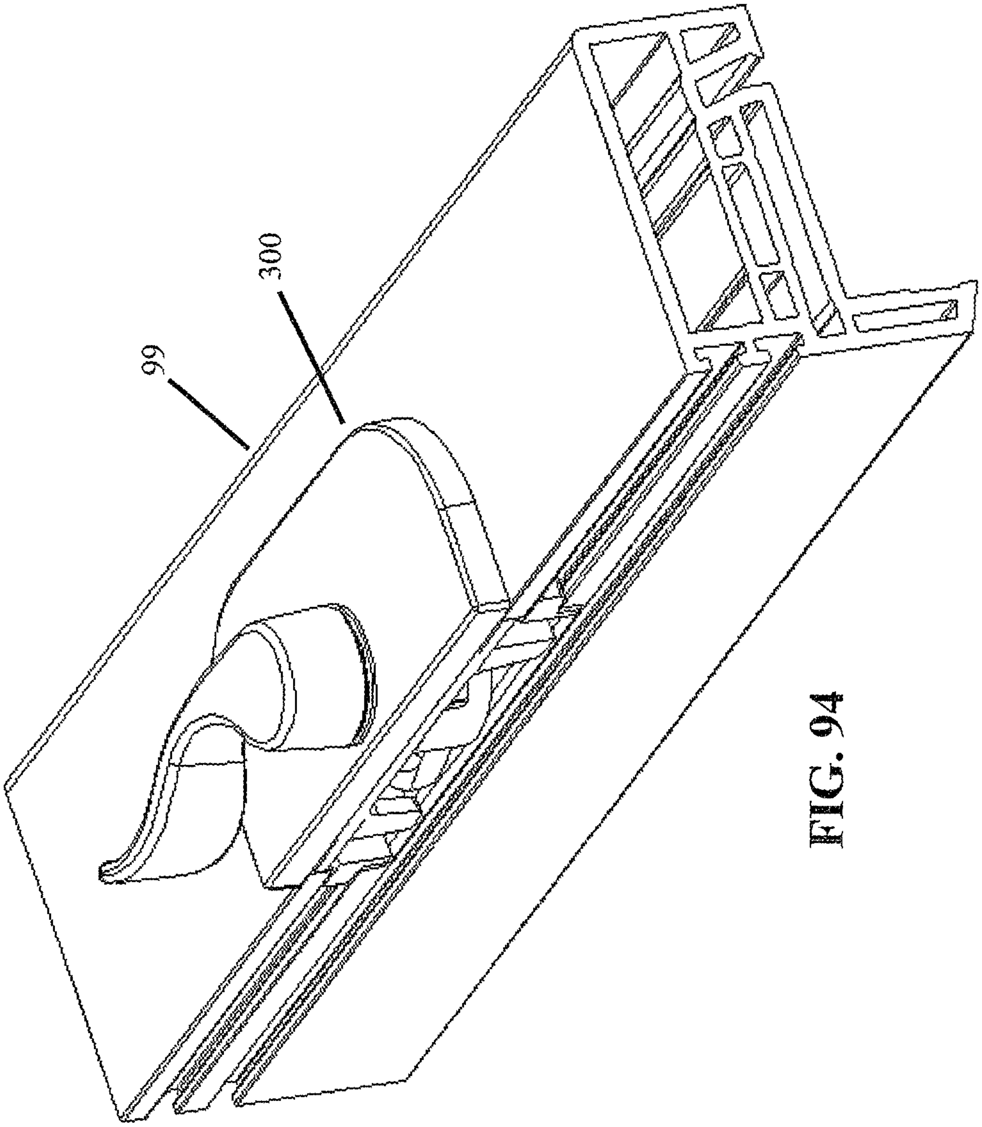
FIG. 94 is the perspective view of FIG. 91, but is shown just after the sash lock assembly has been installed on the meeting rail.
Figure 95:
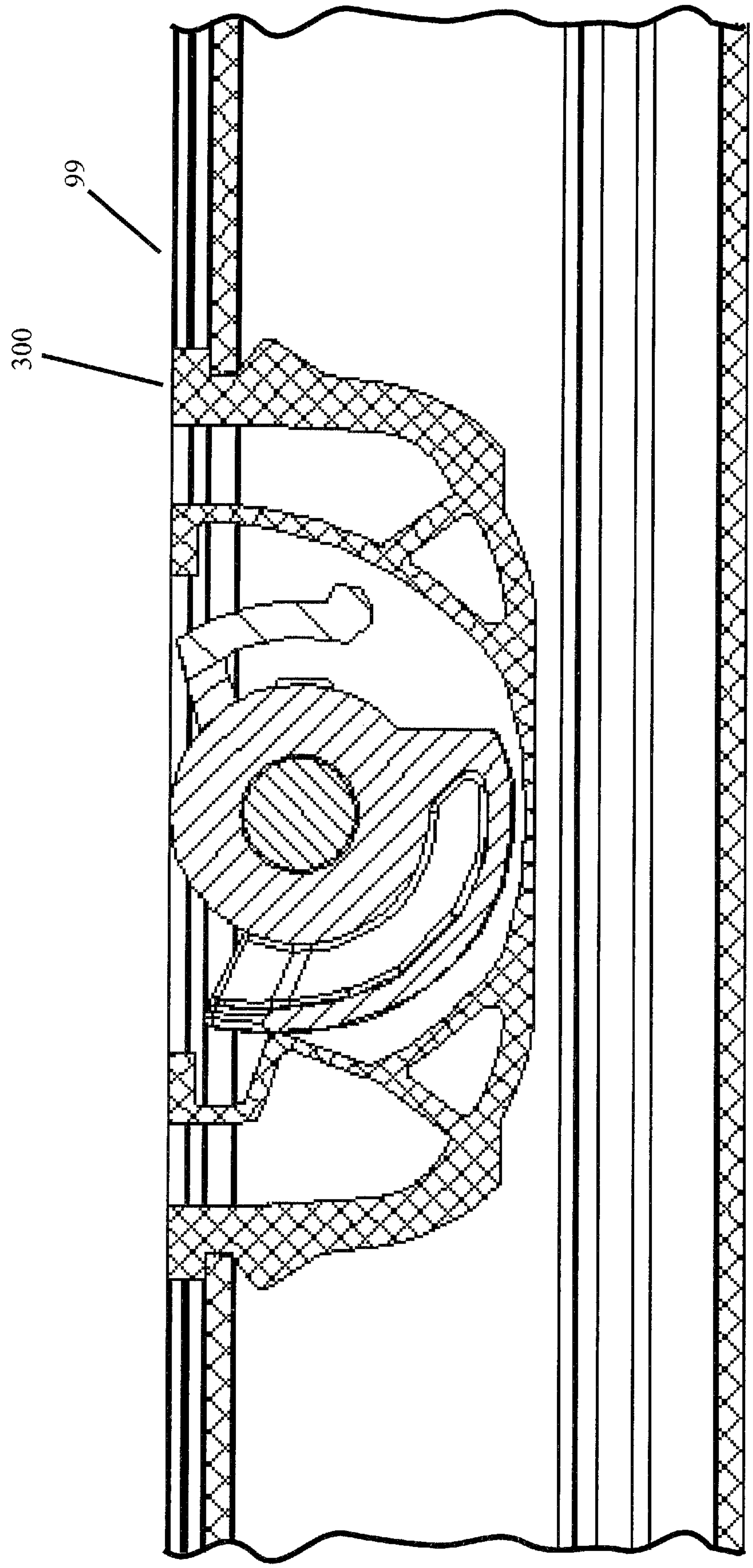
FIG. 95 is a cross-sectional view through the installed sash lock assembly and meeting rail, as seen in FIG. 94.
Figure 97:
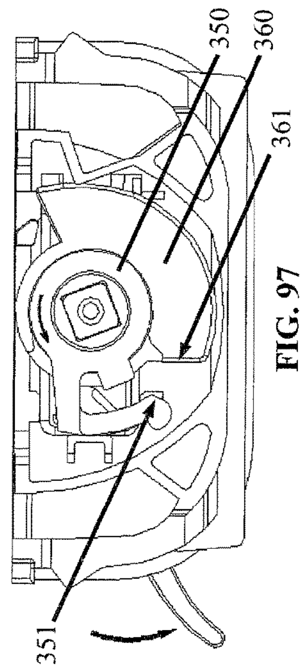
FIG. 96, FIG. 97, FIG. 98, FIG. 99, FIG. 100, and FIG. 101 are first, second, third, fourth, fifth, and sixth bottom views of the sash lock assembly as seen in FIG. 88, but being shown with the shaft/handle member at different positions, being moved from the first shaft/handle member position in FIG. 96 at which the cam is fully retracted into the housing and the sash window is unlocked, into the shaft/handle member position in FIG. 101 at which the cam is in the extended and locked, forced-entry-resistant position.
Figure 101:
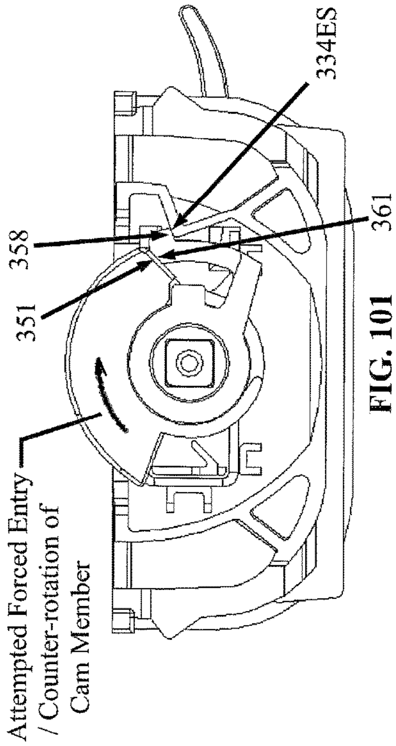
Figure 98:
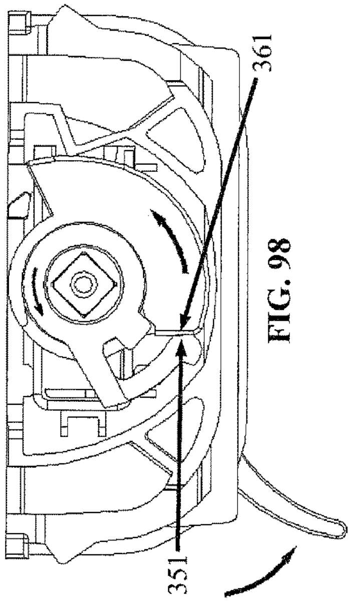
Figure 100:
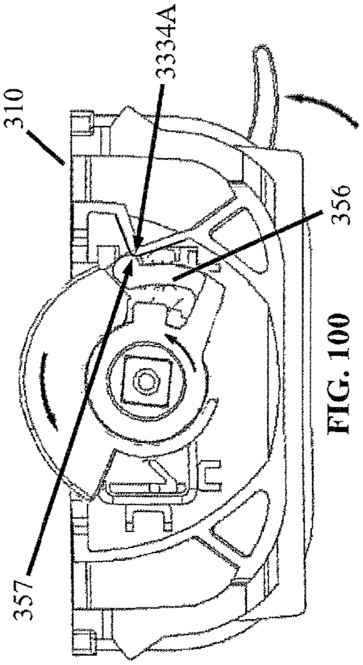
Figure 101A:
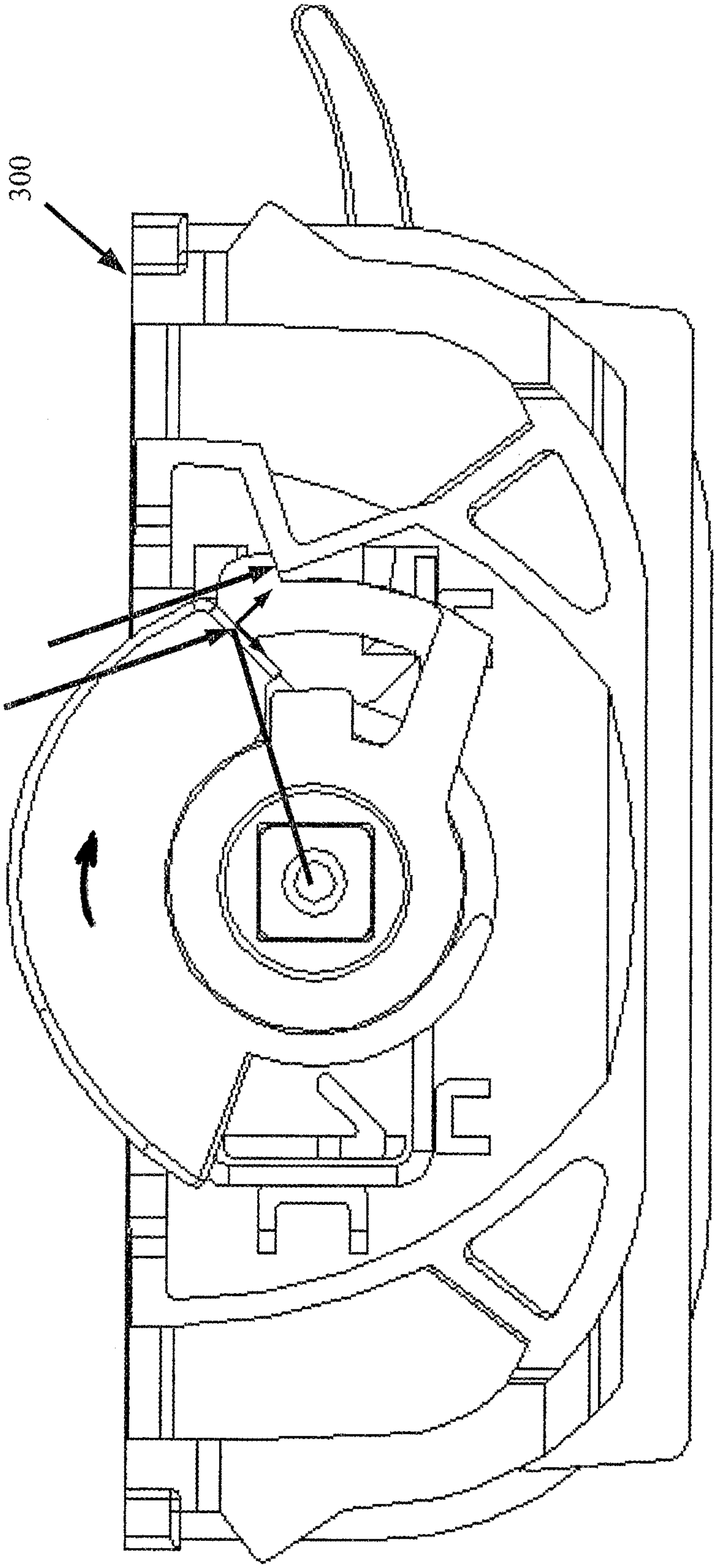
FIG. 101A shows the image of FIG. 101 enlarged and annotated with arrows to indicate that forced counter-rotation of the cam member is prevented in the forced-entry-resistant locked cam member position, as it causes contact between the cam member and the cantilevered member of the secondary cam, resulting in contact between a second engagement surface of the cantilevered member and a second engagement surface of the interior wall.
Figure 102A:
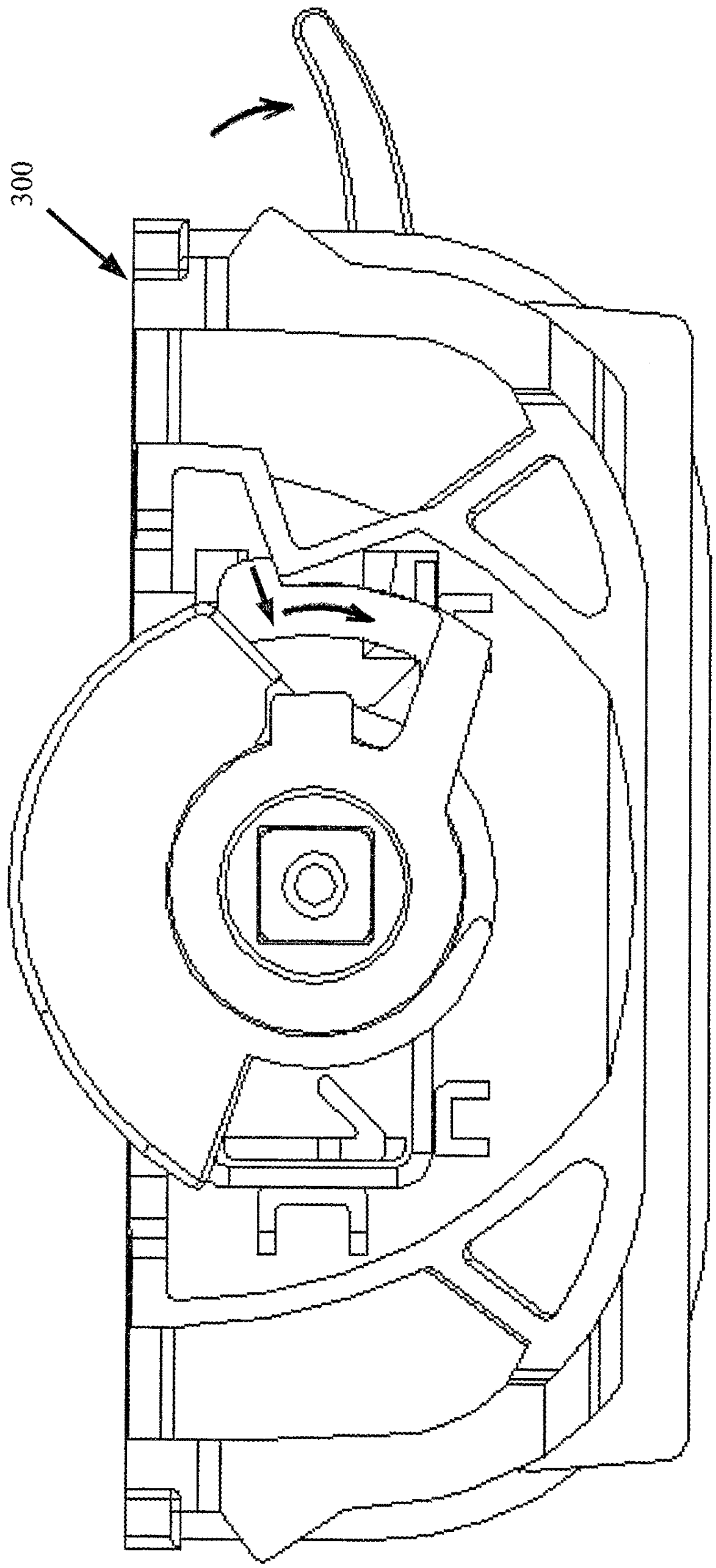
FIG. 102A shows the image of FIG. 102 enlarged and annotated with arrows to indicate that counter-rotation of the shaft/handle member results in corresponding counter-rotation of the secondary cam, and that the contact between the second engagement surface of the cantilevered member and the second engagement surface of the interior wall causes deformation of the cantilevered member, in the direction of the arrow, from the undeflected position shown therein to the inwardly deflected position shown in FIG. 103.
Figure 103:
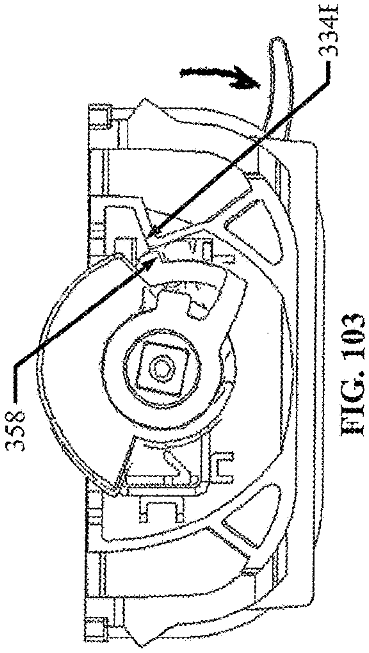
FIG. 102, FIG. 103, FIG. 104, FIG. 105, FIG. 106, and FIG. 107 are first, second, third, fourth, fifth, and sixth bottom views of the sash lock assembly as seen in FIG. 88, but being shown with the shaft/handle member at different positions, being moved from the shaft/handle member position of FIG. 102 at which the cam is in the extended and locked, forced-entry-resistant position, to the shaft/handle member position in FIG. 107 at which the cam is fully retracted into the housing and the sash window is unlocked.
Figure 105:
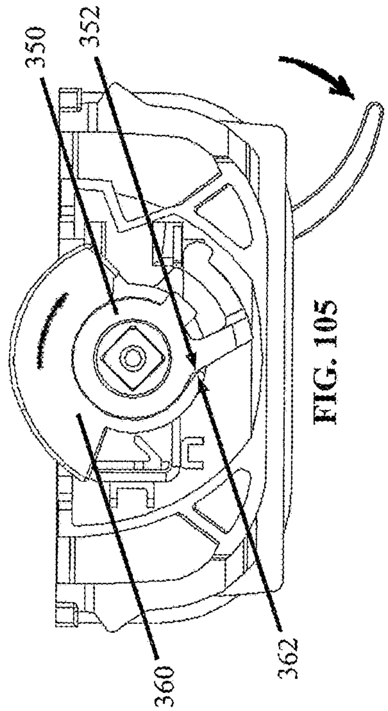

With the forced-entry-resistant sash lock 300 being so formed and assembled and installed on the sash window (e.g., FIGS. 93-95), and when the cam member 360 is in the unlocked cam member position (FIG. 96), upon rotation of the shaft/handle member 340 in a first rotational direction indicated by the arrow therein, the secondary cam 350 co-rotates with the shaft/handle member independent of the cam member 360 (see FIG. 97). Upon continued rotation of the shaft/handle member 340 in the first rotational direction the first contact surface 351 of the secondary cam 350 contacts the first contact surface 361 of the cam member 360, as seen in FIG. 98, and causes co-rotation of the cam member into the non-forced-entry-resistant locked cam position (FIG. 99), whereat a portion of the cam may engage a portion of the keeper, but where an attempt to force counter-rotation of the cam member 360 from outside the window is not prevented. However, upon continued rotation of the shaft/handle member 340 in the first rotational direction the contact causes further co-rotation of the cam member 360 and engagement of the first engagement surface 357 of the cantilevered arm 356 of the secondary cam 350 with the first engagement surface 333ES of the interior wall portion 333 (FIG. 99) to thereby create a deflecting force (see FIG. 99A) that causes deformation of the cantilevered arm 356 from an undeflected position (FIG. 99) to an inwardly deflected position (FIG. 100). The inward deflection of the cantilevered arm 356 may cause relative sliding movement between the first contact surface 351 of the secondary cam 350 and the first contact surface 361 of the cam member 360. A maximum inwardly deflected position may be reached when a distal portion of the first engagement surface 357 of the cantilevered arm 356 of the secondary cam 350 may rest upon an apex 3334A (which may be rounded), being formed by the angled interior wall portions 333 and 334 (compare FIG. 99 and FIG. 100). Upon continued rotation of the shaft/handle member 340 in the first rotational direction the contact causes further co-rotation of the cam member 360 into a forced-entry-resistant locked cam member position because the cantilevered arm 356 has returned to the undeflected position (FIG. 101) whereat forced counter-rotation of the cam member 360 from outside the window towards the unlocked cam member position is prevented by: the adjacent positioning and resulting contacting of the first contact surface 351 of the cam member 350 with the first contact surface 361 of the secondary cam 360, resulting in counter-rotation-inhibiting contact between the second engagement surface 358 of the cantilevered arm 356 of the secondary cam 350 with the second engagement surface 334ES of the interior wall portion 334 of housing 310. FIG. 101A illustrates the component-to-component transferring of internal forces generated within the sash lock 300 as a result of an attempted forced counter-rotation of the cam member 360, which is reacted by the housing 310 that is fixed to the sliding sash window 99.

Figure 107:
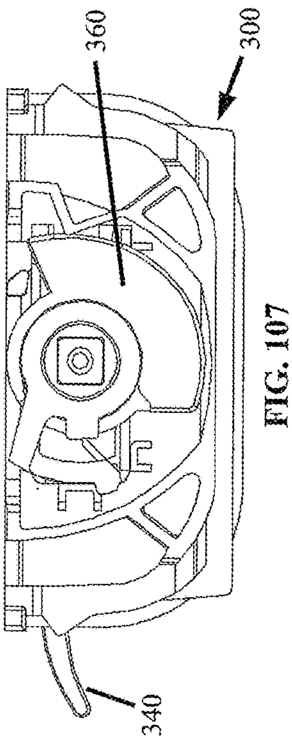

The unlocking of the sash lock 300 may be seen in the views of FIGS. 102 to 107. When the cam member 360 is in the forced-entry-resistant locked cam member position (FIG. 102), upon application of a force to initiate counter-rotation of the shaft/handle member 340 being rotation in a second rotational direction shown by the arrow in FIG. 102, the secondary cam 350 counter-rotates independent of the cam member 360 and the engagement between the second engagement surface 358 of the cantilevered arm 356 of the secondary cam 350 and the second engagement surface 334ES of the interior wall portion 334 of housing 310 causes deformation of the cantilevered arm from the undeflected position toward the inwardly deflected position (see FIG. 103). Upon continued counter-rotation of the shaft/handle member 340 in the second rotational direction the second engagement surface 358 of the cantilevered arm 356 of the secondary cam 350 disengages from the second engagement surface 334ES of the interior wall portion 334 of housing 310 and causes return of the cantilevered arm 356 to the undeflected position and positioning of the cam member 360 at the non-forced-entry-resistant locked cam position (FIG. 104), whereat the first engagement surface 357 of the cantilevered arm 356 of the secondary cam 350 may contact the first engagement surface 333ES of the interior wall portion 333. Upon continued counter-rotation of the shaft/handle member 340 in the second rotational direction the second contact surface 352 of the secondary cam 350 contacts the second contact surface 362 of the cam member 360 (FIG. 105) and causes co-counter-rotation of the cam member 350 (see FIG. 106) until reaching the unlocked cam member position (FIG. 107).

Figure 75:
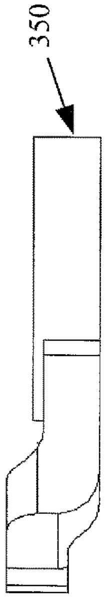
FIG. 75 is a bottom view of the secondary cam member of FIG. 47.
Figure 76:
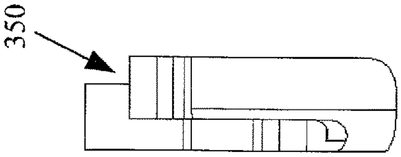
FIG. 76 is a first end view of the secondary cam member of FIG. 47.
Figure 78:
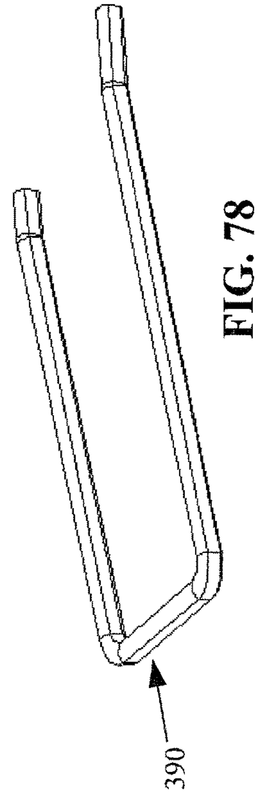
FIG. 78 is a perspective view of the biasing member shown in FIG. 47.
Figure 83:
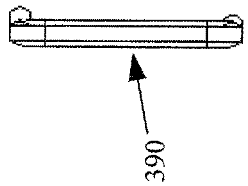
FIG. 83 is a second end view of the biasing member of FIG. 47.
Figure 80:
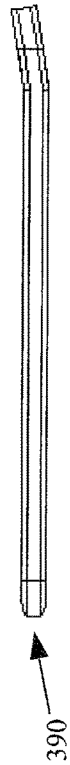
FIG. 80 is a top view of the biasing member of FIG. 47.
Figure 79:
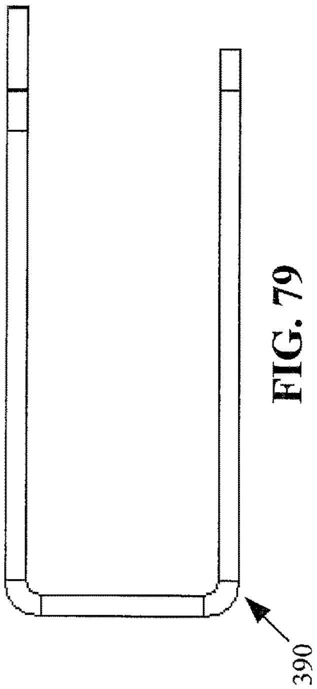
FIG. 79 is a front view of the biasing member of FIG. 47.
Figure 81:
FIG. 81 is a bottom view of the biasing member of FIG. 47.
Figure 82:
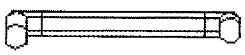
FIG. 82 is a first end view of the biasing member of FIG. 47.
Figure 85:
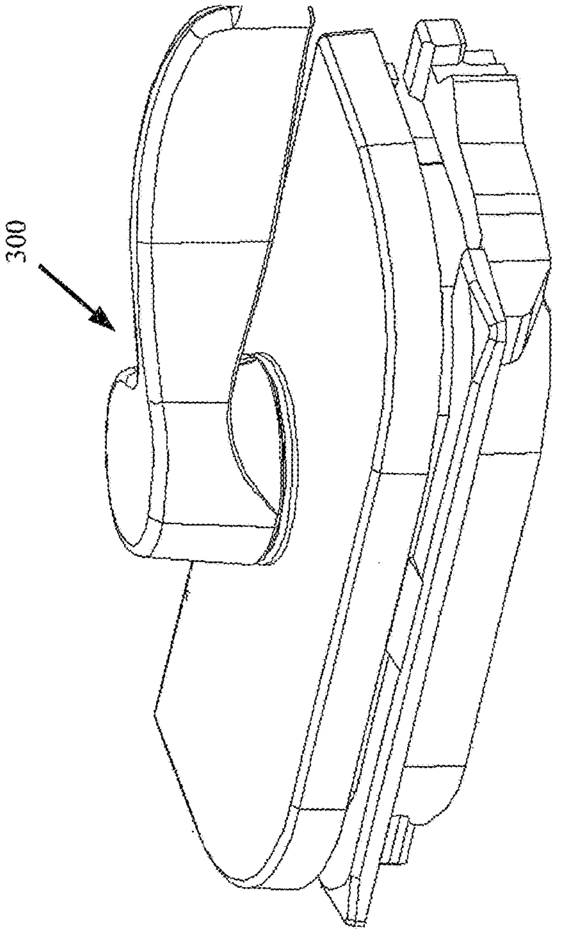
FIG. 85 is a second perspective view of the assembled sash lock.
Figure 84:
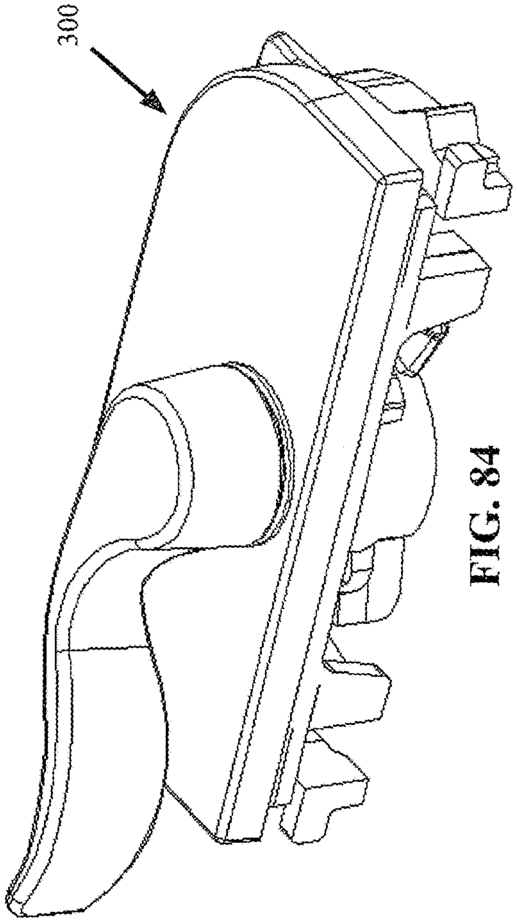
FIG. 84 is a first perspective view of the assembled sash lock, being as seen in FIG. 47, with the shaft-handle member shown in a first position, at which the locking cam is retracted into the housing.
Figure 90:
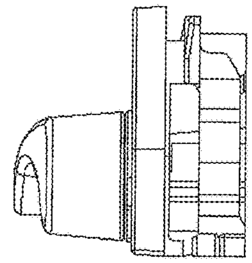
FIG. 90 is a second end view of the assembled sash lock of FIG. 47.
Figure 87:
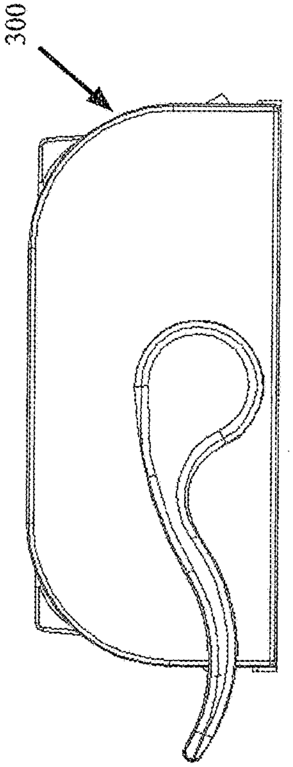
FIG. 87 is a top view of the assembled sash lock of FIG. 47.
Figure 86:
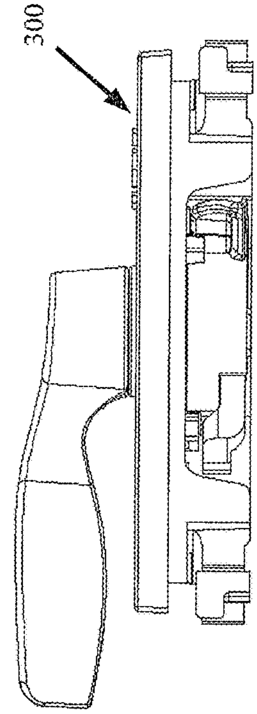
FIG. 86 is a front view of the assembled sash lock of FIG. 47.
Figure 99:
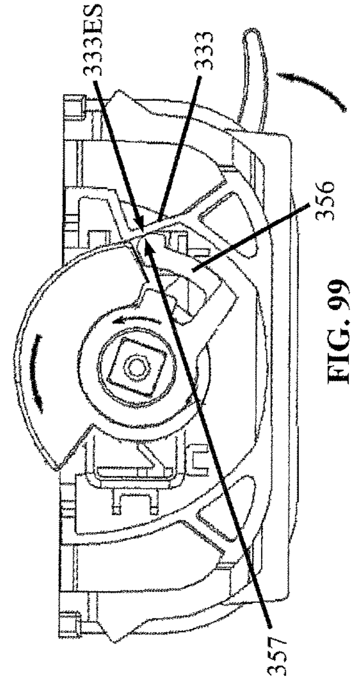
Figure 99A:
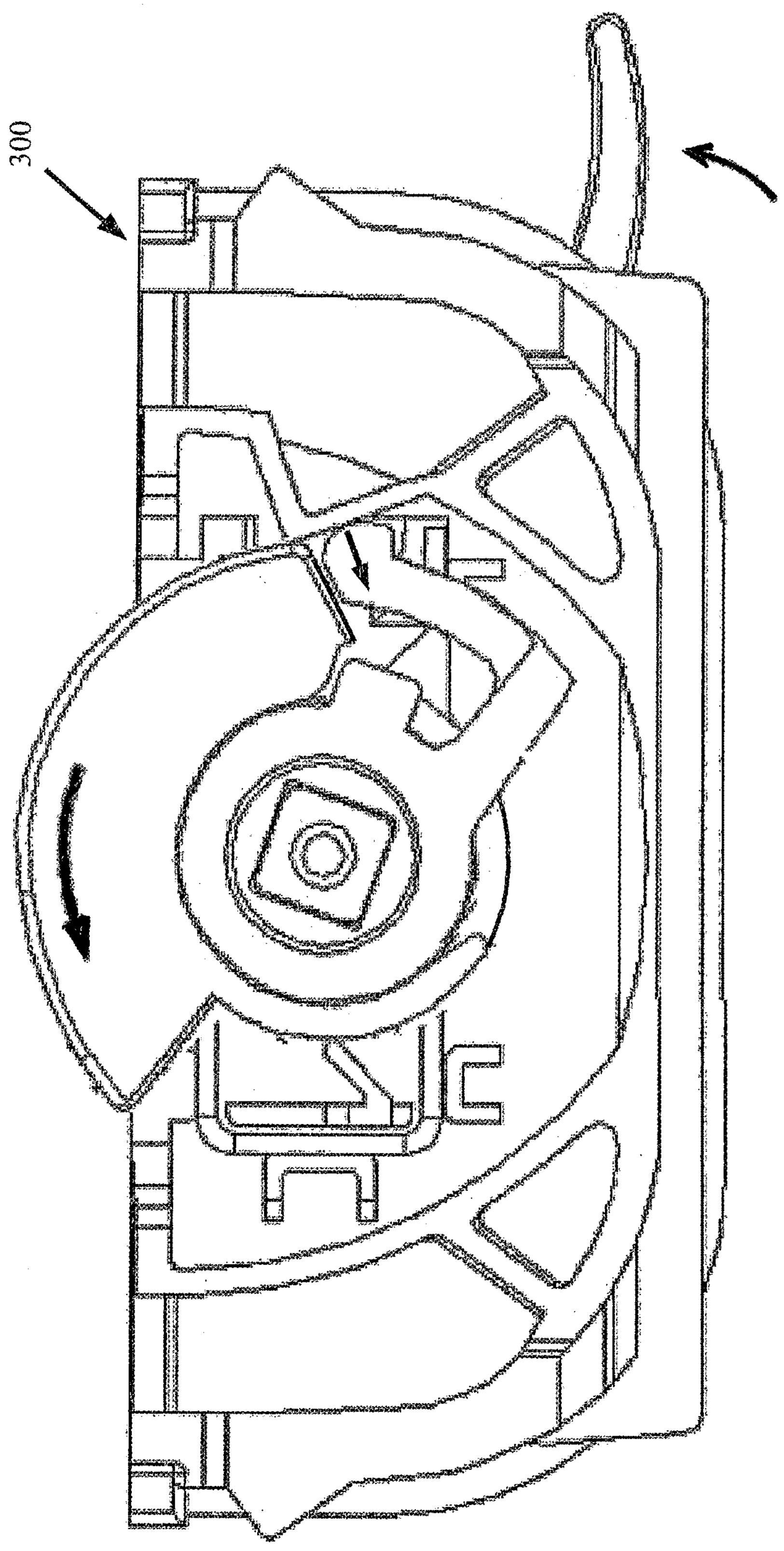
FIG. 99A shows the image of FIG. 99 enlarged and annotated with arrows to indicate that continued rotation of the shaft/handle member and contact between the secondary cam and the cam member causes contact between the cantilevered member of the secondary cam and the housing, resulting in inward deflection of the cantilevered member.

As seen in FIG. 75, the secondary cam 350 may also have a rigid protrusion 359 which may contact a portion of the cam member 360 (see e.g., FIG. 98) to supply an additional or alternative force to cause co-rotation of the cam member 360 into, e.g., the non-forced-entry-resistant locked cam position of FIG. 99.

Figure 96:
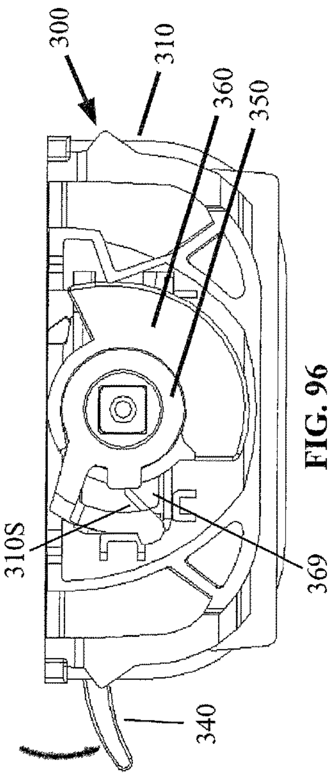

As seen in FIG. 49, the interior surface of the top wall 315 of the housing 310 may also be formed with one or more protrusions that may operate to fixedly support a leaf spring that may be used as a detent mechanism to apply a restraining force to releasably inhibit the rotatable movement of the shaft/handle member 340 by contact of the spring with a flat surface 341 on the shaft/handle member (see FIG. 64), when positioned at the unlocked cam member position (FIG. 96). Alternatively, a leaf spring may be used as a detent mechanism to apply a restraining force to releasably inhibit the rotatable movement of the shaft/handle member 340 by contact of the spring with a flat surface 342 on the shaft/handle member, when the cam member 360 is positioned at the forced-entry-resistant locked cam member position (FIG. 101). Alternatively, the two flat surfaces 341 and 342 may be used to releasably inhibit the rotatable movement of the shaft/handle member 340 by contact of the spring with flat surfaces, at each of the unlocked cam member position and forced-entry-resistant locked cam member position.

Alternatively, two individual leaf spring may be used to releasably inhibit the rotatable movement of the shaft/handle member 340 when at each of the unlocked cam member position (FIG. 96) and the forced-entry-resistant locked cam member position (FIG. 101). Rather than two separate leaf springs, one single leaf spring may be used, and which may be the u-shaped leaf spring 390 shown in FIGS. 78-83, which may also be in accordance with the leaf spring shown in Applicant's application Ser. No. 16/689,118.

Also note that a stop protrusion 369 on the cam 360 (FIG. 67) may be utilized to contact a stop surface 310S formed on a portion of (e.g., a protrusion on) the housing 310 (FIG. 49), to positively prevent overtravel of the cam member 360 (see FIG. 96), apart from use of the detent mechanism.

Further note that in one embodiment, the shaft/handle member 340 may rotate about 180 degrees between the unlocked cam member position of FIG. 96 and the forced-entry-resistant locked cam member position of FIG. 101, although other total angular displacements may alternatively be used.

While illustrative implementations of one or more embodiments of the disclosed system are provided hereinabove, those skilled in the art and having the benefit of the present disclosure will appreciate that further embodiments may be implemented with various changes within the scope of the disclosed system. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

The invention claimed is:

1. A forced-entry-resistant lock for a sash window comprising:

a housing, said housing comprising: at least one wall shaped to form an exterior surface, and an interior surface that defines a cavity; an opening in said at least one wall; a substantially cylindrical hole in said at least one wall; and an interior wall positioned within said cavity comprising: a first engagement surface and a second engagement surface;

a shaft, at least a portion of said shaft being substantially cylindrical and being rotatably mounted in said substantially cylindrical hole in said housing;

a cam member, said cam member comprising:

a hub configured to pivotally mount said cam member to said housing, to pivot about said substantially cylindrical hole in said housing between a forced-entry-resistant locked cam member position where a portion of said cam member extends out from said housing cavity and is thereat configured to engage a keeper to lock the sash window in a closed window position, a non-forced-entry-resistant locked cam member position where said portion of said cam member is still configured to engage with the keeper, and an unlocked cam member position where said cam member retracts further into said housing and said portion of said cam member is disengaged from the keeper to permit travel of the sash window;

a cylindrical hole in said hub configured to receive said portion of said shaft;

a first contact surface; and a second contact surface;

a secondary cam, said secondary cam being fixedly secured to said shaft, and comprising:

a first contact surface;

a second contact surface; and a cantilevered arm, a distal end of said cantilevered arm comprising:

a first engagement surface; and a second engagement surface;

and wherein when said cam member is in said unlocked cam member position, upon rotation of said shaft in a first rotational direction, said secondary cam rotates with said shaft independent of said cam member, and upon continued rotation of said shaft in said first rotational direction said first contact surface of said secondary cam contacts said first contact surface of said cam member and causes co-rotation of said cam member into said non-forced-entry-resistant locked cam position, and upon continued rotation of said shaft in said first rotational direction said contact causes further co-rotation of said cam member and engagement of said first engagement surface of said cantilevered arm with said first engagement surface of said interior wall to thereby cause deformation of said cantilevered arm from an undeflected position to an inwardly deflected position, and upon continued rotation of said shaft in said first rotational direction said contact causes further co-rotation of said cam member into said forced-entry-resistant locked cam member position whereat said cantilevered arm returns to said undeflected position and forced counter-rotation of said cam member towards said unlocked cam member position is prevented by said contact between said first contact surface of said secondary cam and said first contact surface of said cam member resulting in counter-rotation-inhibiting contact between said second engagement surface of said cantilevered arm and said second engagement surface of said interior wall.

2. The forced-entry-resistant lock according to claim 1, wherein when said cam member is in said forced-entry-resistant locked cam member position, upon counter-rotation of said shaft in a second rotational direction, said secondary cam counter-rotates independent of said cam member and said engagement between said second engagement surface of said cantilevered arm and said second engagement surface of said housing causes deformation of said cantilevered arm from said undeflected position toward said inwardly deflected position, and upon continued counter-rotation of said shaft in said second rotational direction said second engagement surface of said cantilevered arm disengages from said second engagement surface of said housing and causes return of said cantilevered arm to said undeflected position and positioning of said cam member at said non-forced-entry-resistant locked cam position, and upon continued counter-rotation of said shaft in said second rotational direction said second contact surface of said secondary cam contacts said second contact surface of said cam member and causes co-counter-rotation of said cam member into said unlocked cam member position.

3. The forced-entry-resistant lock according to claim 2, wherein said interior wall comprises a first interior wall portion and a second interior wall portion, said first interior wall portion being at an angle to said second interior wall portion to form a v-shaped interior wall; and wherein said first engagement surface of said housing is positioned on said first interior wall portion and said second engagement surface of said housing is positioned on said second interior wall portion.

4. The forced-entry-resistant lock according to claim 2, further comprising a detent mechanism configured to releasably inhibit said rotatable movement of said shaft when said cam member is at said unlocked cam member position.

5. The forced-entry-resistant lock according to claim 2, further comprising a detent mechanism configured to releasably inhibit said rotatable movement of said shaft when said cam member is at said locked cam member position.

6. The forced-entry-resistant lock according to claim 2, further comprising a detent mechanism configured to releasably inhibit said rotatable movement of said shaft when said cam member is at each of said unlocked cam member position and said locked cam member position.

7. The forced-entry-resistant lock according to claim 2, further comprising:

a flat surface formed on said shaft;

a leaf spring, said leaf spring being secured in said cavity of said housing: and wherein said leaf spring is configured to contact said flat surface to inhibit said rotational movement of said shaft.

8. The forced-entry-resistant lock according to claim 7, further comprising:

a second flat surface formed on said shaft;

a second leaf spring, said second leaf spring being secured in said cavity of said housing: and wherein said first leaf spring and said second leaf spring are configured to contact said first flat surface and said second flat surface to inhibit said rotational movement of said shaft.

9. The forced-entry-resistant lock according to claim 8, wherein said first leaf spring and said second leaf spring are connected together to be u-shaped.

10. A forced-entry-resistant lock for a sash window comprising:

a housing, said housing comprising: at least one wall shaped to form an exterior surface, and an interior surface that defines a cavity; an opening in said at least one wall; a hole in said at least one wall; and an interior wall positioned within said cavity and comprising: a first engagement surface and a second engagement surface;

a shaft, at least a portion of said shaft being rotatably mounted in said hole;

a cam member, said cam member being pivotally mounted to said housing and configured to pivot about said shaft between a forced-entry-resistant locked cam member position where a first portion of said cam member extends out from said housing cavity and is thereat configured to engage a keeper to lock the sash window in a closed window position, and an unlocked cam member position where at least a second portion of said cam member retracts into said housing and said first portion of said cam member is disengaged from the keeper; said cam member comprising:

a first contact surface; and a second contact surface;

a secondary cam, said secondary cam being secured to said shaft to co-rotate with said shaft, and comprising:

a first contact surface;

a second contact surface; and a cantilevered arm, said cantilevered arm comprising:

a first engagement surface; and a second engagement surface;

and wherein when said cam member is in said unlocked cam member position, upon rotation of said shaft in a first rotational direction, said secondary cam co-rotates with said shaft independent of said cam member, and upon continued rotation of said shaft in said first rotational direction said first contact surface of said secondary cam contacts said first contact surface of said cam member and causes co-rotation of said cam member and engagement of said first engagement surface of said cantilevered arm with said first engagement surface of said interior wall to thereby cause deformation of said cantilevered arm from an undeflected position to a deflected position, and upon continued rotation of said shaft in said first rotational direction said contact causes further co-rotation of said cam member into said forced-entry-resistant locked cam member position whereat said cantilevered arm returns to said undeflected position and forced counter-rotation of said cam member towards said unlocked cam member position is prevented by said contact between said first contact surface of said secondary cam and said first contact surface of said cam member resulting in counter-rotation-inhibiting contact between said second engagement surface of said cantilevered arm and said second engagement surface of said interior wall.

11. The forced-entry-resistant lock according to claim 10, wherein when said cam member is in said forced-entry-resistant locked cam member position, upon counter-rotation of said shaft in a second rotational direction, said secondary cam counter-rotates independent of said cam member and said engagement between said second engagement surface of said cantilevered arm and said second engagement surface of said housing causes deformation of said cantilevered arm from said undeflected position to said deflected position, and upon continued counter-rotation of said shaft in said second rotational direction said second engagement surface of said cantilevered arm disengages from said second engagement surface of said housing and results in return of said cantilevered arm to said undeflected, and upon continued counter-rotation of said shaft in said second rotational direction said second contact surface of said secondary cam contacts said second contact surface of said cam member and causes co-counter-rotation of said cam member into said unlocked cam member position.

12. The forced-entry-resistant lock according to claim 11, wherein said interior wall comprises a first interior wall portion and a second interior wall portion, said first interior wall portion being at an angle to said second interior wall portion to form a v-shaped interior wall; and wherein said first engagement surface of said housing is positioned on said first interior wall portion and said second engagement surface of said housing is positioned on said second interior wall portion.

13. The forced-entry-resistant lock according to claim 11, further comprising a detent mechanism configured to releasably inhibit said rotatable movement of said shaft when said cam member is at said unlocked cam member position.

14. The forced-entry-resistant lock according to claim 11, further comprising a detent mechanism configured to releasably inhibit said rotatable movement of said shaft when said cam member is at said locked cam member position.

15. The forced-entry-resistant lock according to claim 11, further comprising a detent mechanism configured to releasably inhibit said rotatable movement of said shaft when said cam member is at each of said unlocked cam member position and said locked cam member position.

16. The forced-entry-resistant lock according to claim 11, further comprising:

a flat surface formed on said shaft;

a leaf spring, said leaf spring being secured in said cavity of said housing: and wherein said leaf spring is configured to contact said flat surface to inhibit said rotational movement of said shaft when said cam member is at said unlocked cam member position.

17. The forced-entry-resistant lock according to claim 16, further comprising:

a second flat surface formed on said shaft;

a second leaf spring, said second leaf spring being secured in said cavity of said housing: and wherein said first leaf spring and said second leaf spring are configured to contact said first flat surface and said second flat surface to inhibit said rotational movement of said shaft.

18. The forced-entry-resistant lock according to claim 17, wherein said first leaf spring and said second leaf spring are connected together to be u-shaped.

* * * * *